US012810492B2

(12) United States Patent
Zhang et al.

(10) Patent No.: US 12,810,492 B2
(45) Date of Patent: Nov. 24, 2026

(54) DUAL-VAE FOR MORE EFFICIENT AND EFFECTIVE DIFFUSION MODEL TRAINING

(71) Applicant: Adobe Inc., San Jose, CA (US)

(72) Inventors: Zhifei Zhang, San Jose, CA (US); Jianming Zhang, Campbell, CA (US); Feng Liu, Portland, OR (US); Long Mai, Portland, OR (US)

(73) Assignee: Adobe Inc., San Jose, CA (US)

( * ) Notice: Subject to any disclaimer, the term of this patent is extended or adjusted under 35 U.S.C. 154(b) by 45 days.

(21) Appl. No.: 18/930,665

(22) Filed: Oct. 29, 2024

(65) Prior Publication Data

US 2026/0073579 A1 Mar. 12, 2026

Related U.S. Application Data

(60) Provisional application No. 63/693,660, filed on Sep. 11, 2024.

(51) Int. Cl.
*G06T 11/00* (2026.01)
*G06F 40/284* (2020.01)
(Continued)

(52) U.S. Cl.
CPC ............ *G06T 11/00* (2013.01); *G06F 40/284* (2020.01); *G06N 3/0455* (2023.01); *G06N 3/094* (2023.01); *G06T 5/60* (2024.01); *G06T 5/70* (2024.01); *G06T 7/20* (2013.01); *G06V 10/82* (2022.01); *G06V 20/46* (2022.01);
(Continued)

(58) Field of Classification Search
CPC ... G06T 11/00; G06T 5/60; G06T 5/70; G06T 7/20; G06T 2207/10016; G06T 2207/20081; G06T 2207/20084; G06F 40/284; G06N 3/0455; G06N 3/094; G06N 3/045; G06V 10/82; G06V 20/46
See application file for complete search history.

(56) References Cited

U.S. PATENT DOCUMENTS 12,413,829 B2 9/2025 Zhang et al.
2023/0154213 A1 5/2023 Gao et al.
(Continued)

OTHER PUBLICATIONS

Wang K, Deng S, Shi J, Hatzinakos D, Tian Y. Av-dit: Efficient audio-visual diffusion transformer for joint audio and video generation. arXiv preprint arXiv:2406.07686. Jun. 11, 2024.*
(Continued)

*Primary Examiner* — Sarah Lhymn
(74) *Attorney, Agent, or Firm* — Keller Preece PLLC

(57) ABSTRACT

The present disclosure relates to systems, methods, and non-transitory computer-readable media that leverages a dual-variational autoencoder model. For example, the disclosed systems generate an image embedding from a first frame of a sequence of frames by using a two-dimensional variational autoencoder. Moreover, the disclosed systems generate motion embeddings from motion within a video by using a three-dimensional variational autoencoder. Further, the disclosed systems generate a reconstructed image from the image embedding and a reconstructed video from the motion embeddings and the image embedding. Additionally, the disclosed systems modify parameters of a dual-variational autoencoder model based on a measure of accuracy of the reconstructed image and the reconstructed video.

20 Claims, 32 Drawing Sheets

(51) Int. Cl.

| | |
|---|---|
| *G06N 3/0455* | (2023.01) |
| *G06N 3/094* | (2023.01) |
| *G06T 5/60* | (2024.01) |
| *G06T 5/70* | (2024.01) |
| *G06T 7/20* | (2017.01) |
| *G06V 10/82* | (2022.01) |
| *G06V 20/40* | (2022.01) |

(52) U.S. Cl.

CPC ............... *G06T 2207/10016* (2013.01); *G06T 2207/20081* (2013.01); *G06T 2207/20084* (2013.01)

(56) References Cited

U.S. PATENT DOCUMENTS

| | | | |
|---|---|---|---|
| 2023/0206401 A1 | 6/2023 | Liu et al. | |
| 2024/0386249 A1 | 11/2024 | Harvey et al. | |
| 2025/0148753 A1 | 5/2025 | Menashof et al. | |
| 2025/0166236 A1 | 5/2025 | Yazdi et al. | |
| 2025/0175679 A1 | 5/2025 | Zhang et al. | |
| 2025/0252627 A1 | 8/2025 | Park et al. | |
| 2025/0259339 A1 | 8/2025 | Menapace et al. | |
| 2025/0285626 A1* | 9/2025 | Hirschkind | G10L 13/04 |
| 2025/0292472 A1 | 9/2025 | Fang et al. | |
| 2025/0356536 A1 | 11/2025 | Kondratyuk et al. | |
| 2025/0363171 A1* | 11/2025 | Yu | G06T 11/00 |
| 2025/0371426 A1* | 12/2025 | Fortkort | G06N 20/00 |
| 2025/0378342 A1* | 12/2025 | Gupta | G06N 3/0455 |
| 2025/0378591 A1 | 12/2025 | Yu et al. | |
| 2025/0390352 A1* | 12/2025 | Crabtree | G06F 9/5027 |
| 2026/0065429 A1 | 3/2026 | Lorraine et al. | |
| 2026/0136077 A1 | 5/2026 | Babaeizadeh et al. | |

OTHER PUBLICATIONS

Zheng J, Zhao F, Xu Y, Dong X, Liang X. Viton-dit: Learning in-the-wild video try-on from human dance videos via diffusion transformers. arXiv preprint arXiv:2405.18326. May 28, 2024.*

Aditya Ramesh, Mikhail Pavlov, Gabriel Goh, Scott Gray, Chelsea Voss, Alec Radford, Mark Chen, and Ilya Sutskever. "Zero-Shot Text-to-Image Generation". In Marina Meila and Tong Zhang (eds.), Proceedings of the 38th International Conference on Machine Learning, ICML 2021, Jul. 18-24, 2021, Virtual Event, vol. 139 of Proceedings of Machine Learning Research, pp. 8821-8831. PMLR, 2021. <URL: http://proceedings.mlr.press/v139/ramesh21a.html>.

Aditya Ramesh, Prafulla Dhariwal, Alex Nichol, Casey Chu, and Mark Chen. "Hierarchical Text-Conditional Image Generation with CLIP Latents". 27 pages, arXiv preprint arXiv:2108.06805v1, Apr. 13, 2022.

Alec Radford, Karthik Narasimhan, Tim Silamas, and Ilya Sutskever. "Improving Language Understanding by Generative Pre-Training". 12 pages, 2018.

Alec Radford, Jeffrey Wu, Rewon Child, David Luan, Dario Amodei, Ilya Sutskever. "Language Models are Unsupervised Multitask Learners", 24 pages, 2019.

Alex Fang, Albin Madappally Jose, Amit Jain, Ludwig Schmidt, Alexander T. Toshev, and Vaishaal Shankar. Data filtering networks. In The Twelfth International Conference on Learning Representations, ICLR 2024, Vienna, Austria, May 7-11, 2024. OpenReview.net, 2024. <URL: https://openreview.net/forum?id=KAk6ngZ09F>.

Alexey Dosovitskiy. "An Image is Worth 16x16 Words: Transformers for Image Recognition at Scale". 21 pages, arXiv preprint arXiv:2010.11929v1, Oct. 22, 2020.

Ashish Vaswani, Noam Shazeer, Niki Parmar, Jakob Uszkoreit, Llion Jones, Aidan N. Gomez, Lukasz Kaiser and Illia Polosukhin. "Attention Is All You Need". Advances in Neural Information Processing Systems (NIPS), 11 pages, 2017.

Axel Sauer, Frederic Boesel, Tim Dockhorn, Andreas Blattmann, Patrick Esser, and Robin Rombach. "Fast High-Resolution Image Synthesis with Latent Adversarial Diffusion Distillation". 19 pages, arXiv preprint arXiv:2108.06805v1, Mar. 18, 2024.

Black Forest Labs. "Flux". https://github.com/black-forest-labs/flux, 4 pages, 2024.

Bo Li, Yuanhan Zhang, Dong Guo, Renrui Zhang, Feng Li, Hao Zhang, Kaichen Zhang, Yanwei Li, Ziwei Liu, and Chunyuan Li. "LLaVA-OneVision: Easy Visual Task Transfer". 43 pages, arXiv preprint arXiv:2408.03326v3, Oct. 26, 2024.

Chen Sun, Austin Myers, Carl Vondrick, Kevin Murphy, and Cordelia Schmid. "VideoBERT: A Joint Model for Video and Language Representation Learning". In Proceedings of the IEEE/CVF International Conference on Computer Vision (ICCV), pp. 7464-7473, 2019.

Chitwan Saharia, William Chan, Saurabh Saxena, Lala Li, Jay Whang, Emily L Denton, Kamyar Ghasemipour, Raphael Gontijo Lopes, Burcu Karagol Ayan, Tim Salimans, et al. "Photorealistic Text-to-Image Diffusion Models with Deep Language Understanding". Advances in Neural Information Processing Systems (NeurIPS), 35:36479-36494, 2022.

Diederik P Kingma. "Auto-Encoding Variational Bayes". 9 pages, arXiv preprint arXiv:1312.6114v1, Dec. 20, 2013.

Dong Zhang, Shimin Li, Xin Zhang, Jun Zhan, Pengyu Wang, Yaqian Zhou, and Xipeng Qiu. "SpeechGPT: Empowering Large Language Models with Intrinsic Cross-Modal Conversational Abilities", 13 pages, arXiv preprint arXiv:2305.11000v1, May 18, 2023.

Dustin Podell, Zion English, Kyle Lacey, Andreas Blattmann, Tim Dockhorn, Jonas Müller, Joe Penna, and Robin Rombach. SDXL: improving Latent Diffusion Models for High-Resolution Image Synthesis. In The Twelfth International Conference on Learning Representations, ICLR 2024, Vienna, Austria, May 7-11, 2024. OpenReview.net, 2024. <URL: https://openreview.net/forum?id=di52zR8xgf>.

Eric Luhman and Troy Luhman. "Knowledge Distillation in Iterative Generative Models for Improved Sampling Speed". 20 pages, arXiv preprint arXiv:2101.02388v1, Jan. 7, 2021.

Eric Ming Chen, Sidhanth Holalkere, Ruyu Yan, Kai Zhang, and Abe Davis. "Ray Conditioning: Trading Photo-Consistency for Photo-realism in Multi-view Image Generation". In Proceedings of the IEEE/CVF International Conference on Computer Vision 9ICCV), pp. 23242-23251, Oct. 2023.

Ethan Perez, Florian Strub, Harm De Vries, Vincent Dumoulin, and Aaron Courville. "FILM: Visual Reasoning with a General Conditioning Layer". In Proceedings of the AAAI Conference on Artificial Intelligence (AAAI), vol. 32, pp. 3942-3951, Feb. 2, 2018.

FFmpeg Team. FFmpeg: A complete, cross-platform solution to record, convert and stream audio and video. Version 5.1. 2024. <URL: https://ffmpeg.org/>.

Geewook Kim, Hodong Lee, Daehee Kim, Haeji Jung, Sanghee Park, Yoonsik Kim, Sangdoo Yun, Taeho Kil, Bado Lee, and Seunghyun Park. "Visually-Situated Natural Language Understanding with Contrastive Reading Model and Frozen Large Language Models", In Proceedings of the Conference on Empirical Methods in Natural Language Processing, pp. 11989-12010, Dec. 2023.

Hang Zhang, Xin Li, and Lidong Bing. Video-LLaMA: An Instruction-tuned Audio-Visual Language Model for Video Understanding. 13 pages, arXiv preprint arXiv:2306.02858v2, Jun. 6, 2023.

Hao Zhang, Yanbin Hao, and Chong-Wah Ngo. "Token Shift Transformer for Video Classification", MM '21: Proceedings of the 29th ACM International Conference on Multimedia, pp. 917-925, Oct. 17, 2021.

Haotian Liu, Chunyuan Li, Qingyang Wu, and Yong Jae Lee. "Visual Instruction Tuning", In 37th Conference on Neural Information Processing Systems (NeurIPS), 25 pages, 2023.

Haotian Liu, Chunyuan Li, Yuheng Li, Bo Li, Yuanhan Zhang, Sheng Shen, and Yong Jae Lee. "LLaVA-NeXT: Improved Reasoning, OCR, and World Knowledge", 6 pages, Jan. 30, 2024, <URL: https: //llava-vl.github.io/blog/2024-01-30-llava-next/>.

Ian Goodfellow, Jean Pouget-Abadie, Mehdi Mirza, Bing Xu, David Warde-Farley, Sherjil Ozair, Aaron Courville, and Yoshua Bengio. "Generative Adversarial Nets". Advances in Neural Information Processing Systems (NeurIPS), 27, 9 pages, 2014.

James Betker, Gabriel Goh, Li Jing, Tim Brooks, Jianfeng Wang, Linjie Li, Long Ouyang, Juntang Zhuang, Joyce Lee, Yufei Guo, et

(56) References Cited

OTHER PUBLICATIONS al. “Improving Image Generation with Better Captions”. Computer Science. >, 2(3):8, 19 pages, 2023. <URL: https://cdn. openai.com/papers/dall-e-3>.

Jason Baldridge, Jakob Bauer, Mukul Bhutani, Nicole Brichtova, Andrew Bunner, Kelvin Chan, Yichang Chen, Sander Dieleman, Yuqing Du, Zach Eaton-Rosen, et al. “Imagen 3”. 35pages, arXiv preprint arXiv:2408.07009v3, Dec. 21, 2024.

Jianlin Su, Murtadha Ahmed, Yu Lu, Shengfeng Pan, Wen Bo, and Yunfeng Liu. “RoFormer: Enhanced Transformer with Rotary Position Embedding”. 14 pages, arXiv preprint arXiv:2104.098645v5, Nov. 8, 2023.

Johannes Lutz Schönberger and Jan-Michael Frahm. “Structure-from-Motion Revisited”. In Conference on Computer Vision and Pattern Recognition (CVPR), pp. 4104-4113, Jun. 2016.

Jonathan Ho and Tim Salimans. “Classifier-Free Diffusion Guidance”. 14 pages, arXiv preprint arXiv:2207.12598v1, Jul. 26, 2022.

Jonathan Ho, Ajay Jain, and Pieter Abbeel. “Denoising Diffusion Probabilistic Models”. Advances in Neural Information Processing Systems (NeurIPS), 33:6840-6851, 2020.

Julius Plucker. “XVII. On a New Geometry of Space”. Philosophical Transactions of the Royal Society of London, (155):725-791, Jan. 1, 1865.

Junsong Chen, Jincheng Yu, Chongjian Ge, Lewei Yao, Enze Xie, Yue Wu, Zhongdao Wang, James Kwok, Ping Luo, Huchuan Lu, et al. “PIXART-$\alpha$: Fast Training of Diffusion Transformer for Photorealistic Text-to-Image Synthesis”. 31 pages, arXiv preprint arXiv:2310.00426v2, Oct. 16, 2023.

Junyang Lin, An Yang, Yichang Zhang, Jie Liu, Jingren Zhou, and Hongxia Yang. InterBERT: Vision-and-Language Interaction for Multi-modal Pretraining. 11 pages, arXiv preprint arXiv:2003.13198v1, Mar. 30, 2020.

Kuaishou. “Kling”, Jun. 11, 2024. 1 page [online], [Retrieved on Jan. 8, 2025] Retrieved from the Internet, <URL: https://ir.kuaishou.com/news-releases/news-release-details/kuaishou-unveils-proprietary-video-generation-model-kling>.

Lijun Yu, José Lezama, Nitesh B. Gundavarapu, Luca Versari, Kihyuk Sohn, et al. “Language Model Beats Diffusion—Tokenizer is Key to Visual Generation” 17 pages, arXiv preprint arXiv:2310.05737v1, Oct. 9, 2023.

Linting Xue, Aditya Barua, Noah Constant, Rami Al-Rfou, Sharan Narang, Mihir Kale, Adam Roberts, and Colin Raffel. ByT5: Towards a Token-Free Future with Pre-trained Byte-to-Byte Models. Transactions of the Association for Computational Linguistics, 10:291-306, 2022.

Mathilde Caron, Hugo Touvron, Ishan Misra, Hervé Jégou, Julien Mairal, Piotr Bojanowski, and Armand Joulin. “Emerging Properties in Self-Supervised Vision Transformers”. In Proceedings of the IEEE/CVF International Conference on Computer Vision (ICCV), pp. 9650-9660, Oct. 2021.

Mihir Patel, Erica Ji Yuen, Cory Stephenson, and Landan Seguin. How we trained stable diffusion for less than $50k (part 3), Apr. 28, 2023. <URL: https://www.databricks.com/blog/diffusion. Mosaic AI Research, Databricks Blog>.

Minguk Kang, Richard Zhang, Connelly Barnes, Sylvain Paris, Suha Kwak, Jaesik Park, Eli Shechtman, Jun-Yan Zhu, and Taesung Park. “Distilling Diffusion Models into Conditional GANs”. 37 pages, arXiv preprint arXiv:2405.05967v3, Jul. 17, 2024.

Muhammad Maaz, Hanoona Rasheed, Salman Khan, and Fahad Shahbaz Khan. “Video-ChatGPT: Towards Detailed Video Understanding via Large Vision and Language Models”, 16 pages, arXiv preprint arXiv:2306.05424v1, Jun. 8, 2023.

Olaf Ronneberger, Philipp Fischer, and Thomas Brox. “U-Net: Convolutional Networks for Biomedical Image Segmentation”. In Medical image computing and computer-assisted intervention-MICCAI 2015: 18th International Conference, Munich, Germany, Oct. 5-9, 2015, proceedings, part III 18, pp. 234-241. Springer, 2015.

OpenAI. “Sora”, Dec. 9, 2024, 25 pages [online], [Retrieved on Jan. 8, 2025] Retrieved from the Internet, <URL: https://openai.com/sora/>.

Patrick Esser, Sumith Kulal, Andreas Blattmann, Rahim Entezari, Jonas Müller, Harry Saini, Yam Levi, Dominik Lorenz, Axel Sauer, Frederic Boesel, et al. “Scaling Rectified Flow Transformers for High-Resolution Image Synthesis”. In Forty-first International Conference on Machine Learning, 28 pages, 2024.

Peng Gao, Jiaming Han, Renrui Zhang, Ziyi Lin, Shijie Geng, Aojun Zhou, Wei Zhang, Pan Lu, Conghui He, Xiangyu Yue, Hongsheng Li, and Yu Qiao. “LLaMA-Adapter V2: Parameter-Efficient Visual Instruction Model” 15 pages, arXiv preprint arXiv:2304.15010v1, Apr. 28, 2023.

Peng Gao, Le Zhuo, Ziyi Lin, Chris Liu, Junsong Chen, Ruoyi Du, Enze Xie, Xu Luo, Longtian Qiu, Yuhang Zhang, et al. “Lumina-t2x: Transforming text into Any Modality, Resolution, and Duration via Flow-based Large Diffusion Transformers”. 39 pages, arXiv preprint arXiv:2405.05945v3, Jun. 13, 2024.

Prafulla Dhariwal and Alexander Nichol. “Diffusion Models Beat GANs on Image Synthesis”. Advances in neural information processing systems, 34:8780-8794, Nov. 2021.

Qinghao Ye, Haiyang Xu, Guohai Xu, Jiabo Ye, Ming Yan, Yiyang Zhou, Junyang Wang, Anwen Hu, Pengcheng Shi, et al. “mPLUGg-Owl: Modularization Empowers Large Language Models with Multimodality”, 21 pages, arXiv preprint arXiv:2304.14178v1, Apr. 27, 2023.

Renrui Zhang, Jiaming Han, Chris Liu, Peng Gao, Aojun Zhou, Xiangfei Hu, Shilin Yan, Pan Lu, Hongsheng Li, and Yu Qiao. “LLaMA-Adapter: Efficient Fine-tuning of Language Models with Zero-init Attention”, 22 pages, arXiv preprint arXiv:2303.16199v2, Jun. 14, 2023.

Robin Rombach, Andreas Blattmann, Dominik Lorenz, Patrick Esser, and Björn Ommer. “High-Resolution Image Synthesis with Latent Diffusion Models”. In Proceedings of the IEEE/CVF Conference on Computer Vision and Pattern Recognition (CVPR), pp. 10684-10695, 2022.

Rongjie Huang, Mingze Li, Dongchao Yang, Jiatong Shi, Xuankai Chang, Zhenhui Ye, Yuning Wu, Zhiqing Hong, Jia-Bin Huang, Jinglin Liu, Yixiang Ren, Zhou Zhao, and Shinji Watanabe. “AudioGPT: Understanding and Generating Speech, Music, Sound, and Talking Head”. 14 pages, ArXiv, abs/2304.12995v1, Apr. 25, 2023.

Runway. “Gen-3”, Jun. 17, 2024, 12 pages [online], [Retrieved on Jan. 8, 2025] Retrieved from the Internet, <URL: https://runwayml.com/research/introducing-gen-3-alpha>.

Ryan Webster, Julien Rabin, Loïc Simon, and Frédéric Jurie. “On the De-duplication of LAION-2B”. 7 pages, arXiv preprint arXiv:2108.06805, Mar. 17, 2023.

Shuiwang Ji, Wei Xu, Ming Yang, and Kai Yu. “3D Convolutional Neural Networks for Human Action Recognition”. IEEE Transactions on Pattern Analysis and Machine Intelligence, 35(1):221-231, Mar. 6, 2012.

Simran Arora, Sabri Eyuboglu, Amin Timalsina, Isys Johnson, Michael Poli, James Zou, Atri Rudra and Christopher Re. “Zoology: Measuring and Improving Recall in Efficient Language Models”, 69 pages, arXiv preprint arXiv:2312.04927v1, Dec. 8, 2023.

Tianwei Yin, Michaël Gharbi, Taesung Park, Richard Zhang, Eli Shechtman, Fredo Durand, and William T Freeman. “Improved Distribution Matching Distillation for Fast Image Synthesis”. 26 pages, arXiv preprint arXiv:2405.14867v1, May 23, 2024.

Tianwei Yin, Michaël Gharbi, Richard Zhang, Eli Shechtman, Fredo Durand, William T Freeman, and Taesung Park. “One-step Diffusion with Distribution Matching Distillation”. In Proceedings of the IEEE/CVF Conference on Computer Vision and Pattern Recognition (CVPR), pp. 6613-6623, 2024.

Tim Brooks, Bill Peebles, Connor Holmes, Will DePue, Yufei Guo, Li Jing, David Schnurr, Joe Taylor, Troy Luhman, Eric Luhman, Clarence Ng, Ricky Wang, and Aditya Ramesh. “Video Generation Models as World Simulators”. 42 pages, Feb. 15, 2024. <URL: https://openai.com/research/video-generation-models-as-world-simulators>.

Tom B Brown. “Language Models are Few-Shot Learners”. 75 pages, arXiv preprint arXiv:2005.14165v4, Jul. 22, 2020.

(56) References Cited

OTHER PUBLICATIONS

Tri Dao, Daniel Y. Fu, Stefano Ermon, Atri Rudra and Christopher Ré. "FLASHATTENTION: Fast and Memory Efficient Exact Attention with IO-Awareness", In 36th Conference on Neural Information Processing Systems (NeurIPS) 16 pages, Nov. 2022.
William Peebles and Saining Xie. "Scalable Diffusion Models with Transformers". In Proceedings of the IEEE/CVF International Conference on Computer Vision (ICCV), pp. 4195-4205, 2023.
Xingchao Liu, Chengyue Gong, and Qiang Liu. "Flow Straight and Fast: Learning to Generate and Transfer Data with Rectified Flow". 41 pages, arXiv preprint arXiv:2209.03003v1, Sep. 7, 2022.
Yang Song, Jascha Sohl-Dickstein, Diederik P Kingma, Abhishek Kumar, Stefano Ermon, and Ben Poole. "Score-Based Generative Modeling Through Stochastic Differential Equations". 32 pages, arXiv preprint arXiv:2011.13456v1, Nov. 26, 2020.
Yaron Lipman, Ricky TQ Chen, Heli Ben-Hamu, Maximilian Nickel, and Matt Le. "Flow Matching for Generative Modeling". 24 pages, arXiv preprint arXiv:2210.02747v1, Oct. 6, 2022.
Yinghao Xu, Hao Tan, Fujun Luan, Sai Bi, Peng Wang, Jiahao Li, Zifan Shi, Kalyan Sunkavalli, Gordon Wetzstein, Zexiang Xu, et al. "DMV3D: Denoising Multi-View Diffusion Using 3D Large Reconstruction Model". 18 pages, arXiv preprint arXiv:2311.09217v1, Nov. 15, 2023.
Yinhan Liu, Jiatao Gu, Naman Goyal, Xian Li, Sergey Edunov, Marjan Ghazvininejad, Mike Lewis, and Luke Zettlemoyer. "Multilingual Denoising Pre-training for Neural Machine Translation", 17 pages Jan. 23, 2020, <URL: https://arxiv.org/abs/2001.08210>.
Zachary Teed and Jia Deng. "RAFT: Recurrent All-Pairs Field Transforms for Optical Flow". In Computer Vision—ECCV 2020: 16th European Conference, Glasgow, UK, Aug. 23-28, 2020, Proceedings, Part II 16, pp. 402-419. Springer, 2020.
Zhe Chen, Jiannan Wu, Wenhai Wang, Weijie Su, Guo Chen, Sen Xing, Muyan Zhong, Qinglong Zhang, Xizhou Zhu, Lewei Lu, et al. "InternVL: Scaling up Vision Foundation Models and Aligning for Generic Visual-Linguistic Tasks". In Proceedings of the IEEE/CVF Conference on Computer Vision and Pattern Recognition (CVPR), pp. 24185-24198, Jun. 2024.
Mingxiao Li, Bo Wan, Marie-Francine Moens, Tinne Tuytelaars, "Animate Your Motion: Turning Still Images into Dynamic Videos", 22 pages, arXiv preprint arXiv:2403.10179v1, Mar. 15, 2024.
Combined Search and Examination Report as received in United Kingdom Application No. 2508367.6 dated Nov. 6, 2025.
U.S. Appl. No. 18/930,672, mailed Sep. 22, 2026, Office Action.
U.S. Appl. No. 18/930,681, mailed Sep. 16, 2026, Notice of Allowance.
U.S. Appl. No. 19/035,556, mailed Sep. 14, 2026, Office Action.
Le Zhuo et al. "Lumina-Next: Making Lumina-T2X Stronger and Faster with Next-DiT", Advances in Neural Information Processing Systems 37 (2024): 131278-131315. (Year: 2024).
U.S. Appl. No. 18/930,672, mailed Jun. 2, 2026, Office Action.

* cited by examiner

Text Prompt 1608
Entering A Martian Cave To Reveal An Alien Colony Hidden Within, Cinematic FPV.

DUAL-VAE FOR MORE EFFICIENT AND EFFECTIVE DIFFUSION MODEL TRAINING

CROSS REFERENCE TO RELATED APPLICATIONS

This application claims the benefit of and priority to U.S. Provisional Application No. 63/693,660, filed Sep. 11, 2024. The aforementioned application is hereby incorporated by reference in its entirety.

BACKGROUND

Recent years have seen significant advancement in hardware and software platforms for performing generative tasks. Indeed, systems provide a variety of ways to generate static images and dynamic videos. For instance, systems create distinct architectures for generating content in different modalities. Despite the advances in generative tasks, systems suffer from a number of deficiencies with regards to accuracy, efficiency, and operational flexibility.

SUMMARY

One or more embodiments described herein provide benefits and/or solve one or more problems in the art with systems, methods, and non-transitory computer-readable media that implement an artificial intelligence architecture to synthesize media (e.g., video or images). In one or more embodiments, the disclosed systems generate parameters of a dual-variational autoencoder model by reconstructing frames of a video. Specifically, the disclosed systems use a two-dimensional variational autoencoder to generate an image embedding for an initial frame of a sequence of frames and further uses a three-dimensional variational autoencoder to generate motion embeddings for the sequence of frames (e.g., the disclosed systems reconstruct an image from the image embedding and video from the motion embeddings and determines a measure of accuracy). Moreover, in some embodiments, the disclosed systems use the dual-variational autoencoder model to enable a novel training strategy of a diffusion transformer model that occurs in a plug-in manner (e.g., an initial training stage on image embeddings and subsequent training stages on motion embeddings).

In one or more embodiments, the disclosed systems include a single stream transformer designed to synthesize media (e.g., video or images) from a request prompt. Specifically, the disclosed systems use a single stream transformer model that includes a self-attention layer and a multi-layer perceptron. For example, the disclosed systems use the single stream transformer model to unify diverse inputs and enable a seamless knowledge transfer between different modalities. For instance, the disclosed systems remove noise from noised tokens (e.g., in a manner that incorporates context indicated by text tokens, image tokens, or a token-level diffusion timestep embedding) using the single stream transformer to generate an image or a video from the noised tokens.

In one or more embodiments, the disclosed systems unify diverse inputs by treating them as positional encodings to enable a seamless knowledge transfer between different modalities. Moreover, the disclosed systems utilize an improved positional encoding strategy for video tokens. Specifically, the disclosed systems utilize a centered two-dimensional coordinate map for creating spatial embeddings and timestamp data for creating temporal embeddings.

Accordingly, at inference time, the disclosed systems demonstrate improved generative capabilities for generating digital media using artificial intelligence systems.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
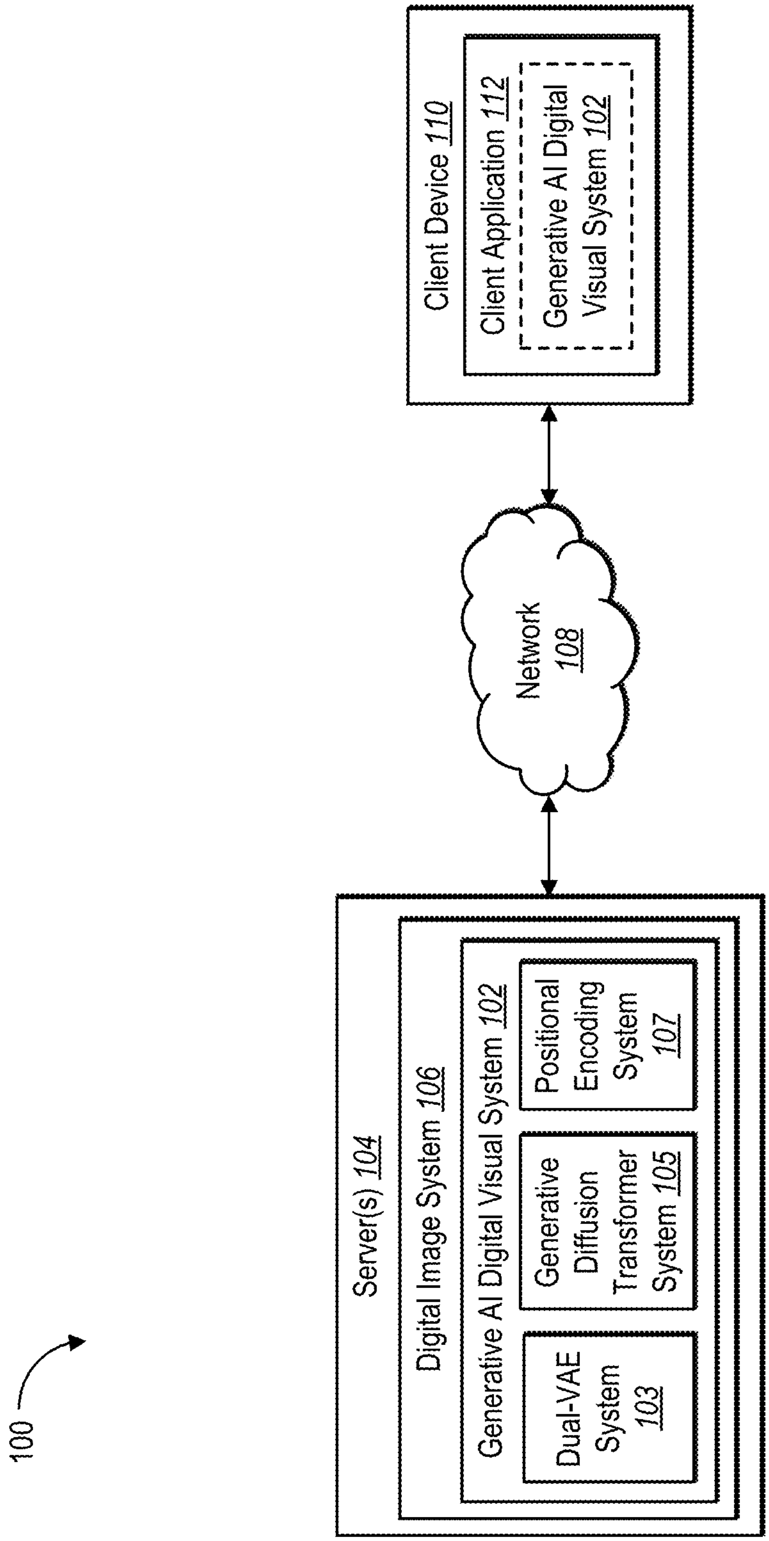
FIG. 1 illustrates an example environment in which a generative AI digital visual system operates in accordance with one or more implementations.

One or more embodiments described herein includes a single-stream transformer for digital media generation using latent-space diffusion. For example, a generative AI digital visual system unifies diverse inputs (e.g., diffusion timesteps, pixel locations, frame timestamps, camera Plucker rays) and treats them as positional encodings for noised tokens. Specifically, in one or more embodiments, the generative AI digital visual system processes visual tokens alongside text tokens through a full self-attention transformer block at each diffusion step to generate digital media content (e.g., the generative AI digital visual system generates video and/or images from a text prompt and/or a visual prompt).

In one or more embodiments, in order to prepare the single-stream transformer for using latent-space diffusion, the generative AI digital visual system leverages a dual-variational autoencoder model (to encode video frames and image/key-frames) to ensure a high quality of both image and video generation (e.g., the dual-variational autoencoder enables more flexible and efficient training of the diffusion transformer model). In other words, the generative AI digital visual system utilizes the dual-variational autoencoder model to prepare training content for a diffusion model. Specifically, the generative AI digital visual system implements a structural design that includes a two-dimensional-VAE and a three-dimensional-VAE. For instance, the two-dimensional-VAE ensures high quality image reconstruction, and the three-dimensional-VAE achieves improved motion encoding. Further, image/key-frames from the two-dimensional-VAE anchor the visual quality of reconstructed video. By utilizing the dual-variational autoencoder model to optimize/train a diffusion model, the generative AI digital visual system achieves better quality (at inference time) in both image and video.

Furthermore, the generative AI digital visual system uses improved positional embedding and training techniques for training diffusion models. Specifically, the generative AI digital visual system uses a positional encoding strategy for video tokens that includes a centered two-dimensional coordinate map, aspect ratio-aware spatial positional encoding scheme and a hierarchical, bidirectional wall-time temporal positional encoding scheme (e.g., timestamps and inverse timestamps). In other words, the generative AI digital visual system uses a centered xy-coordinate map to index the location of each noised token and further uses timestamps to track the temporal aspect of a noised token. In doing so, the generative AI digital visual system incorporates context for how a diffusion model should remove noise from the noised token (e.g., according to the spatial-temporal positional encodings). Additionally, the generative AI digital visual system leverages a mixed training and data strategy that includes image training, key-frame training, and video clip training (sequentially in a plug-in manner) to optimize a diffusion model.

As mentioned, the generative AI digital visual system optimizes/trains a diffusion model with the dual-variational autoencoder model and improved positional encoding. Specifically, in one or more embodiments, the generative AI digital visual system trains the diffusion transformer model that includes a single-stream transformer, which includes a computationally low-resource consuming model (e.g., relative to existing diffusion transformers as it uses a simplified architecture that includes a self-attention layer and a multi-layer perceptron). Furthermore, the generative AI digital visual system uses a diffusion transformer model that uses token-level diffusion timestep embeddings to guide the denoising process. Accordingly, the generative AI digital visual system at inference time is primed to generate high quality and accurate visual content.

As mentioned above, conventional systems suffer from a variety of issues related to accuracy, efficiency, and operational flexibility. Specifically, conventional systems suffer from computational inaccuracies. For example, conventional systems perform both image and video generation, however, when performing generative tasks, conventional systems fail to simultaneously preserve high-quality image and video reconstruction. In other words, conventional systems are typically configured to favor either image generation or video generation but fail to perform generative tasks that involve both image and video while doing it in an accurate and high-quality manner.

Furthermore, conventional systems generate image or video from a user-provided text prompt, however conventional systems suffer from generating content that does not have a strong text and image/video semantic alignment (e.g., conventional systems generate inaccurate media that does not align with a user-provided prompt). Furthermore, the content generated by conventional systems is typically low-quality pixel content. In addition, conventional systems use various methods to encode the spatial and temporal relationship among frames of a video that correspond to visual tokens. However, for video generation, conventional systems use methods that create misalignments (e.g., between video frames and video captions) which leads to confusion and inaccuracies during training a model. For instance, conventional systems generate distorted or misaligned frames in a video that are not aesthetically pleasing. In other words, conventional systems that encode spatial and temporal relationships often suffer from generating low-quality frames and/or compromised frames that fail to capture the subject of the request.

As mentioned above, conventional systems further suffer from computational inefficiencies. For example, conventional systems that perform image and video generation typically suffer from consuming a high number of resources. Specifically, conventional systems waste a large amount of time and computing resources to train a diffusion model from scratch. For instance, any updates performed on a model for capturing motion information requires conventional systems to train a diffusion model from the bottom up (e.g., from scratch). As such, conventional systems consume a lot of resources to prepare models for media generation tasks, but still perform generative tasks in an inaccurate and inefficient manner.

Moreover, conventional systems suffer from further inefficiencies by using complicated transformer-based architectures. Specifically, in order for conventional systems to generate video and image content, conventional systems typically require domain specific complexity for the model architecture to capture all the domain specific data. Accordingly, conventional systems require a lot of time and resources to run a model that generates content across domains.

Relatedly, conventional systems suffer from operational inflexibilities. For example, due to the various inaccuracies and inefficiencies described above, conventional systems struggle to provide robust generative media content in response to a media generation request. Specifically, conventional systems generate low-quality video that fails to conform with user-specified requests, and conventional systems further consume a vast number of resources and time to generate the low-quality video.

In one or more embodiments, the generative AI digital visual system provides several improvements over conventional systems in relation to accuracy, efficiency, and operational flexibility. In contrast to conventional systems which fail to simultaneously preserve high-quality image and video reconstruction, the generative AI digital visual system uses a dual-variational autoencoder model to ensure high-quality image and video reconstruction. Specifically, the generative AI digital visual system uses a two-dimensional-VAE to create image/key-frame embeddings and a three-dimensional-VAE to create motion embeddings. The dual approach used by the generative AI digital visual system captures a higher quality reconstruction of both image and video.

Further, in contrast to conventional systems which do not have a strong text and image/video semantic alignment, in one or more embodiments, the generative AI digital visual system improves upon accuracy by using a diffusion transformer model architecture that effectively captures semantic alignment across modalities (e.g., text, image, and video). Specifically, the generative AI digital visual system 102 implements a single-stream full self-attention architecture with token-level diffusion timestep embeddings (e.g., spatial-temporal positional encodings) to improve the accuracy of generating visual content. For instance, the generative AI digital visual system demonstrates strong performance of generating accurate image/video that has strong text and image/video semantic alignment (e.g., the generative content is responsive to a user-provided prompt).

In addition, in contrast to conventional systems which suffer from misalignments in performing generative tasks, in one or more embodiments, the generative AI digital visual system improves accuracy by using an improved positional embedding scheme. Specifically, the generative AI digital visual system uses positional embedding for video tokens that includes a centered two-dimensional, aspect ratio-aware spatial positional embedding scheme along with a hierarchical, bidirectional wall-time temporal positional embedding scheme. In other words, the generative AI digital visual system more accurately considers the spatial and temporal location of image patches within a video frame of a sequence of frames in a video (e.g., and also frames relative to other frames in a sequence of frames). In doing so, the generative AI digital visual system generates more accurate media content (e.g., relative to conventional systems) that captures nuanced media attributes (e.g., video attributes) better than conventional systems.

Moreover, in one or more embodiments, the generative AI digital visual system enables a new training strategy for a diffusion transformer model that improves upon the efficiency and operational flexibility relative to conventional systems. For example, the generative AI digital visual system utilizes the dual-variational autoencoder model to decouple the latent space and allow the diffusion transformer model to be trained in a plug-in manner. In other words, the generative AI digital visual system trains the diffusion transformer model on two-dimensional-variational autoencoder embeddings separately from three-dimensional-variational autoencoder embeddings. For instance, the generative AI digital visual system first trains the diffusion transformer model on the outputs of the two-dimensional variational autoencoder (embeddings for image/key-frames) and then fine-tunes the diffusion transformer model with the outputs of the three-dimensional variational autoencoder (e.g., motion frames). In doing so, the generative AI digital visual system avoids having to train a diffusion transformer model from scratch when there is a slight update or modification to the motion aspect of video generation. Instead, the generative AI digital visual system incrementally modifies/fine-tunes the diffusion transformer model in an efficient and effective manner.

Furthermore, in one or more embodiments, the generative AI digital visual system improves upon operational flexibility. For example, the generative AI digital visual system uses a mixed training and data strategy (e.g., by leveraging improved positional encoding and the dual-variational autoencoder model) to improve the diversity of content generation and the quality/accuracy of content generation. Accordingly, the generative AI digital visual system enables a unified multi-modality transformer model to generate accurate, efficient, and high-quality content (relative to conventional systems).

Additional details regarding the generative AI digital visual system will now be provided with reference to the figures. For example, FIG. 1 illustrates a schematic diagram of an exemplary system environment 100 in which a generative AI digital visual system 102 operates. As illustrated in FIG. 1, the system environment 100 includes server(s) 104, a digital image system 106, a network 108, and a client device 110. Additionally, FIG. 1 illustrates that the digital image system 106 includes the generative AI digital visual system 102 and the generative AI digital visual system 102 further includes a dual-VAE system 103, a generative diffusion transformer system 105, and a positional encoding system 107.

Although the system environment 100 of FIG. 1 is depicted as having a particular number of components, the system environment 100 is capable of having a different number of additional or alternative components (e.g., a different number of servers, client devices, or other components in communication with the generative AI digital visual system 102 via the network 108). Similarly, although FIG. 1 illustrates a particular arrangement of the server(s) 104, the network 108, and the client device 110, various additional arrangements are possible.

The server(s) 104, the network 108, and the client device 110 are communicatively coupled with each other either directly or indirectly (e.g., through the network 108 discussed in greater detail below in relation to FIG. 25). Moreover, the server(s) 104 and the client device 110 include one or more of a variety of computing devices (including one or more computing devices as discussed in greater detail in relation to FIG. 25).

As mentioned above, the system environment 100 includes the server(s) 104. In one or more embodiments, the server(s) 104 process input for a media generation request (e.g., a multi-modal generation request such as text-to-image, text-to-video, and/or image-to-video) or for training one or more artificial intelligence models. In one or more embodiments, the server(s) 104 comprise a data server. In some implementations, the server(s) 104 comprise a communication server or a web-hosting server.

In one or more embodiments, the client device 110 includes computing devices associated with the one or more user accounts that submit media generations requests for the generative AI digital visual system 102 to generate media (e.g., based on a text prompt and/or a visual prompt). For instance, the generative AI digital visual system 102 trains one or more models (e.g., the dual-variational autoencoder model part of the dual-VAE system 103 and/or the diffusion transformer model part of the generative diffusion transformer system 105) from data by using the techniques of the dual-VAE system 103, the generative diffusion transformer system 105, and the positional encoding system 107.

In one or more embodiments, the client device 110 includes smartphones, tablets, desktop computers, laptop computers, head-mounted-display devices, or other electronic devices. The client device 110 includes one or more software applications (e.g., the digital image application 112 includes a digital image editing application) for generating content in accordance with the digital image system 106. In one or more embodiments, the digital image application includes a software application hosted on the server(s) 104 accessible by the client device 110 through another application, such as a web browser.

To provide an example implementation, in one or more embodiments, generative AI digital visual system 102 on the server(s) 104 supports the generative AI digital visual system 102 on the client device 110. For instance, in some cases, the digital image system 106 on the server(s) 104 gathers data for the generative AI digital visual system 102. In response, the generative AI digital visual system 102, via the server(s) 104, provides the information to the client device 110. In other words, the client device 110 obtains (e.g., downloads) the generative AI digital visual system 102 from the server(s) 104. Once downloaded, the generative AI digital visual system 102 on the client device 110 provides tools for indicating an instructions to the generative AI digital visual system 102 to create media.

In alternative implementations, the generative AI digital visual system 102 includes a web hosting application that allows the client device 110 to interact with content and services hosted on the server(s) 104. To illustrate, in one or more implementations, the client device 110 access a software application supported by the server(s) 104. In response, the generative AI digital visual system 102 on the server(s) 104 provides tools for inputting instructions to generate digital visual content (e.g., a video with video captions and images).

Furthermore, in some implementations, the generative AI digital visual system 102 trains one or more artificial intelligence models by interacting with the dual-VAE system 103 to generate image embeddings and motion embeddings and further utilizes the embeddings to optimize parameters of a diffusion transformer model (e.g., a diffusion transformer model implemented by the generative diffusion transformer system 105). Moreover, in one or more embodiments, the generative AI digital visual system 102 interacts with the positional encoding system 107 to generate improved positional encodings that capture spatial and temporal information for image patches in a frame of a sequence of frames. For instance, the generative AI digital visual system 102 leverages the positional encodings to further improve/optimize the parameters of a diffusion transformer model.

Indeed, in one or more embodiments, the generative AI digital visual system 102 is implemented in whole, or in part, by the individual elements of the system environment 100. For instance, although FIG. 1 illustrates the generative AI digital visual system 102 implemented or hosted on the server(s) 104, different components of the generative AI digital visual system 102 are able to be implemented by a variety of devices within the system environment 100. For example, one or more (or all) components of the generative AI digital visual system 102 are implemented by a different computing device or a separate server from the server(s) 104. Indeed, as shown in FIG. 1, the client device 110 includes the generative AI digital visual system 102. Example components of the generative AI digital visual system 102 will be described below with regard to FIG. 17.

Figure 2:
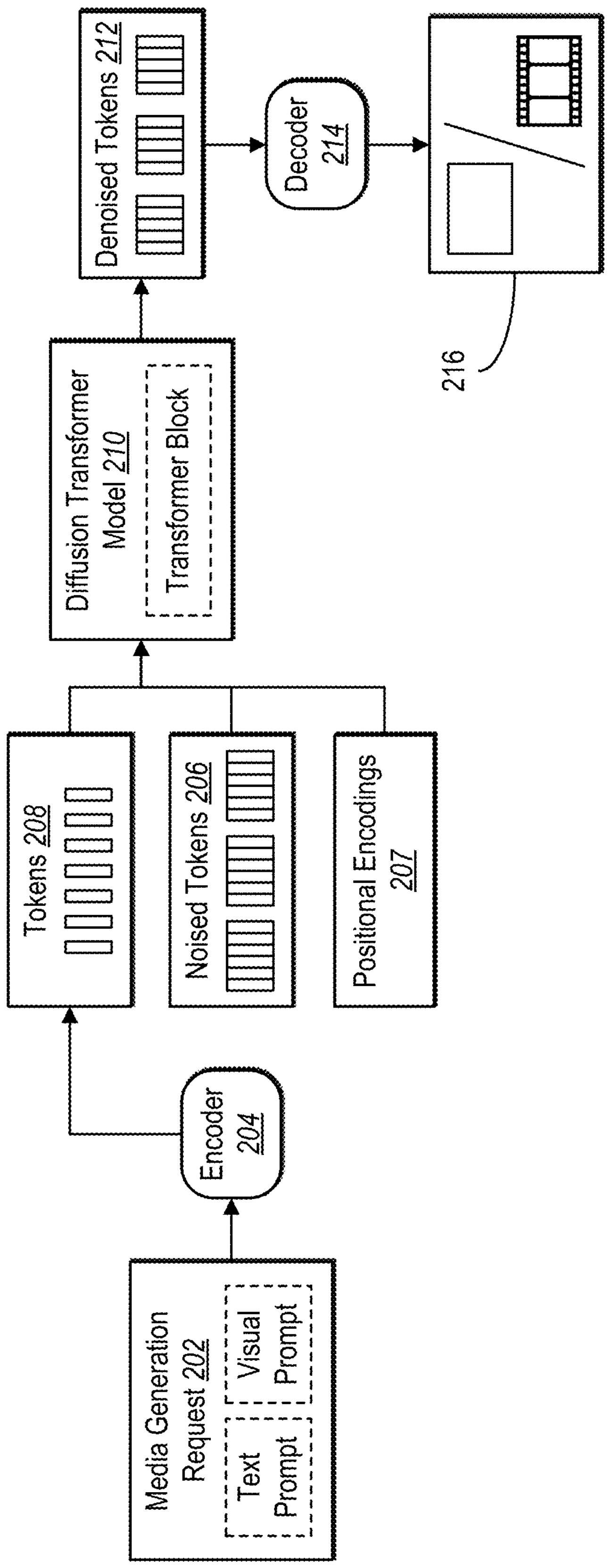
FIG. 2 illustrates an overview diagram of the generative AI digital visual system generating an image or a video by using a diffusion transformer model in accordance with one or more implementations.

As mentioned above, the generative AI digital visual system 102 generates image or video content in response to a media generation request by using a diffusion transformer model. FIG. 2 illustrates an overview diagram of the generative AI digital visual system 102 generating tokens and noised tokens in response to a media generation request and further generating an image or video utilizing a diffusion model to remove noise from noised tokens in accordance with one or more embodiments.

As shown in FIG. 2, the generative AI digital visual system 102 receives a media generation request 202. As shown, in one or more embodiments, the media generation request 202 includes at least one of a text prompt or a visual prompt. The text prompt is discussed below in FIG. 3 and the visual prompt is discussed below in FIG. 4. In one or more embodiments, the media generation request 202 refers to the generative AI digital visual system 102 receiving a request to generate media that includes at least one of a digital image, a digital video, text, and other forms of digital media. Specifically, the generative AI digital visual system 102 receives a request in the form of a prompt from a client device to generate media that conforms with the prompt. For instance, the generative AI digital visual system 102 receives the media generation request 202 as a text prompt or a visual prompt. To illustrate, the media generation request 202 includes specific media attributes (e.g., media parameters or media settings) for the generative AI digital visual system 102 to generate within media. In particular, the media attributes include a type of media (e.g., an image or a video), a format of the media, a subject matter of the media, a style of the media, a mood or theme, and any additional details (e.g., aspect ratio, frames per second, shot size, camera angle, a type of motion such as zooming in or zooming out, etc.).

As shown in FIG. 2, the generative AI digital visual system 102 utilizes the encoder 204 (e.g., a dual-VAE encoder and/or a text encoder) to generate tokens 208 from the media generation request 202. In one or more embodiments, a token refers to a discrete unit of representation for an input (e.g., a text prompt input and/or a visual prompt input) that a transformer-based model process. For instance, the generative AI digital visual system 102 breaks up a frame of a sequence of frames into a sequence of tokens where each token in the sequence of tokens represents different image patch. In one or more embodiments, the encoder further transforms the text/visual prompts into a latent space as part of generating the tokens.

As shown in FIG. 2, the generative AI digital visual system 102 further utilizes noised tokens 206 in tandem with the tokens 208. In one or more embodiments, the generative AI digital visual system 102 generates the noised tokens 206. Specifically, at inference time (e.g., runtime), the generative AI digital visual system 102 utilizes a diffusion transformer model to process the noised tokens 206. For instance, the generative AI digital visual system 102 adds or generates random noise to generate the noised tokens. For instance, the generative AI digital visual system 102 generates the noised tokens by generating Gaussian noise sampled from a normal distribution with a mean of zero and a specified standard deviation.

Furthermore, FIG. 2 shows positional encodings 207. In one or more embodiments, the positional encodings 207 refers to data that provides information to the generative AI digital visual system 102 about the position of tokens in a sequence (e.g., the position of a concept indicated by a word/sub-word in a text prompt relative to other words/sub-words, and/or the position of an image patch in a frame of a video and/or the position of a frame relative to other frames of a video). As mentioned above, the generative AI digital visual system 102 treats diffusion timesteps, pixel locations, frame timestamps, camera Plucker rays, multi-frames of a video, and multi-views (for three-dimensional content) as the positional encodings 207 (e.g., for training and inference purposes). In one or more embodiments, the tokens 208 and the positional encodings 207 act as a guide to a diffusion transformer model 210 for removing noise/denoising the noised tokens 206. Additional details of the positional encodings 207 is given below in FIG. 5, FIG. 7 and FIGS. 11-14.

In one or more embodiments a machine learning model includes a computer algorithm or a collection of computer algorithms that are trained and/or tuned based on inputs to approximate unknown functions. For example, a machine learning model includes a computer algorithm with branches, weights, or parameters that changed based on training data to improve for a particular task. Thus, a machine learning model utilizes one or more learning techniques to improve in accuracy and/or effectiveness. Example machine learning models include various types of decision trees, support vector machines, Bayesian networks, random forest models, or neural networks (e.g., deep neural networks).

Similarly, a neural network includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in one or more embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In one or more embodiments, a neural network includes a combination of neural networks or neural network components.

In one or more embodiments, the generative AI digital visual system 102 utilizes a diffusion model as the neural network. For example, the diffusion model refers to a generative machine learning model that reconstructs data by removing noised input data. Specifically, the generative AI digital visual system 102 trains the diffusion model to remove noise, compares a denoised representation to a ground truth, and modifies parameters of the diffusion model.

In one or more embodiments, the generative AI digital visual system 102 utilizes the diffusion transformer model 210. Specifically, the diffusion transformer model 210 refers to a model architecture that leverages principles of diffusion models with a transformer architecture. For example, the diffusion transformer model 210 includes deep learning self-attention mechanisms that process sequential data. For instance, the diffusion transformer model 210 establishes relationships between elements in a sequence using self-attention mechanisms. To illustrate, the generative AI digital visual system 102 utilizes the diffusion transformer model 210 to denoise noised representations (e.g., noised tokens) at a transformer block and to reconstruct data and generate media (e.g., video, images, text, etc.).

As shown in FIG. 2, the generative AI digital visual system 102 utilizes the diffusion transformer model 210 to generate denoised tokens 212. In one or more embodiments, the generative AI digital visual system 102 generates the denoised tokens 212 from the noised tokens 206 using a single stream transformer (e.g., the diffusion transformer model 210). Specifically, the denoised tokens 212 refers to a clean version of data in which noise added to data has been removed according conditioned or informed by the tokens 208 and the positional encodings 207. For instance, over a number of denoising timesteps (e.g., transformer blocks), the generative AI digital visual system 102 utilizes the diffusion transformer model 210 to remove the noise from the noised tokens according to various guides (e.g., the tokens 208, position encodings which are described in more details below, and token-level timestep embeddings, which are also described in more detail below).

Further, FIG. 2 shows the generative AI digital visual system 102 utilizes a decoder 214 to generate media 216. In one or more embodiments, the generative AI digital visual system 102 processes denoised tokens with the decoder 214 to generate the media 216. Specifically, the generative AI digital visual system 102 generates an image or a video from denoised tokens. For instance, in one or more embodiments, the generative AI digital visual system 102 utilizes the decoder 214 that includes one or more layers (e.g., linear transformation, self-attention layer, softmax layer, etc.) to transform the denoised tokens 212 into the media 216. In one or more embodiments, the generative AI digital visual system 102 utilizes one or more decoders of a dual-variational autoencoder model. Specifically, the decoder 214 transforms denoised tokens in the latent space to images/frames in the pixel space. Additional details of the decoder and the dual-variational autoencoder model is provided below.

As mentioned, the generative AI digital visual system 102 generates media 216 that includes a digital image or a digital video. For example, a video refers to a form of media that is encoded and stored in a digital format. Specifically, a video includes a sequence of frames (e.g., images, keyframes, and/or motion frames) and each frame of the sequence of frames is displayed sequentially. For instance, a video includes a specific resolution (480p, 720p, 1080p, 4K, etc.) which refers to a specific number of pixels being displayed (e.g., a video's resolution defines the clarity and sharpness of the video). Further, a video includes a frame rate (e.g., a number of frames shown per second in a video e.g., 24 fps, 30 fps, etc.), an aspect ratio (e.g., the width and height dimensions of a frame, such as 16:9 or 4:3), compression (e.g., a file size of the video), and audio that goes along with the video (e.g., audio files that are synchronized with frames of the video).

In one or more embodiments, a digital image includes various pictorial elements. In particular, the pictorial elements include pixel values that define the spatial and visual aspects of the digital image such as text and image objects. For example, the digital image is a rasterized image which includes a grid of pixels. In particular, the rasterized image includes a fixed resolution as determined by a number of pixels within the digital image. In some instances, the generative AI digital visual system 102 generates a vectorized image which refers to a type of digital image represented by mathematical equations, rather than pixels. Specifically, vectorized images are composed of geometric shapes (e.g., lines, points, curves) and in one or more embodiments are resized indefinitely without loss of quality.

Figure 3:
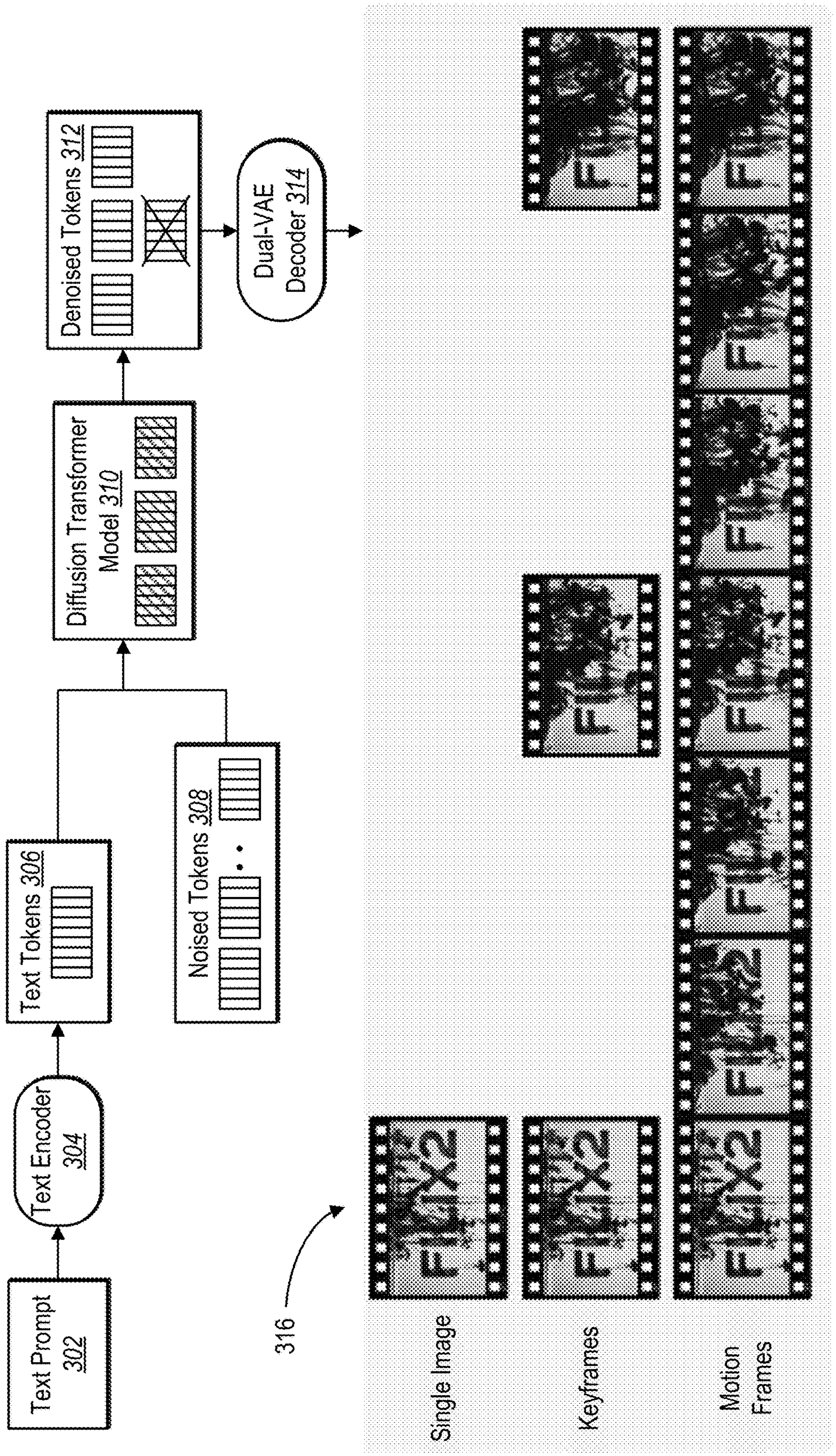
FIG. 3 illustrates a diagram of the generative AI digital visual system using a diffusion model to generate a video from a text prompt in accordance with one or more implementations.

FIG. 3 shows additional details of the generative AI digital visual system 102 processing a text prompt to generate a digital video in accordance with one or more embodiments. As mentioned above, in one or more embodiments, the media generation request is a text prompt 302. In one or more embodiments, the generative AI digital visual system 102 receives the text prompt 302 from a client device that textually describes content to be included within media generated by the generative AI digital visual system 102. For instance, the text prompt 302 describes specific media attributes to be included in the media generated by the generative AI digital visual system 102 (as described above in the media generation request).

As further shown in FIG. 3, the generative AI digital visual system 102 utilizes a text encoder 304 to process the text prompt 302. In one or more embodiments, the text encoder 304 includes a component of a neural network to transform textual data (e.g., the text prompt) into a numerical representation (e.g., into a latent space). For instance, the generative AI digital visual system 102 utilizes the text encoder 304 to transform the text prompt 302 into a text encoding (e.g., text tokens). To illustrate, the generative AI digital visual system 102 utilizes a T5 text encoder or another text encoder, which is a text-to-text transfer transformer where the input text from the text prompt is tokenized into sub-word units and further converted to represent its semantic meaning.

Further, the generative AI digital visual system 102 utilizes the text encoder in a variety of ways. For instance, the generative AI digital visual system 102 utilizes the text encoder 304 to i) determine the frequency of individual words in the text prompt (e.g., each word becomes a feature vector), ii) determines a weight for each word within the text prompt to generate a text vector that captures the importance of words within a text prompt, iii) generates low-dimensional text vectors in a continuous vector space that represents words within the text prompt, and/or iv) generates contextualized text vectors by determining semantic relationships between words within the text prompt.

As shown, the generative AI digital visual system 102 utilizes the text encoder 304 to generate text tokens 306. For example, the generative AI digital visual system 102 utilizes the text encoder 304 to generate a representation (e.g., the text tokens 306) of the text prompt 302 for a machine learning task. Specifically, a single text token refers to a word, a sub-word, or a character (e.g., "the," "on," "cat," "t," "showcasing," "show," "casing," etc.). Furthermore, the generative AI digital visual system 102 generates the text tokens 306 that capture the semantic meaning of words and/or sub-words, and further generates text tokens 306 that represent special meaning or purposes such as the beginning or an end of a sentence.

As further shown in FIG. 3, the generative AI digital visual system 102 processes noised tokens 308 and the text tokens 306 utilizes a diffusion transformer model 310. As mentioned above, the generative AI digital visual system 102 via the diffusion transformer model utilizes the text tokens 306 as a guide for removing noise from the noised tokens 308 (e.g., removes noise from the noised tokens 308 in a manner commensurate with the requirements/context of the text tokens 306). Further, as shown in FIG. 3, the generative AI digital visual system 102 utilizes the diffusion transformer model 310 to generate the denoised tokens 312 by removing noise from the noised tokens 308. FIG. 3 further shows the generative AI digital visual system 102 discarding the text tokens 306 after removing noise from the noised tokens 308.

As shown in FIG. 3, the generative AI digital visual system 102 utilizes a dual-VAE decoder 314 (e.g., which is discussed below in FIGS. 8-10C) to process the denoised tokens 312 and generate media 316. As shown, the media 316 includes a video that further includes a single image, keyframes, and motion frames. In one or more embodiments, the video includes a sequence of frames. For example, a sequence of frames refers to multiple still images that are displayed in succession to create a perception of motion. Specifically, each frame of a sequence of frames represents a single moment in time and when the sequence of frames is played together, the sequence of frames produces continuous motion and creates the content of the video. In other words, the sequence of frames includes temporal continuity where each frame in the sequence represents a next moment in time and simulates motion when moving from one frame to the next.

In one or more embodiments, the video includes an image frame. For example, the image frame refers to a static image that represents content of the video. Specifically, the generative AI digital visual system 102 treats a first frame (e.g., frame zero) of a sequence of frames as the image frame. In other words, the image frame refers to a first visual element displayed at the start of the video in the video (e.g., a static image of the video).

In contrast, in one or more embodiments, a keyframe refers to an image frame that stores visual data for a beginning or an ending of an action or a position of an object or character. Specifically, a video includes multiple keyframes. In other words, the generative AI digital visual system 102 utilizes keyframes as complete image frames that serve as visual anchor points for motion. To illustrate, a video includes a sequence of frames, and the sequence of frames includes a keyframe every 16 frames.

In one or more embodiments, the video includes at least one motion frame. For example, the generative AI digital visual system 102 utilizes motion frames as intermediate frames between keyframes to store changes or differences from a previous frame. Specifically, the generative AI digital visual system 102 utilizes the motion frames to store information related to changes between successive frames such as a change in position or color of an object from one frame to the next. Further, the generative AI digital visual system 102 utilizes the motion frames at playtime of a video in tandem with the keyframes to create a perception of smooth motion from one keyframe to the next keyframe.

Figure 4:
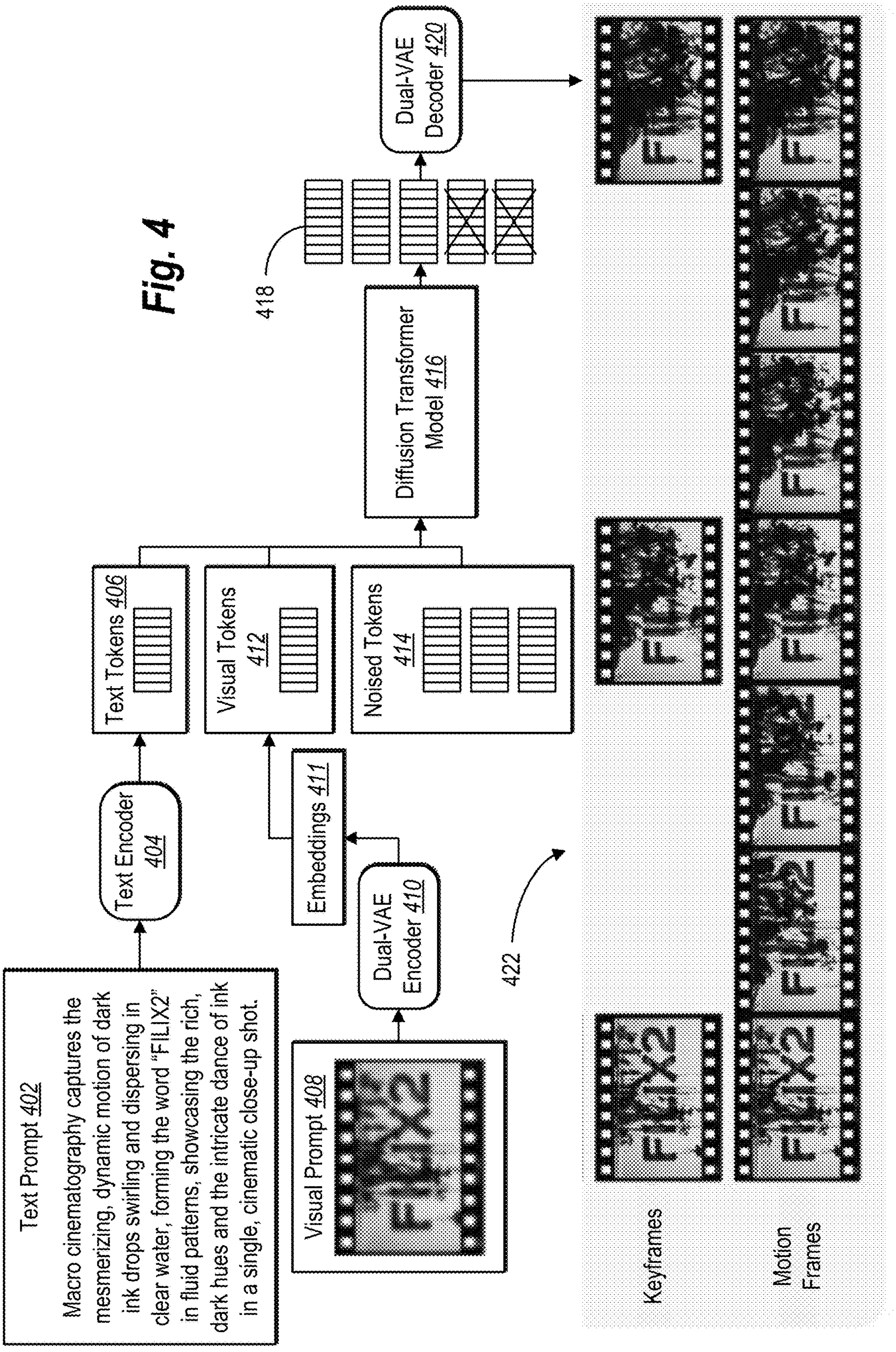
FIG. 4 illustrates a diagram of the generative AI digital visual system using a diffusion model to generate a video from a text prompt and a visual prompt in accordance with one or more implementations.

As mentioned above, in one or more embodiments, the generative AI digital visual system 102 receives a visual prompt and utilizes the visual prompt when generating media. FIG. 4 illustrates the generative AI digital visual system 102 using a diffusion model to generate a video from a text prompt and a visual prompt in accordance with one or more embodiments.

FIG. 4 shows the generative AI digital visual system 102 receiving a text prompt 402. Specifically, the text prompt 402 reads "macro cinematography captures the mesmerizing, dynamic motion of dark ink drops swirling and dispersing in clear water, forming the word "FILIX2" in fluid patterns, showcasing the rich, dark hues and the intricate dance of ink in a single, cinematic close-up shot." FIG. 4 shows the generative AI digital visual system 102 utilizes a text encoder 404 to process the text prompt 402 and generate text tokens 406.

Further, FIG. 4 shows the generative AI digital visual system 102 receiving a visual prompt 408. In one or more embodiments, the visual prompt 408 refers to a visual input to guide the generative AI digital visual system 102 to generate media 422. For example, the visual prompt 408 includes a digital image. Further, in some instances, the visual prompt 408 further includes a text prompt 402 along with the digital image. To illustrate, the generative AI digital visual system 102 receives the visual prompt 408 that includes an image and the text prompt 402 describing the media to generate and how the media should incorporate the provided image.

In one or more embodiments, the generative AI digital visual system 102 utilizes an image encoder to process the visual prompt 408. In one or more embodiments, an image encoder is a neural network (or one or more layers of a neural network) that extract features relating to digital images. In some cases, an image encoder refers to a neural network that both extracts and encodes features from a digital image. For example, an image encoder includes a particular number of layers including one or more fully connected and/or partially connected layers of neurons that extract image patches from the digital image and encode localized features of the digital image. To illustrate, in one or more embodiments, the generative AI digital visual system 102 generates an image embedding in a latent space that represents a complete frame of a digital image. As shown in FIG. 4, the generative AI digital visual system 102 utilizes a dual-VAE encoder 410 to encode the visual prompt 408. Additional details of the dual-VAE encoder 410 are described below in FIGS. 8-10C.

FIG. 4 shows the generative AI digital visual system 102 generating embeddings 411 from the visual prompt 408 using the dual-VAE encoder 410. In one or more embodiments, the generative AI digital visual system 102 utilizes the image encoder to generate image embeddings. In one or more embodiments, the image embeddings include a numerical representation (e.g., a vector) of a digital image. For instance, the image embeddings capture features and properties of the digital image. To illustrate, the image embeddings include semantic information such as the presence of objects, shapes, and spatial relationships.

Further, FIG. 4 shows the generative AI digital visual system 102 generating visual tokens 412 from the embeddings 411. Specifically, the generative AI digital visual system 102 utilizes a tokenization model (e.g., patchification) to generate the visual tokens 412 from the embeddings 411. This is discussed in more detail below in FIG. 7.

As shown in FIG. 4, the generative AI digital visual system 102 processes the text tokens 406, the visual tokens 412, and noised tokens 414 with a diffusion transformer model 416. For instance, the generative AI digital visual system 102 combines the text tokens 406, the visual tokens 412, and the noised tokens 414 to generate combined tokens (e.g., the combined tokens refer to any combination of tokens such as noised tokens with clean tokens). Specifically, the generative AI digital visual system 102 via the diffusion transformer model 416 utilizes the visual tokens 412 and the text tokens 406 as a guide to remove noise from the noised tokens 414. FIG. 4 shows the generative AI digital visual system 102 utilizes the diffusion transformer model 416 to generate denoised tokens 418. Furthermore, FIG. 4 shows the generative AI digital visual system 102 discarding the text tokens 406 and the visual tokens 412 after removing noise from the denoised tokens 418. Additionally, FIG. 4 shows the generative AI digital visual system 102 processing the denoised tokens 418 with the dual-VAE decoder 420 to generate a video.

Although FIG. 4 shows the generative AI digital visual system 102 processing both the text prompt 402 and the visual prompt 408, in one or more embodiments, the generative AI digital visual system 102 only receives the visual prompt 408. Specifically, the generative AI digital visual system 102 utilizes the diffusion transformer model 416 to process the noised tokens 414 and the visual tokens 412 to remove noise from the noised tokens 414 according to the visual tokens 412 and generate the media 422.

Figure 5:
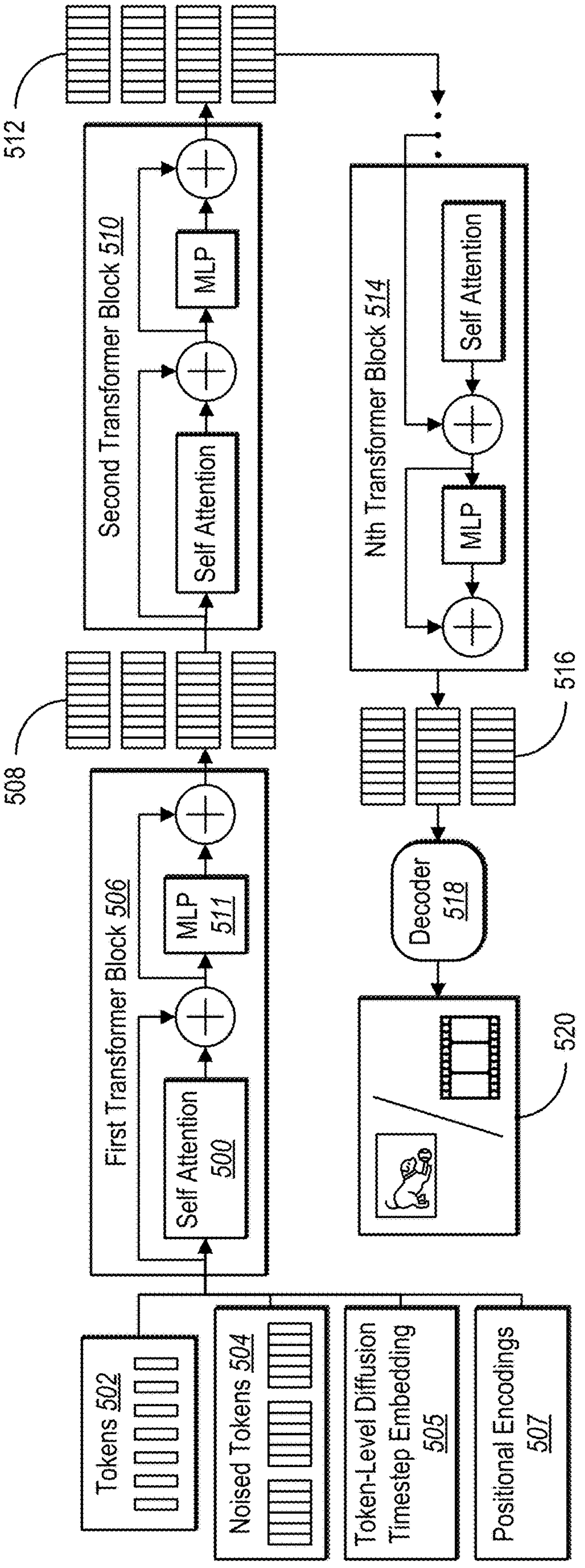
FIG. 5 illustrates a diagram of the generative AI digital visual system using multiple transformer blocks of a diffusion transformer model to generate media in accordance with one or more implementations.

FIG. 5 illustrates the generative AI digital visual system 102 using multiple transformer blocks of a diffusion transformer model to generate media in accordance with one or more embodiments. For example, FIG. 5 shows tokens 502 (e.g., tokens generated from a text prompt, and/or a visual prompt), noised tokens 504, a token-level diffusion timestep embedding 505, and positional encodings 507.

In one or more embodiments, the generative AI digital visual system 102 generates a token-level diffusion timestep embedding 505. For example, the token-level diffusion timestep embedding 505 refers to an embedding that represents a specific timestep. In other words, the generative AI digital visual system 102 generates a first token-level diffusion timestep embedding corresponding to a first transformer block, a second token-level diffusion timestep embedding corresponding to a second transformer block, and a third token-level diffusion timestep corresponding to a third transformer block. For instance, the token-level diffusion timestep embedding acts as an anchor to indicate a specific timestep in which noise was added to the noised tokens such that the generative AI digital visual system 102 determines how much noise to remove from a token at a specific transformer block. Thus, the generative AI digital visual system 102 processes the noised tokens 504 along with the token-level diffusion timestep embedding 505, where the token-level diffusion timestep embedding 505 acts as a guide for at least partially denoising the noised tokens 504.

In one or more embodiments, the positional encodings encode spatial information about where an image patch (e.g., corresponding to a token) belongs in a frame (e.g., a digital image or a frame of a sequence of frames). Specifically, the positional encodings indicate both spatial and temporal location of an image patch. As mentioned above, the generative AI digital visual system 102 treats diffusion timesteps, pixel locations, frame timestamps, and camera Plucker rays as positional encodings. In other words, the positional encodings 507 provide context for how to denoise the noised tokens 504. Thus, the generative AI digital visual system 102 utilizes the positional encodings 507 to guide a diffusion transformer model in removing noise from the noised tokens 504. The specific details of the improved positional encoding scheme are described below in FIGS. 11-14.

As mentioned above, the generative AI digital visual system 102 utilizes a single stream transformer as the diffusion transformer model. As mentioned above, the generative AI digital visual system 102 utilizes the diffusion transformer model which refers to a model architecture that leverages principles of diffusion models with a transformer architecture. Specifically, a single stream transformer refers to a diffusion transformer that does not have conditioning inputs (e.g., modulation inputs and/or modulation layers, such as adaLN modulation) processed in one or more parallel streams to denoise noised tokens. For instance, the single stream transformer encompasses a single stream of input data going in and generating output data from the input data. To illustrate, the single stream transformer includes one or more transformer blocks where each transformer block includes a self-attention layer and a multi-layer perceptron. In other words, the generative AI digital visual system 102 utilizes the single stream transformer that does not include a cross-attention layer (e.g., a cross-attention layer refers to a layer in a neural network to attend to and gather data related to other points of data rather than attending solely to itself, this is in opposition to single stream) nor does it include modulation layers (e.g., a neural network layer that adjusts features based on conditioning inputs, which is also in opposition to single stream). In other words, in one or more embodiments, the generative AI digital visual system 102 utilizes a single stream transformer that only consists of a self-attention layer and a multi-layer perceptron.

As further shown in FIG. 5, the generative AI digital visual system 102 utilizes a single stream transformer that includes one or more transformer blocks. In one or more embodiments, a transformer block refers to an individual block in a single stream transformer. Specifically, the generative AI digital visual system 102 utilizes a transformer block of a single stream transformer to remove noise from a noised token. For instance, for a single stream transformer with multiple transformer blocks, the generative AI digital visual system 102 utilizes a first transformer block to partially remove noise from a noised token to generate an intermediate denoised token (e.g., as guided by the positional encodings 507, such as the token-level diffusion timestep embedding 505).

FIG. 5 shows the generative AI digital visual system 102 utilizing a single stream transformer that includes a first transformer block 506, a second transformer block 510, and an Nth transformer block 514. Specifically, the first transformer block 506, the second transformer block 510, and the Nth transformer block 514 include self-attention layers and multi-layer perceptron's (e.g., MLPs). As shown in FIG. 5, the generative AI digital visual system 102 utilizes the first transformer block 506 to process the tokens 502, the noised tokens 504, the token-level diffusion timestep embedding 505, and the positional encodings 507 to partially remove noise from the noised tokens 504.

As shown in FIG. 5, the generative AI digital visual system 102 first processes the inputs with a self-attention layer 500 of the first transformer block 506 to generate a self-attention layer output. In one or more embodiments, the self-attention layer 500 refers to layer that captures the importance of different tokens (e.g., words or patches) in a sequence relative to each other. Specifically, the generative AI digital visual system 102 utilizes the self-attention layer 500 to capture relationships and dependencies between tokens (e.g., for both short-range and long-range dependencies). In other words, the generative AI digital visual system 102 utilizes the self-attention layer 500 to determine how much attention a token should give to another token. To illustrate, the generative AI digital visual system 102 utilizes the self-attention layer 500 to generate three vectors for each token, 1) a query vector (e.g., represents the token seeking information from other tokens), 2) a key vector (e.g., represents the token providing information to other tokens), and 3) a value vector (e.g., represents the actual content of the token).

As shown, the generative AI digital visual system 102 generates a self-attention layer output. In one or more embodiments, the generative AI digital visual system 102 utilizes the self-attention layer 500 to generate a self-attention layer output that represents an updated set of intermediate noised tokens (e.g., or denoised tokens) that incorporate information from other noised tokens (e.g., the updated set of noised tokens represents relationships between tokens).

In one or more embodiments, the generative AI digital visual system 102 further combines the self-attention layer output with the initial input (e.g., the tokens 502, the noised tokens 504, the token-level diffusion timestep embedding 505, and the positional encodings 507) to the transformer block corresponding to the self-attention layer.

Further, FIG. 5, shows the generative AI digital visual system 102 processing the combined self-attention layer output with a multi-layer perceptron 511. For example, the multi-layer perceptron 511 refers to an artificial neural network with multiple layers of neurons that are fully connected. Specifically, the multi-layer perceptron 511 includes an input layer, where the input data is fed into the network, hidden layers (e.g., intermediate layers between an input and output layer, where the hidden layers receive input from all the neurons in the previous layer), and an output layer that generates a multi-layer perceptron output. Further, FIG. 5 shows the generative AI digital visual system 102 combines the combined self-attention layer output with the multi-layer perceptron output to further generate a first intermediate denoised tokens 508.

As shown, the generative AI digital visual system 102 utilizes the first transformer block 506 to generate a first intermediate denoised tokens 508. In one or more embodiments, an intermediate denoised token refers to a partially noised token. Specifically, once the generative AI digital visual system 102 utilizes the single stream transformer to remove all the noise from the noised tokens, the generative AI digital visual system 102 generates denoised tokens 516. Thus, FIG. 5 illustrates the generative AI digital visual system 102 utilizing the first transformer block 506 to generate the first intermediate denoised tokens 508, the second transformer block 510 to generate a second intermediate denoised tokens 512, and an Nth transformer block 514 to generate the denoised tokens 516. As shown in FIG. 5, the generative AI digital visual system 102 utilizes a decoder 518 to process the denoised tokens 516 and further generate media 520 (e.g., that includes a digital image or a digital video). For instance, the generative AI digital visual system 102 utilizes a decoder of a two-dimensional variational autoencoder to decode tokens associated with image frames and keyframes and further utilizes a decoder of a three-dimensional variational autoencoder to decoder tokens associated with motion frames. Additional details of the variational autoencoder are given below in FIGS. 8-10C.

Figure 6:
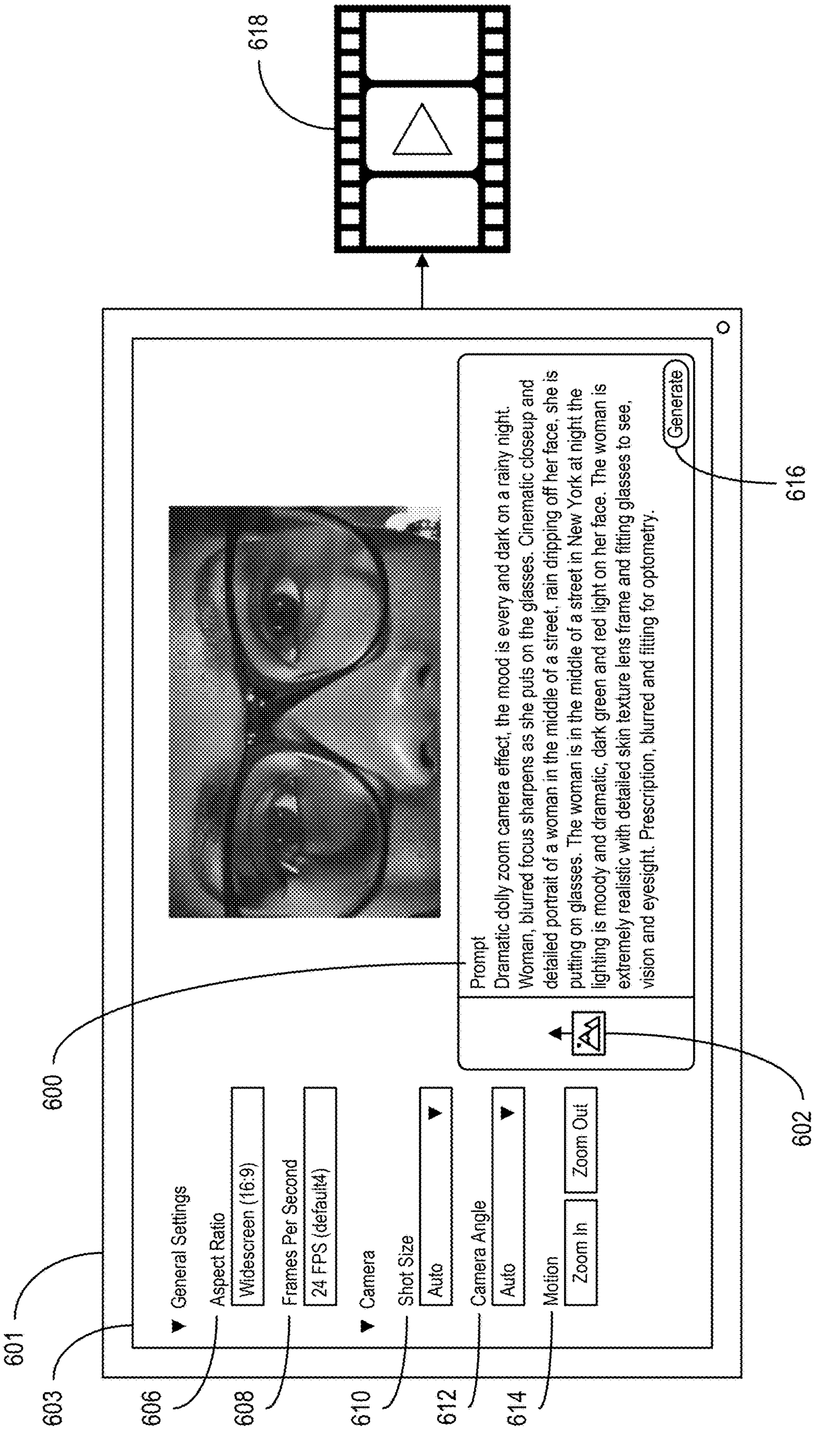
FIG. 6 illustrates an example graphical user interface of a client device submitting a media generation request to generate a video in accordance with one or more implementations.

FIG. 6 illustrates an example graphical user interface of a client device submitting a media generation request to generate a video in accordance with one or more embodiments. For example, FIG. 6 shows a graphical user interface 603 of a client device 601, where the graphical user interface 603 shows various media attributes for a media generation request. Specifically, FIG. 6 shows a text prompt 600 that reads "dramatic dolly zoom camera effect, the mood is every and dark on a rainy night. Woman, blurred focus sharpens as she puts on the glasses. Cinematic closeup and detailed portrait of a woman in the middle of a street, rain dripping off her face, she is putting on glasses. The woman is in the middle of a street in New York at night the lighting is moody and dramatic, dark green and red light on her face. The woman is extremely realistic with detailed skin texture lens frame and fitting glasses to see, vision and eyesight. Prescription, blurred and fitting optometry."

Further, FIG. 6 illustrates a visual prompt upload element. Specifically, the visual prompt upload element depicts an option for a client device to provide a digital image or a string of digital images to the generative AI digital visual system 102 via the graphical user interface 603 (e.g., as a visual prompt 602). For instance, a client device selects the visual prompt upload element and uploads a digital image or a string of digital images.

As shown in FIG. 6, the generative AI digital visual system 102 receives a visual prompt 602 from a client device. Specifically, the visual prompt 602 shows a digital image depicting some aspects of the text prompt 600 (e.g., the glasses and the woman). Furthermore, the generative AI digital visual system 102 provides various media attributes for the client device to configure. Specifically, FIG. 6 shows settings such as an aspect ratio 606, frames per second 608, shot size 610, camera angle 612, and motion 614.

In one or more embodiments, the aspect ratio 606 refers to a proportional relationship between the width and the height of an image, screen, or video. Specifically, the aspect ratio 606 refers to the width relative to the height expressed as width/height. For example, an aspect ratio of 16:9 means that for every 16 units of width, there are 9 units of height. For instance, some common aspect ratios include 16:9, 4:3, 1:1, and 21:9. Moreover, the aspect ratio 606 affects how an image/frame is framed and displayed in a digital video, where certain types of media resort to using specific types of aspect ratios (e.g., widescreen videos versus square digital images). Furthermore, specific types of devices used to play digital videos work better with specific types of aspect ratios. Thus, the generative AI digital visual system 102 allows a client device to specify the aspect ratio 606 for which the generative AI digital visual system 102 generates position encodings to reflect the indicated aspect ratio. As is discussed in more detail below, the generative AI digital visual system 102 utilizes a centered two-dimensional coordinate map to accurately capture the aspect ratio 606.

In one or more embodiments, the frames per second 608 refers to a number of individual frames displayed or captured in one second of video or animation. Specifically, the frames per second 608 refers to a measure of how smooth the motion appears in a video or animation. Specifically, a higher frames per second typically results in smoother motion as more frames are shown per second. For instance, the generative AI digital visual system 102 provides 24 frames per second, 34 frames per second, 60 frames per second and 120 frames per second as options for the client device to select from.

In one or more embodiments, the shot size 610 refers to an amount of space a subject occupies within the frame of a digital image or a digital video. Specifically, the shot size 610 refers to an extreme wide shot (e.g., a large view of the environment or setting), a wide shot (e.g., showing a subject from head to toe), a medium shot (e.g., waist up), a medium close-up shot (e.g., chest or shoulders up), a close up shot (e.g., frames the subject's face), extreme close up shot (e.g., zooms in to a very specific part of a subject such as their eyes). To illustrate, FIG. 6 shows the visual prompt 602 with an extreme close up shot of the eyes.

In one or more embodiments, the camera angle 612 refers to a position or a point of view of the digital image and/or the digital video. Specifically, the camera angle 612 includes eye-level angle, high angle (e.g., looking down on a subject), a low angle, a bird's eye view, a worm's eye view, a tilted angle (e.g., to create disorientation), an over the shoulder angle, and a point of view angle. Thus, the generative AI digital visual system 102 allows for the client device to input one or more camera angles to convey different emotions within a digital video 618.

In one or more embodiments, the motion 614 refers to movement of the camera (e.g., for a digital image or digital video) to create dynamic effects. For instance, the motion 614 includes zooming in or zooming out. Additional motion effects include panning (e.g., camera moves horizontally from a fixed position), tilting (e.g., going up or down from a fixed position), dolly in or out (e.g., entire camera moves forward or backward), crane movement (e.g., down, up, left, or right), and handheld motion (e.g., create a realistic feeling).

FIG. 6 depicts a variety of media attributes that a client device indicates to the generative AI digital visual system 102. In one or more embodiments, based on the indicated media attributes, the generative AI digital visual system 102 generates spatial-temporal positional encodings. As further shown, the generative AI digital visual system 102 further provides a generate element 616. In response to a selection of the generate element 616, the generative AI digital visual system 102 generates the digital video 618 that includes content from the visual prompt 602, the text prompt 600 and the various indicated media attributes. Specifically, the generative AI digital visual system 102 generates positional encodings using the principles discussed above and below to capture the user-provided information and denoise noised tokens. In one or more embodiments, the generative AI digital visual system 102 utilizes default media attributes to generate the digital video 618.

Figure 7:
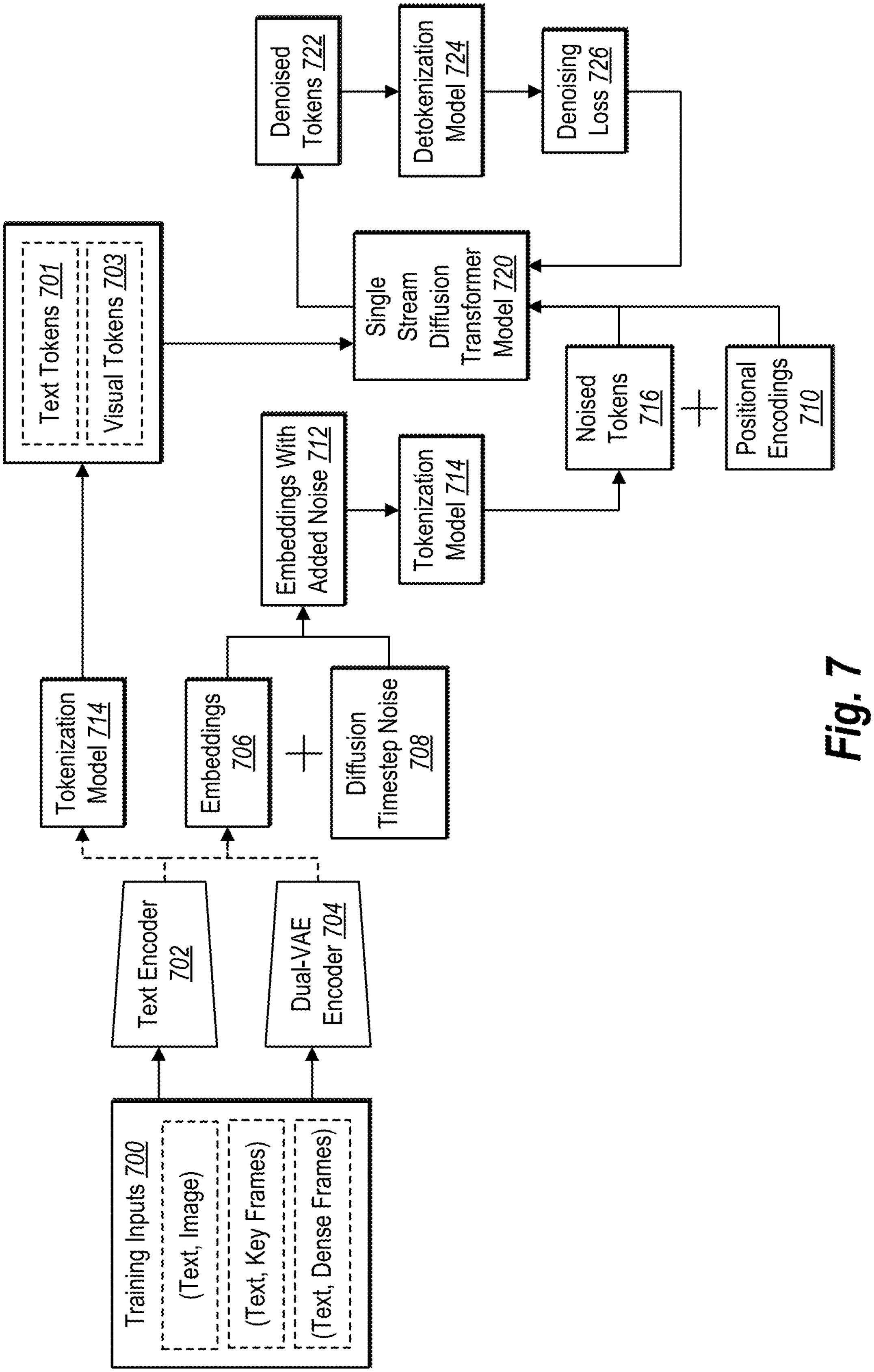
FIG. 7 illustrates a diagram of the generative AI digital visual system training a diffusion transformer model in accordance with one or more implementations.

FIG. 7 illustrates the generative AI digital visual system 102 training a diffusion transformer model in accordance with one or more embodiments. For example, FIG. 7 shows the generative AI digital visual system 102 receiving training inputs 700 that include a training text prompt, a training visual prompt, and/or various combinations (e.g., text and image, text and keyframes, text and dense frames (motion frames)). Text prompts and visual prompts were discussed above, for purposes of FIG. 7 the text prompts and the visual prompts discussed above are the same except they are in the context of training the diffusion transformer model.

As shown in FIG. 7, the generative AI digital visual system 102 processes the training inputs 700 with a text encoder 702 and/or a dual-VAE encoder 704. Specifically, if the training inputs 700 include a visual prompt, then the generative AI digital visual system 102 utilizes the dual-VAE encoder 704 and if the training inputs include a text prompt, then the generative AI digital visual system 102 utilizes the text encoder 702 (e.g., the training includes both the text and visual prompt). As shown in FIG. 7, the generative AI digital visual system 102 generates embeddings 706 from the training inputs 700. For instance, the embeddings 706 includes data originating from image data, keyframe data, and dense frame data.

Moreover, as shown, the generative AI digital visual system 102 generates training visual embeddings (e.g., generated from a visual prompt) and/or training text tokens (e.g., generated from a text prompt). For instance, the generative AI digital visual system 102 generates text tokens 701 by using the text encoder 702 and further generates visual tokens 703 (e.g., from a visual prompt) by using a tokenization model 714 to create the visual tokens 703 from visual embeddings.

Moreover, FIG. 7 shows the generative AI digital visual system 102 adding a diffusion timestep noise 708 and positional encodings 710 to the embeddings 706. Specifically, the generative AI digital visual system 102 adds noise to the embeddings 706. For instance, the generative AI digital visual system 102 adds random noise as input data to the embeddings. For instance, the generative AI digital visual system 102 generates the noised embeddings by adding Gaussian noise sampled from a normal distribution with a mean of zero and a specified standard deviation.

In one or more embodiments, the generative AI digital visual system 102 adds noise to the embeddings (e.g. clean visual signals) over several timesteps. For instance, the generative AI digital visual system 102 adds noise to embeddings over a number of timesteps corresponding to a number of transformer blocks (e.g., denoising blocks) in the diffusion transformer model. In one or more embodiments, a diffusion portion of the diffusion transformer model receives as input the embeddings and adds noise to the embeddings through a series of steps. For instance, the generative AI digital visual system 102 utilizes a fixed Markov chain that adds noise to the embeddings until the diffusion representation is diffused, destroyed, or replaced. Furthermore, each step of the fixed Markov chain relies upon the previous step. Specifically, at each step, the fixed Markov chain adds Gaussian noise with variance which produces a noised representation (e.g., noised embeddings). In one or more embodiments, the generative AI digital visual system 102 adjusts the number of diffusion layers in the diffusion process (and the number of corresponding denoising layers in the denoising process).

As shown, the generative AI digital visual system 102 generates embeddings with added noise 712. Furthermore, as shown in FIG. 7, the generative AI digital visual system 102 utilizes the tokenization model 714 to generate noised tokens 716 (e.g., training visual tokens). For instance, the generative AI digital visual system 102 generates image patches as the embeddings 706 to represent a visual prompt/digital image. In other words, in one or more embodiments, an embedding of the embeddings 706 represents an entire frame with multiple image patches.

In one or more embodiments, the generative AI digital visual system 102 selects a set of image patches from a digital image. In particular, the generative AI digital visual system 102 generates the set of image patches by sub-dividing a digital image into smaller regions. For instance, the generative AI digital visual system 102 sub-divides the digital image into patches based on a predetermined resolution (e.g., 256×256), where each patch represents localized regions within the digital image. In one or more embodiments, an image patch of the set of image patches does not share any pixel values with other image patches. In one or more embodiments, an image patch of the set of image patches overlaps with pixel values of an adjacent image patch. Accordingly, in one or more embodiments, the generative AI digital visual system 102 sub-divides a digital image into image patches where some of the image patches do not overlap with pixel values of other image patches and some of the image patches do overlap with pixel values of other image patches.

In one or more embodiments, the generative AI digital visual system 102 transforms the embeddings with added noise 712 (e.g., visual signals with noise) into visual tokens (e.g., the noised tokens 716). For example, the generative AI digital visual system 102 utilizes the tokenization model 714 to patchify the embeddings (e.g., the embeddings with added noise 712). Specifically, the tokenization model 714 converts the embedding into smaller patches or grids that are treated as individual tokens for further processing (e.g., adding noise and then denoising). For instance, the generative AI digital visual system 102 utilizes patchification to handle high-dimensional image data efficiently.

To illustrate, the generative AI digital visual system 102 flattens each patch of the embedding (e.g., into a single dimension vector), converts the flattened patch into a lower-dimensional representation, and maps the flattened lower-dimensional patch into a fixed-length feature vector. Accordingly, the generative AI digital visual system 102 treats the flattened fixed-length feature vector as a visual token and utilizes the diffusion transformer model to process the visual token. In other words, each noised token represents a specific image patch in a frame of a sequence of frames. Moreover, a subset of noised tokens represents an entire frame of a sequence of frames in a video.

Moreover, in one or more embodiments, the generative AI digital visual system 102 adds positional encodings (e.g., the positional encodings 710) to each noised patch (e.g., noised visual token) to encode spatial information about where the noised patch belongs in a digital image. As alluded to above, the positional encodings include information indicated by a client device in a graphical user interface or default media attributes. Specifically, the generative AI digital visual system 102 utilizes the positional encodings 710 that include a diffusion timestep (e.g., indicates which timestep/transformer block it is at and how much noise should be removed), a spatial pixel location (e.g., a specific position of a pixel within a two-dimensional image, defined by x and y coordinates), video frame timestamp (e.g., a marker that represents the specific time at which a particular frame appears within a video sequence, where each frame in a video is assigned a timestamp to indicate the frame's position relative to the start of the video), camera parameters (e.g., shot size, camera angle, motion, etc.), and Plucker rays (e.g., a mathematical representation of lines in a 3D space using a set of Plucker coordinates. For example, the generative AI digital visual system 102 utilizes Plucker rays to synthesize new or novel angles of an object/subject depicted in a visual prompt. In other words, the Plucker rays include three-dimensional camera pose information).

Furthermore, FIG. 7 shows the generative AI digital visual system 102 processing the noised tokens 716, the positional encodings 710, and the text tokens 701 and/or the visual tokens 703 with a single stream diffusion transformer model 720. In particular, FIG. 7 shows the generative AI digital visual system 102 generating denoised tokens 722 using the single stream diffusion transformer model 720.

Additionally, FIG. 7 shows the generative AI digital visual system 102 processing the denoised tokens 722 with a detokenization model 724. In one or more embodiments, the generative AI digital visual system 102 transforms denoised tokens into embeddings by utilizing the detokenization model 724. For example, the generative AI digital visual system 102 utilizes the detokenization model 724 to unpatchify denoised tokens. Specifically, unpatchification involves a reverse process of patchification to reconstruct an image (e.g., a frame from a sequence of frames) from a set of denoised tokens. For instance, the generative AI digital visual system 102 rearranges the denoised tokens and combines the rearranged denoised tokens into an initial (original) image structure/frame. In other words, the generative AI digital visual system 102 utilizes the detokenization model to rearrange tokens to resemble the image embeddings (e.g., an entire frame put back together).

Furthermore, in one or more embodiments, (at inference time) the generative AI digital visual system 102 utilizes a decoder to process the denoised tokens (which have been unpatchified) and generates a media item such as a video. Specifically, the generative AI digital visual system 102 utilizes a dual-VAE decoder which is discussed in more detail below.

As shown in FIG. 7, the generative AI digital visual system 102 detokenizes the denoised tokens 722 (e.g., to generate denoised image embeddings) and further determines a denoising loss 726. For instance, the generative AI digital visual system 102 compares the denoised image embeddings (e.g., from unpatchifying the denoised tokens 722) with the embeddings (e.g., the embeddings 706 representing image, keyframe, and dense frame data) to determine a denoising loss 726 (e.g., a measure of accuracy between embeddings in the latent space).

Based on comparing the denoised image embeddings and the image embeddings, the generative AI digital visual system 102 generates the denoising loss 726 (e.g., a measures of accuracy). In one or more embodiments, the generative AI digital visual system 102 determines a measure of loss by comparing a similarity between a predicted embedding (e.g., denoised embedding generated from the denoised tokens 722) and a ground truth token (e.g., pre-noised embeddings, such as the embeddings 706). Specifically, the generative AI digital visual system 102 determines a mean squared error (MSE) loss to measure an average squared difference between corresponding elements of a predicted embedding and a ground truth embedding. For instance, the goal of MSE loss is to minimize the error between a prediction and a ground truth. As shown, the generative AI digital visual system 102 modifies parameters of the single stream diffusion transformer model 720 based on the denoising loss 726.

To illustrate, the process shown in FIG. 7 is also shown here as algorithm 1:

Input list:
(text, image) pairs: text descriptions and corresponding images
(text, sparse frames) pairs: text and selected video frames
(text, dense frames) pairs: text and full sequences of video frames
Step 1: encode texts into text tokens using T5 encoder
p = T5-encoder(p)
Step 2: Compress single/sparse/dense frames using DualVAE $$x_t^{image/sparse/dense} = \text{Dual } VAE\text{-encoder}\left(x_t^{image/sparse/dense}\right)$$

Step 3: Add noise to visual signals according to sampled diffusion timestep t $$x_t = x_t^{image/sparse/dense} + N(0, \sigma_t)$$

Step 4: Patchify the noised visual signals into noised visual tokens
$\overline{x}_t = \text{patchify}(\tilde{x}_t)$
Step 5: Add positional encodings (diffusion timestep, spatial xy, video timestamp, camera parameters, etc.) to the noised visual tokens
$\tilde{x}_t = x_t + PE(t, xy, ts, cp)$
Step 6: Process the concatenated text and the noised visual tokens with standard full self-attention transformer $$[p_t'; \overline{x}_t'] = \text{Transformer}[p_t; \overline{x}_t']$$

Step 7: Unpatchify the visual tokens to reconstruct the denoised latents $$\hat{x}_t = \text{unpatchify } \overline{x}_t'$$

Step 8: Compute MSE denoising loss:

$$L_{MSE} = \left\| \hat{x}_t - x_t^{\frac{image}{sparse}/dense} \right\|^2$$

For instance, the generative AI digital visual system 102 adds noise to visual signals (e.g., the embeddings such as the image embedding, the keyframe embeddings, and the motion embeddings), tokenizes the visual signals, and further adds positional encoding information to each of the noised tokens to incorporate context for how to remove noise from the tokens via the diffusion transformer model.

Although FIG. 7 relates to training the single stream diffusion transformer model 720, the principles discussed in relation to adding noise to embeddings, tokenizing (e.g., to generate the noised tokens 716), adding the positional encodings 710 to the noised tokens 716, and detokenizing is applicable to the generative AI digital visual system 102 at inference time.

Figure 8:
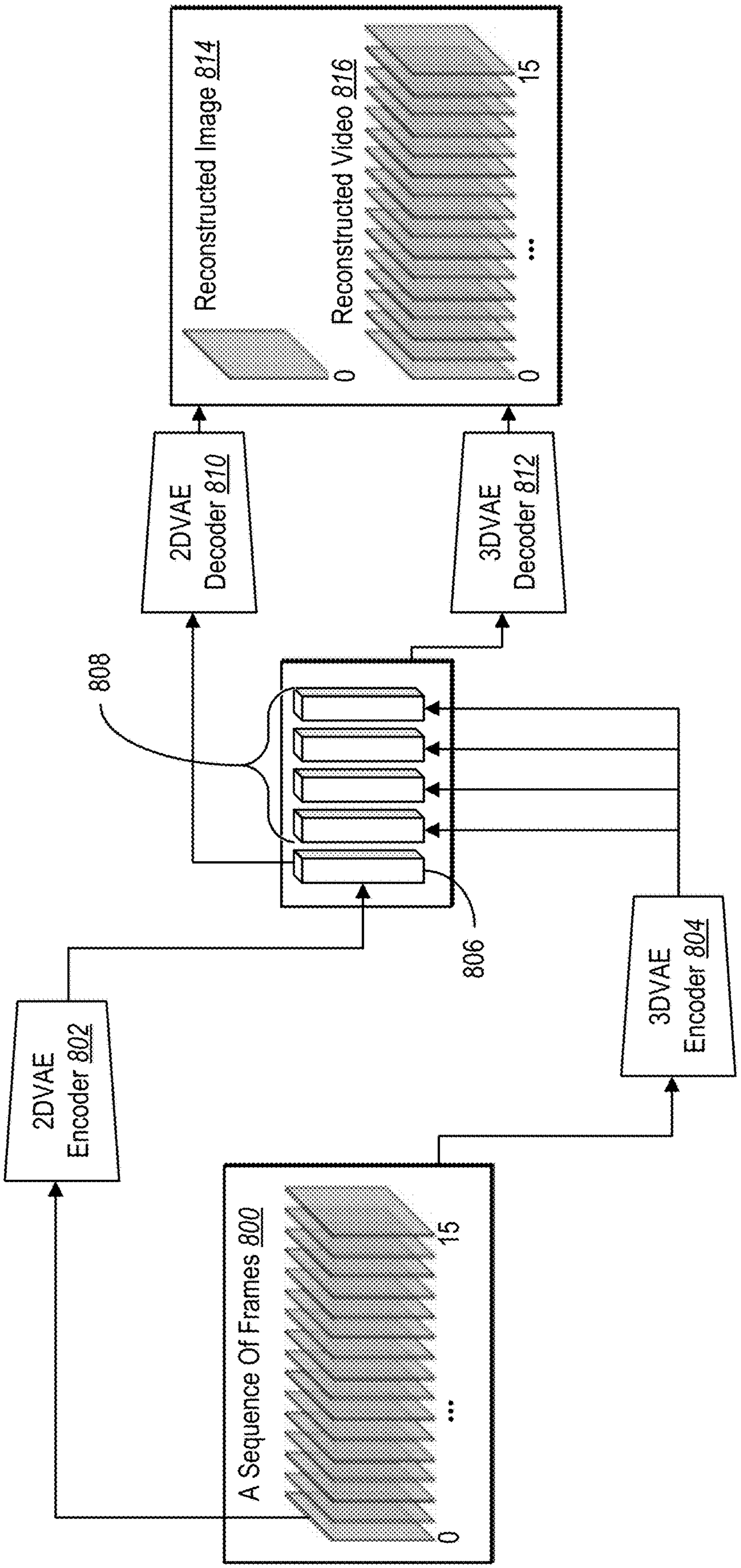
FIG. 8 illustrates a diagram of the generative AI digital visual system using a dual-variational autoencoder model to reconstruct image and video in accordance with one or more implementations.

As mentioned above, the generative AI digital visual system 102 utilizes a dual-variational autoencoder model to accurately generate both image and video at a high-quality. FIG. 8 illustrates an example diagram of the generative AI digital visual system 102 using a dual-VAE model to reconstruct image and video.

In one or more embodiments, a variational autoencoder (VAE) refers to a generative model that encodes data into a latent space and then reconstructs the encoded data. Specifically, the generative AI digital visual system 102 utilizes a variational autoencoder to learn a probabilistic latent space to generate new data points. For instance, a variational autoencoder includes an encoder, a latent space, and a decoder. Further, the variational autoencoder includes a space for modifying parameters in response to determining a measure of loss/accuracy during a training phase. Relatedly, in some cases, a variational autoencoder includes or refers to a neural network, such as a generative neural network, that combines techniques from deep learning and Bayesian inference. For example, a variational autoencoder is an extension of the traditional autoencoder architecture and is used to learn complex data distributions using an encoder and a decoder. The encoder maps input data to a latent space by producing a probability distribution (e.g., a layout distribution) over latent variables. The decoder maps samples latent variables back to input space to learn a conditional distribution for reconstructing the input data.

In one or more embodiments, the generative AI digital visual system 102 utilizes a dual-variational autoencoder that includes a two-dimensional variational autoencoder and a three-dimensional variational autoencoder. In one or more embodiments, the two-dimensional variational autoencoder refers to a type of VAE for processing two-dimensional data. Specifically, the two-dimensional variational autoencoder processes image data and performs spatial compression of a single frame into an image or a key-frame embedding (e.g., latent). For instance, the generative AI digital visual system 102 utilizes the two-dimensional variational autoencoder with convolutional layers to process the image data (e.g., to preserve spatial relationships shown in the digital image between pixels).

To illustrate, the generative AI digital visual system 102 utilizes a locally penalized variational autoencoder (LPVAE) as the two-dimensional variational autoencoder. For instance, the LPVAE includes an encoder, a latent space, a decoder, and a loss function, however the LPVAE further includes local penalties in the latent space. In other words, the generative AI digital visual system 102 determines a measure of loss and modifies the latent space of the LPVAE at a local level using local regularization.

As shown in FIG. 8, the generative AI digital visual system 102 utilizes an encoder 802 of the two-dimensional variational autoencoder to process a first frame (e.g., frame zero) of a sequence of frames 800. Specifically, FIG. 8 shows the generative AI digital visual system 102 utilizing the encoder 802 to process the first frame to further generate an image embedding 806.

In one or more embodiments, the generative AI digital visual system 102 generates the image embedding 806 from the first frame and further utilizes a decoder 810 of the two-dimensional variational autoencoder to decode the image embeddings. Specifically, the generative AI digital visual system 102 utilizes a 2DVAE decoder to reconstruct the two-dimensional data. For instance, the generative AI digital visual system 102 utilizes the decoder to progressively restore the spatial dimensions to match an initial input size of the first frame of the sequence of frames 800.

As shown, from utilizing the decoder 810, the generative AI digital visual system 102 generates a reconstructed image 814. Specifically, the reconstructed image 814 is a prediction of the decoder 810 to rebuild or reconstruct the original first frame of the sequence of frames. Accordingly, the encoder 802 generates a latent representation (e.g., embedding) of the first frame (e.g., an image) and the decoder 810 attempts to learn how to reconstruct the first frame from the latent representation (e.g., the embedding).

Although not shown in FIG. 8, the generative AI digital visual system 102 further utilizes the encoder 802 of the two-dimensional variational autoencoder to process keyframes (e.g., frames 4, 8, 12, 16, etc.) of the sequence of frames 800. In particular, the generative AI digital visual system 102 utilizes the encoder 802 to generate keyframe embeddings and then further utilizes the decoder 810 to reconstruct the keyframes (e.g., reconstructed keyframes).

As mentioned above, the dual-variational autoencoder includes the three-dimensional variational autoencoder. In one or more embodiments, the three-dimensional variational autoencoder refers to a type of VAE for processing three-dimensional data. Specifically, the three-dimensional variational autoencoder performs temporal compression of a chunk of frames (e.g., a subset of frames of the sequence of frames that indicate motion) into a motion embedding (e.g., latent). To illustrate, the generative AI digital visual system 102 utilizes the two-dimensional variational autoencoder to process a leading frame of a video chunk (e.g., a keyframe) while the rest of the frames are motion frames with respect to the leading frame (e.g., the keyframe). Accordingly, the generative AI digital visual system 102 utilizes the three-dimensional variational autoencoder to process the motion frames FIG. 8 further shows the generative AI digital visual system 102 utilizing an encoder 804 of a three-dimensional variational autoencoder to process the sequence of frames. As shown, the generative AI digital visual system 102 generates motion embeddings 808 from processing the sequence of frames 800. Furthermore, the generative AI digital visual system 102 utilizes a decoder 812 of the three-dimensional variational autoencoder. Specifically, the decoder 812 reconstructs three-dimensional data by progressively increasing the spatial dimensions to produce a three-dimensional output.

As further shown, the generative AI digital visual system 102 generates a reconstructed video 816 from the motion embeddings 808. Similar to the two-dimensional variational autoencoder, the generative AI digital visual system 102 utilizes the three-dimensional variational autoencoder to learn how to generate latent representations (e.g., embeddings) and further learn how to reconstruct motion frames from the latent representation. Thus, the dual nature of the dual-variational autoencoder allows for the generative AI digital visual system 102 to effectively and efficiently learn the latent space for image and video reconstruction (e.g., in an accurate and high-quality manner).

Figure 9:
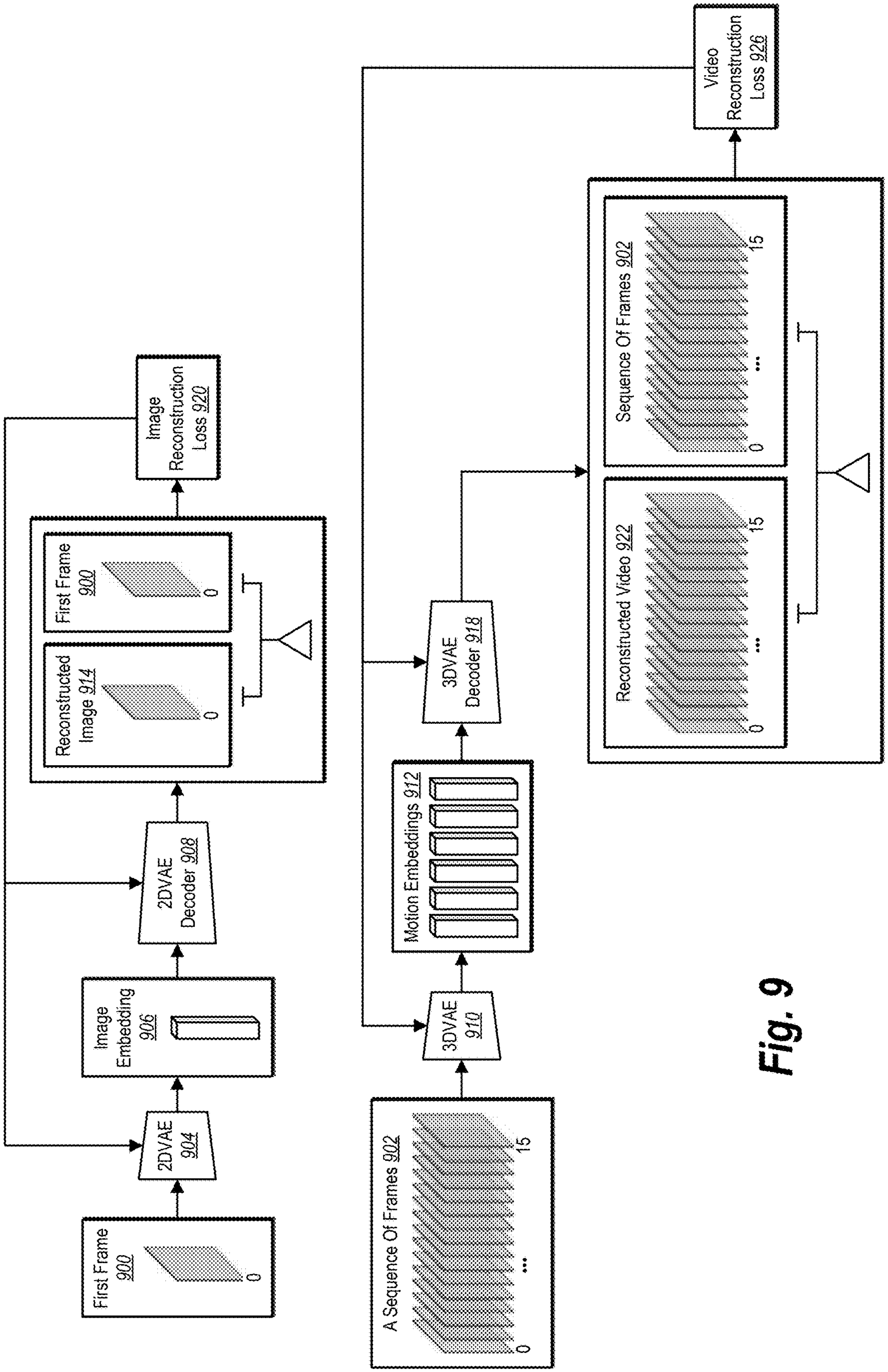
FIG. 9 illustrates a diagram of the generative AI digital visual system generating an image reconstruction loss with a two-dimensional variational autoencoder and a video reconstruction loss with a three-dimensional variational autoencoder in accordance with one or more implementations in accordance with one or more implementations.

In one or more embodiments, the generative AI digital visual system 102 trains the dual-variational autoencoder model for both video reconstruction and image reconstruction. FIG. 9 illustrates the generative AI digital visual system 102 generating an image reconstruction loss with a two-dimensional variational autoencoder and a video reconstruction loss with a three-dimensional variational autoencoder.

As shown in FIG. 9, the generative AI digital visual system 102 processes a first frame 900 of a sequence of frames 902 utilizing an encoder 904 of the two-dimensional variational autoencoder. As shown, the generative AI digital visual system 102 generates an image embedding 906 from the first frame 900. In one or more embodiments, the term embedding, used above and below, generally refers to a vector representation of text or an image. Specifically, the term embedding broadly covers embeddings generated by the dual-variational autoencoder model, which is differentiated from tokens which are a specific type of embedding generated by a tokenization model (e.g., tokens, noised tokens and denoised tokens).

As mentioned above, the image embedding 906 include a numerical representation (e.g., a vector) of a digital image (e.g., the first frame 900). For instance, the image embedding 906 captures features and properties of the digital image. To illustrate, the image embedding 906 include semantic information such as the presence of objects, shapes, and spatial relationships. Moreover, in one or more embodiments, the generative AI digital visual system 102 further utilizes the two-dimensional variational autoencoder to generate keyframe embeddings from keyframes of the sequence of frames 902. In one or more embodiments, keyframe embeddings include a numerical representation (e.g., a vector) of keyframes of a sequence of frames (e.g., frames 0, 16, and 32).

As shown in FIG. 9, the generative AI digital visual system 102 generates the image embedding 906 and further utilizes a decoder 908 of the two-dimensional variational autoencoder to process the image embedding 906 and generate a reconstructed image 914. As shown, the generative AI digital visual system 102 further compares the reconstructed image 914 with the first frame 900 of the sequence of frames 902 to determine how well the two-dimensional variational autoencoder reconstructs the first frame 900. Specifically, as shown, the generative AI digital visual system 102 generates an image reconstruction loss 920 from comparing the reconstructed image 914 with the first frame 900. Furthermore, the generative AI digital visual system 102 modifies parameters of the two-dimensional variational autoencoder based on the image reconstruction loss 920.

As further shown, the generative AI digital visual system 102 further generates motion embeddings 912. Specifically, the generative AI digital visual system 102 utilizes an encoder 910 of a three-dimensional variational autoencoder to process the sequence of frames 902 and generate the motion embeddings 912. In one or more embodiments, the motion embeddings 912 include a numerical representation (e.g., a vector) of the sequence of frames 902 (e.g., frames 0-48).

As shown, the generative AI digital visual system 102 further utilizes a decoder 918 of the three-dimensional variational autoencoder to process the motion embeddings 912 and generate a reconstructed video 922. Specifically, FIG. 9 shows the generative AI digital visual system 102 comparing the reconstructed video 922 with the sequence of frames 902 to determine a video reconstruction loss 926.

In one or more embodiments, the video reconstruction loss 926 refers to a measure of how accurately a 3DVAE reconstructs a video from a motion embedding. Specifically, the video reconstruction loss 926 quantifies the difference between the sequence of frames 902 (motion frames, keyframes, and image frames) and the reconstructed video 922. Based on the video reconstruction loss 926, the generative AI digital visual system 102 modifies parameters of the three-dimensional variational autoencoder to more accurately reconstruct videos.

Although not shown in FIG. 9, in one or more embodiments, the generative AI digital visual system 102 further utilizes perceptual loss and generative adversarial loss to modify parameters of the dual-variational autoencoder model. In one or more embodiments, perceptual image loss refers to a loss function that compares digital images (e.g., the initial input image such as the first frame 900 and the reconstructed image 914) based on high-level features, rather than only focusing on pixel differences between images. Specifically, the perceptual image loss compares images based on their similarities in a feature space by focusing on texture, style, and structure in the digital images being compared. For instance, the generative AI digital visual system 102 utilizes pre-trained neural networks to perform image classification on the input image and the reconstructed image to generate a loss calculation based on perceptual image loss.

In one or more embodiments, perceptual video loss refers to accounting for high-level features that focus on spatial and temporal characteristics of the input video (e.g., the sequence of frames 902) compared with the reconstructed video 922. In other words, the generative AI digital visual system 102 determines perceptual video loss to compare temporal coherence of the input video and the reconstructed video.

In one or more embodiments, generative adversarial loss (e.g., image generative adversarial loss and video generative adversarial loss) refers to an objective function to measure how well a generator (e.g., the dual-VAE decoders) generates realistic images/video (e.g., that resemble the initial input) and how effectively a discriminator distinguishes between the initial input and the reconstructed image 914 and/or the reconstructed video 922. To illustrate, the generative AI digital visual system 102 utilizes the following algorithm 2 for training a dual-variational autoencoder model:

Input list:
a sequence of frames with fixed chunk size
Step 1: Encode the first frame using 2DVAE keyframe_latent = 2dvae-encode(frames[0])
Step 2: Encode all frames using 3DVAE motion_latent = 3dvae-encode(frames)
Step 3: Decode keyframe latent into image, and compute image reconstruction loss w.r.t.
2DVAE key_frame = 2dvae-decode(keyframe_latent)
$L_{2D} = ||\text{frames}[0] - \text{image}|| + \alpha L_{VGG} + \beta L_{GAN}$
Step 4: Decode keyframe latent + motion latent and compute video reconstruction loss w.r.t.
3DVAE
video = 3dvae-decode(concat(keyframe_latent, motion_latent))
$L_{3D} = ||\text{allframes} - \text{frames}|| + \alpha L_{VGG} + \beta L_{GAN}$ In one or more embodiments, the generative AI digital visual system 102 trains the dual-variational autoencoder model by initially generating parameters of a two-dimensional variational autoencoder, freezing parameters of the two-dimensional variational autoencoder (e.g., learned in the initial learning phase) and then further generating parameters of a three-dimensional variational autoencoder. Based on the frozen parameters of the two-dimensional variational autoencoder and the parameters of the three-dimensional variational autoencoder, the generative AI digital visual system 102 generates the trained dual-variational autoencoder model.

In one or more embodiments, experiments compared the results of the generative AI digital visual system 102 utilizing a dual-variational autoencoder compared with a system that only uses a three-dimensional variational autoencoder. For example, experimenters compared results of the generative AI digital visual system 102 versus other systems based on peak signal-to-noise ratio (PSNR—which is used to rate image and video quality of a reconstructed video or image compared to its original version), learned perceptual image patch similarity (LPIPS—which is used to measure a perceptual similarity between two images), video learned perceptual image patch similarity (VLPIPS—which is used to measure a perceptual similarity between two videos), and Frechet video distance (FVD—which is used to measure the quality of generated videos). The results of the comparison are shown in the below table.

| | PSNR | LPIPS | VLPIPS | FVD |
|---|---|---|---|---|
| 3DVAE | 30.07 | 3.77 | 11.60 | 25.87 |
| Dual-VAE | 31.37 | 2.93 | 10.23 | 21.39 |

In the above table, a higher PSNR score indicates a higher quality, whereas a lower LPIPS, VLIPIPS, and FVD indicate a higher quality. Thus, the above table illustrates that the dual-variational autoencoder outperforms other systems that just utilize a three-dimensional variational autoencoder across all metrics measured by experimenters. For instance, the generative AI digital visual system 102 outperforms other systems that do not utilize the dual-variational autoencoder model because for small structures (like a human face), the dual-variational autoencoder carries image latents while other systems may only carry the motion latents.

Figure 10A:
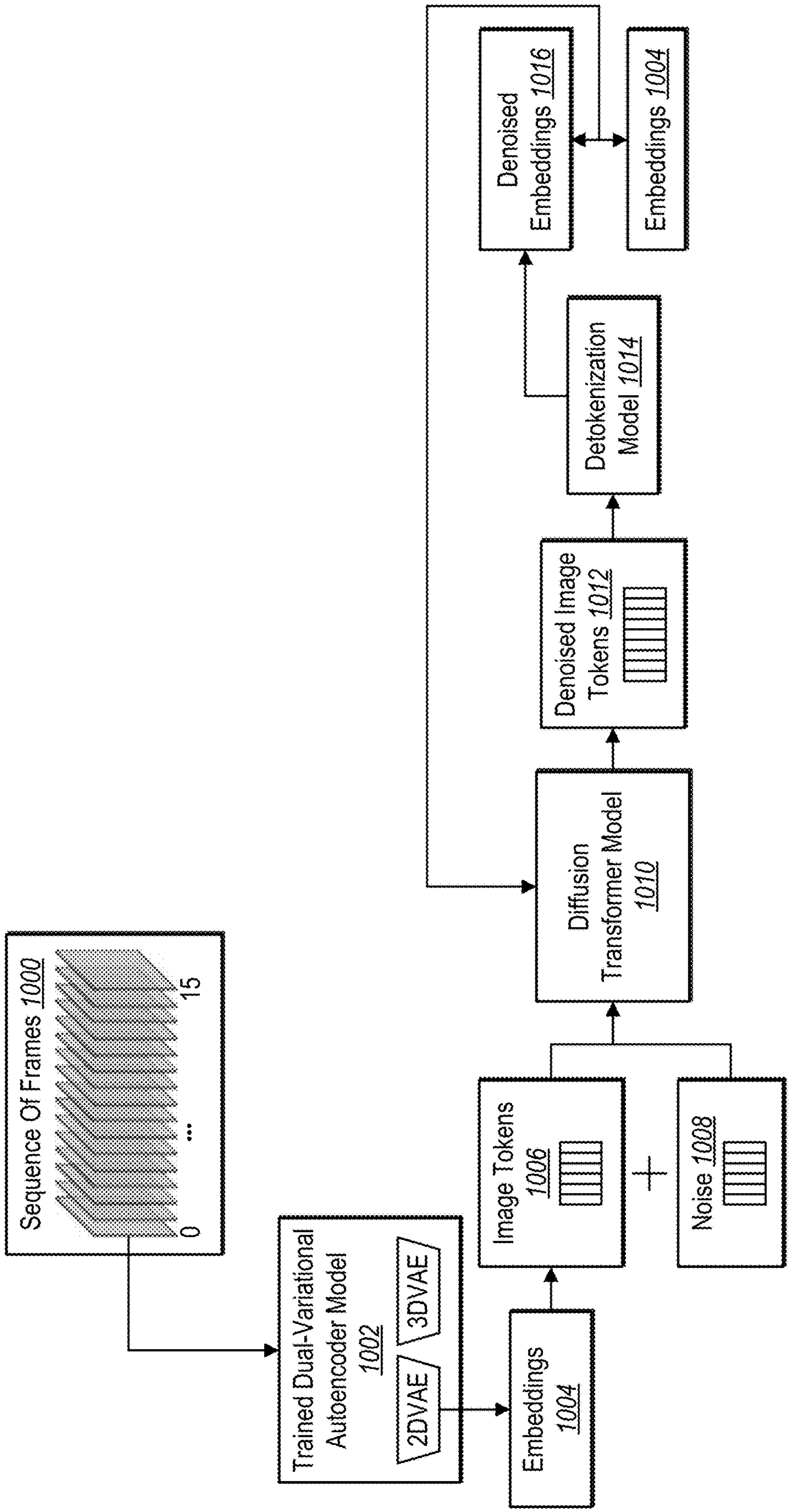
FIGS. 10A-10C illustrates example diagrams of the generative AI digital visual system modifying and refining parameters of a diffusion transformer model in accordance with one or more implementations.
Figure 10B:
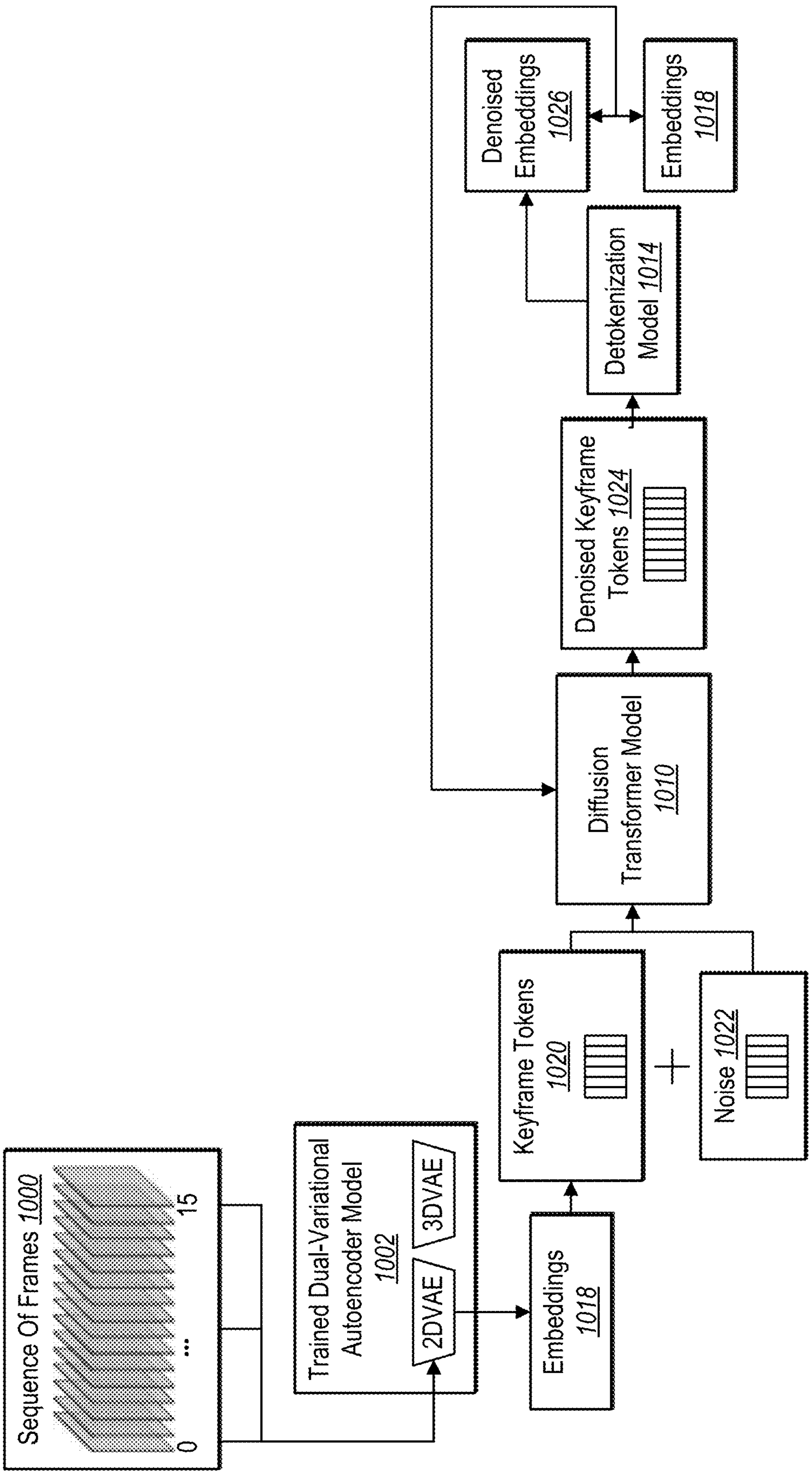
Figure 10C:
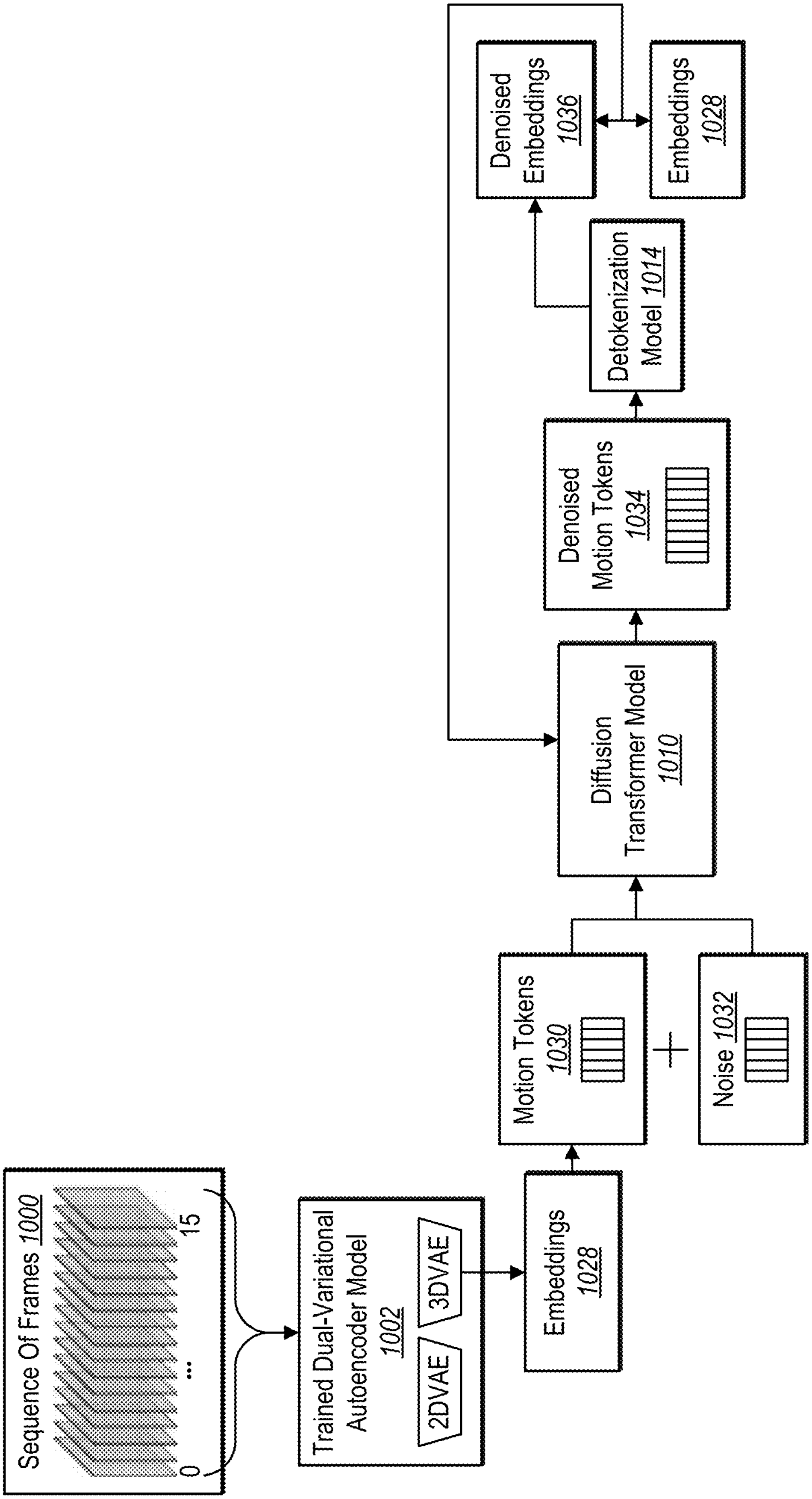

FIGS. 10A-10C illustrates the generative AI digital visual system 102 utilizing the embeddings from the dual-variational autoencoder model to modify/further modify/refine parameters of the diffusion transformer model in accordance with one or more embodiments.

As discussed above, the generative AI digital visual system 102 utilizes the dual-variational autoencoder model to generate embeddings for a sequence of frames 1000. Specifically, the generative AI digital visual system 102 utilizes the dual-variational autoencoder model to generate image embeddings, keyframe embeddings, and motion embeddings. Moreover, the generative AI digital visual system 102 transforms the embeddings generated by the dual-variational autoencoder model by utilizing a tokenization model (e.g., patchification) and further adding noise to the generated tokens.

FIG. 10A illustrates the generative AI digital visual system 102 modifying parameters of the diffusion transformer model based on image embeddings. Specifically, FIG. 10A shows the generative AI digital visual system 102 processing a first frame (e.g., frame zero) of the sequence of frames 1000 utilizing a trained dual-variational autoencoder model 1002. For instance, FIG. 10A shows the generative AI digital visual system 102 utilizing a two-dimensional variational autoencoder to generate embeddings 1004 from the first frame of the sequence of frames 1000.

As shown, the generative AI digital visual system 102 generates image tokens 1006 from the embeddings 1004. Specifically, the generative AI digital visual system 102 utilizes a tokenization model (e.g., patchification) to generate the image tokens 1006. Further, as shown, the generative AI digital visual system 102 feeds the image tokens 1006 and noise 1008 to a diffusion transformer model 1010 which removes noise from the noise 1008 according to the image tokens 1006 (e.g., incorporates concepts from the image tokens 1006). As shown, the generative AI digital visual system 102 utilizes the diffusion transformer model 1010 to generate denoised image tokens 1012 from the noise 1008 and the image tokens 1006.

FIG. 10A further shows the generative AI digital visual system 102 utilizing a detokenization model 1014 to generate denoised embeddings 1016 from the denoised image tokens 1012. As shown, the generative AI digital visual system 102 compares the denoised embeddings 1016 with the embeddings 1004 to determine a measure of loss (e.g., a measure of loss in the latent space) and utilizes the measure of loss to modify parameters of the diffusion transformer model 1010.

FIG. 10A illustrates the generative AI digital visual system 102 modifying parameters of the diffusion transformer model 1010. In one or more embodiments, modifying parameters of the diffusion transformer model 1010 refers to adjusting/optimizing/generating parameters of a model based on image embeddings (e.g., an image frame of the sequence of frames 1000).

FIG. 10A illustrated modifying parameters of the diffusion transformer model 1010, FIG. 10B illustrates the generative AI digital visual system 102 further modifying parameters of the diffusion transformer model 1010. Like FIG. 10A, FIG. 10B shows the generative AI digital visual system 102 processing the sequence of frames 1000 with the trained dual-variational autoencoder model 1002 and generating embeddings 1018.

Specifically, FIG. 10B shows the generative AI digital visual system 102 generating embeddings 1018 from a subset of frames of the sequence of frames 1000. For instance, the subset of frames includes keyframes of the sequence of frames 1000. Thus, in one or more embodiments, the generative AI digital visual system 102 generates the embeddings 1018 as keyframe embeddings. Further, FIG. 10B generates keyframe tokens 1020 from the embeddings 1018 (e.g., utilizing a tokenization model).

As further shown, the generative AI digital visual system 102 processes the keyframe tokens 1020 and noise 1022 with the diffusion transformer model 1010 (e.g., the diffusion transformer model 1010 already has parameters modified based on the principles discussed above in FIG. 10A). Further, the generative AI digital visual system 102 utilizes the diffusion transformer model 1010 to remove noise from the noise 1022 according to the keyframe tokens 1020 to generate denoised keyframe tokens 1024.

Moreover, the generative AI digital visual system 102 utilizes the detokenization model 1014 to generate denoised embeddings 1026 from the denoised keyframe tokens 1024. As shown, the generative AI digital visual system 102 compares the denoised embeddings 1026 to the embeddings 1018 to generate a measure of loss and utilizes the measure of loss to further modify the diffusion transformer model 1010.

FIG. 10C illustrates the generative AI digital visual system 102 refining the further modified parameters of the diffusion transformer model 1010. As shown, the generative AI digital visual system 102 processes the sequence of frames 1000 utilizing the trained dual-variational autoencoder model 1002. Specifically, the generative AI digital visual system 102 generates embeddings 1028 from the sequence of frames 1000 (e.g., motion embeddings). Further, FIG. 10C shows the generative AI digital visual system 102 generating motion tokens 1030 from the embeddings 1028 (e.g., utilizing a tokenization model).

As shown, the generative AI digital visual system 102 utilizes the diffusion transformer model 1010 to process the motion tokens 1030 and noise 1032 to remove noise from the noise 1032 according to the motion tokens 1030. As shown, the generative AI digital visual system 102 generates denoised motion tokens 1034 using the diffusion transformer model 1010. Furthermore, the generative AI digital visual system 102 utilizes a detokenization model 1014 to process the denoised motion tokens 1034 to generate denoised embeddings 1036. From comparing the denoised embeddings 1036 with the embeddings 1028, the generative AI digital visual system 102 generates a measure of loss and refines parameters of the diffusion transformer model 1010.

To reiterate, the generative AI digital visual system 102 utilizes the trained dual-variational autoencoder model 1002 in a sequential manner to train the diffusion transformer model 1010. Specifically, the generative AI digital visual system 102 1) modifies parameters of the diffusion transformer model 1010 with the image embeddings (e.g., from a first frame of the sequence of frames 1000), 2) further modifies parameters of the diffusion transformer model 1010 with the keyframe embeddings (e.g., from a subset of frames of the sequence of frames 1000), and 3) refines parameters of the diffusion transformer model 1010 with the motion embeddings (e.g., the sequence of frames). In other words, the generative AI digital visual system 102 optimizes parameters of the diffusion transformer model 1010 in a sequential and plug-in manner which saves computational resources and time.

As mentioned above, the generative AI digital visual system 102 utilizes improved positional encodings to generate more accurate (e.g., relative to conventional systems) and higher-quality media (e.g., image and/or videos). Various positional encoding methods have been proposed to encode the spatial and temporal relationships among tokens. In some cases, existing systems treat an image as the first frame of a video, which is suboptimal because the first frame is not always well-aligned with a video caption. Further, treating an image (e.g., in an image prompt) as the first frame further causes confusion during training. Moreover, existing systems overlook the importance of media attributes such as aspect ratio and image boundaries, which compromises the ability of existing systems to generate high quality frames.

In one or more embodiments, the generative AI digital visual system 102 utilizes an improved positional encoding scheme that leverages joint training of both image and video data to optimize/fine-tune parameters of a diffusion transformer model. In other words, the generative AI digital visual system 102 effectively aligns video and image data to synthesize the two modalities which results in improved data efficiency and overall model performance in performing generative tasks.

In one or more embodiments, the generative AI digital visual system 102 generates positional encodings by encoding a single scalar value (e.g., a float number or an integer) into a vector. Specifically, the generative AI digital visual system 102 encodes each value into two dimensions (x and y) and combines (e.g., concatenates) the two vectors. To illustrate, the generative AI digital visual system 102 (for each frame of a video) applies a two-dimensional spatial indexing strategy to label each token of a sequence of tokens corresponding to a video.

Figure 11:
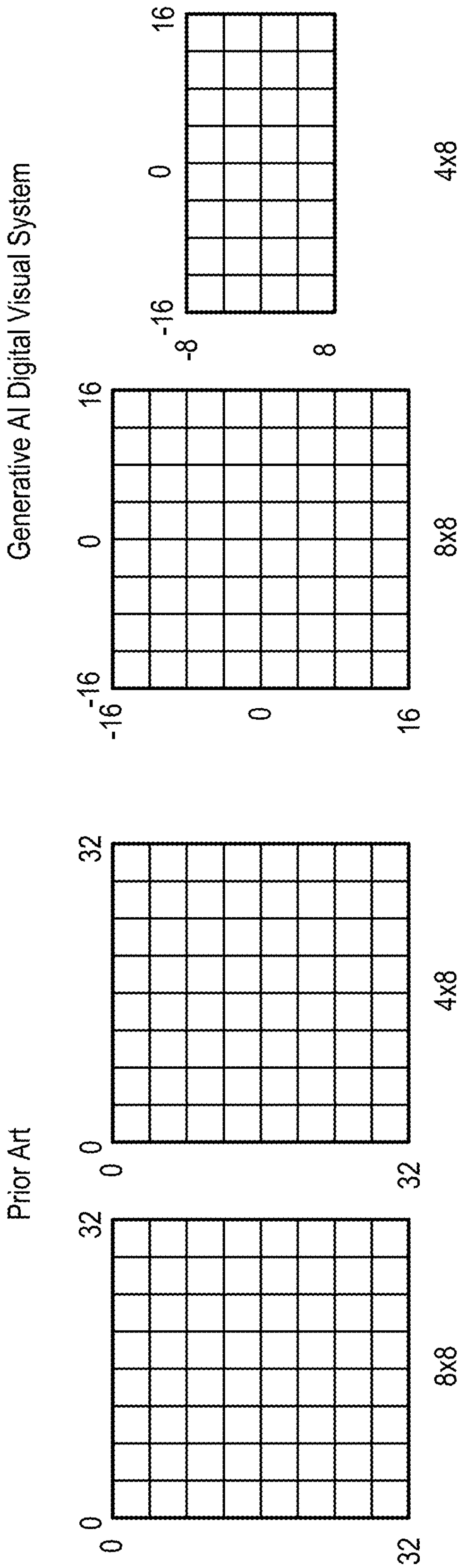
FIG. 11 illustrates a diagram of positional encoding for prior systems compared with positional encoding for the generative AI digital visual system in accordance with one or more implementations.

FIG. 11 illustrates a diagram comparing the generative AI digital visual system 102 creating positional encodings compared with prior art methods. For example, the generative AI digital visual system 102 utilizes a centered two-dimensional coordinate map to index the location of each token in a frame of a sequence of frames and ensures that the aspect ratio of a video is preserved in the coordinates. In contrast, prior art methods use the upper-left corner as the origin and stretches the indices to fit a shorter dimension. In doing so, prior systems cause distortions and compromises the quality of videos.

In other words, for a frame with the same width and height dimensions, the prior art method preserves an aspect ratio. However, for a frame of a video with different dimensions for width and height (e.g., an aspect ratio), prior art methods stretch or compress the frame. To illustrate, FIG. 11 shows that the prior art method has a coordinate map from 0-32 on the x-axis and 0-32 on the y-axis, thus the prior art method fails to incorporate varying aspect ratios. In contrast, FIG. 11 shows the centered two-dimensional coordinate map for an 8×8 map and for a 4×8 map. In other words, the generative AI digital visual system 102 preserves the aspect ratio by cropping a coordinate map if there is a wider aspect ratio (e.g., to ensure that the longest dimension of a frame matches a canvas size of the coordinate map). Moreover, because most objects in a sequence of frames visually appear in the center of the frame, the generative AI digital visual system 102 leverages the centered two-dimensional coordinate map, which has the advantage of assisting model training in learning layouts across different aspect ratios (e.g., relative to conventional systems).

Figure 12:
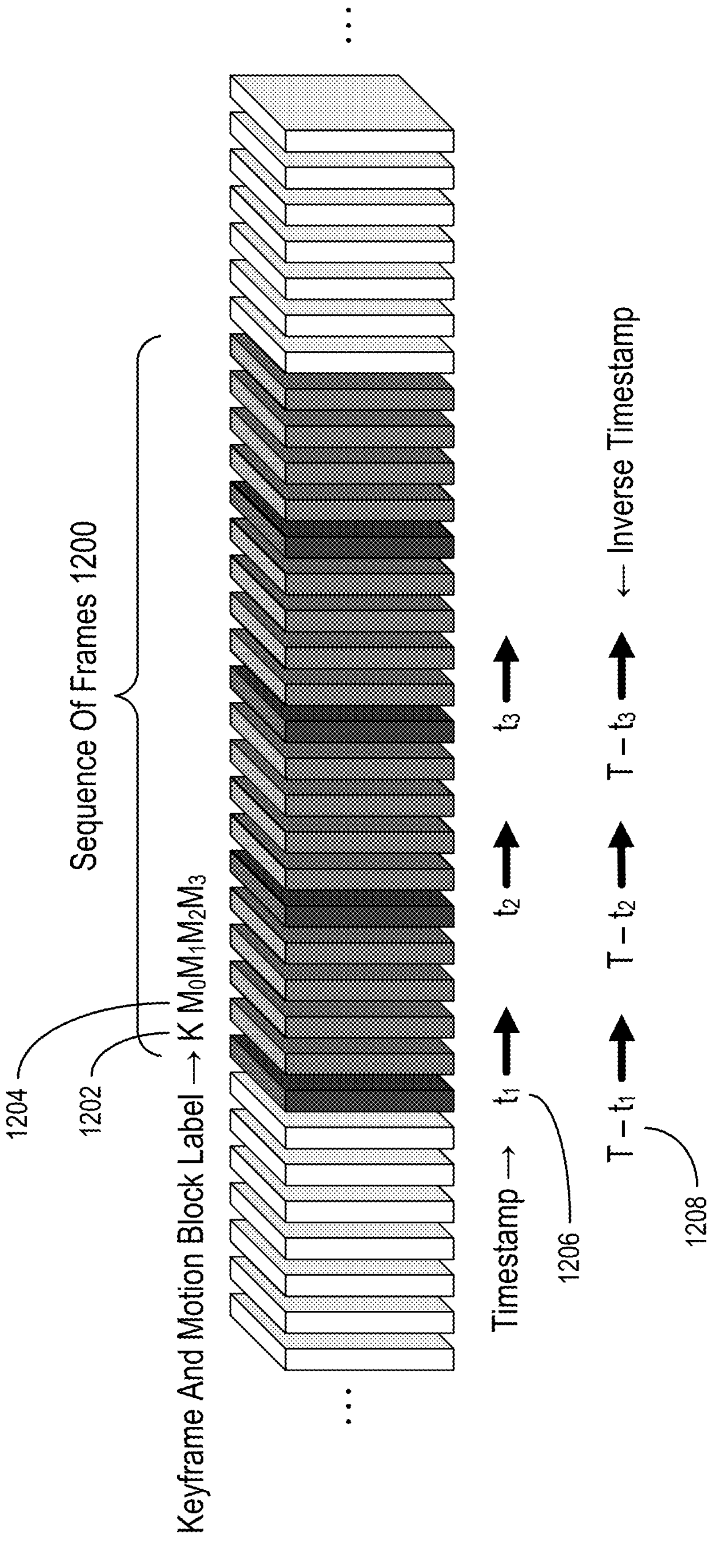
FIG. 12 illustrates a diagram of the generative AI digital visual system creating spatial embeddings and temporal embeddings for a sequence of frames of a video in accordance with one or more implementations.

FIG. 12 illustrates an example diagram of the generative AI digital visual system 102 creating spatial embeddings and temporal embeddings for a sequence of frames of a video. For example, FIG. 12 shows a sequence of frames 1200 of a video that includes keyframes and motion frames. Specifically, FIG. 12 shows a spatial embedding 1202 for a keyframe (e.g., the first frame of the sequence of frames 1200) and further shows a spatial embedding 1204 for a motion frame (e.g., a second frame of the sequence of frames 1200). For instance, the spatial embedding indexes a (spatial) location of the frame relative to the other frames of the sequence of frames 1200. Details of the generative AI digital visual system 102 generating the spatial embedding is given below in FIG. 13.

Furthermore, FIG. 12 shows a timestamp 1206 that indicates a temporal occurrence of a frame in a sequence of frames. For instance, the timestamp 1206 shows a time of the first keyframe in the sequence of frames 1200 relative to the beginning or the start of the sequence of frames 1200. Moreover, FIG. 12 shows an inverse timestamp 1208 that indicates a temporal occurrence of a frame in a sequence of frames relative to the entire video (e.g., total length of the video subtract the current position). In one or more embodiments, the generative AI digital visual system 102 utilizes the inverse timestamp 1208 to more flexibly adapt to varying frame rates per second (e.g., for videos that include multiple different frame rates per second). In other words, the inverse timestamp allows the generative AI digital visual system 102 to be aware of how much content is in the rest of the sequence of frames (e.g., mixing frame rates will not lead to confusing regarding motion speed). Thus, FIG. 12 illustrates the generative AI digital visual system 102 labeling/generating spatial-temporal embeddings for each frame of the sequence of frames 1200 for improved positional encoding.

Figure 13A:
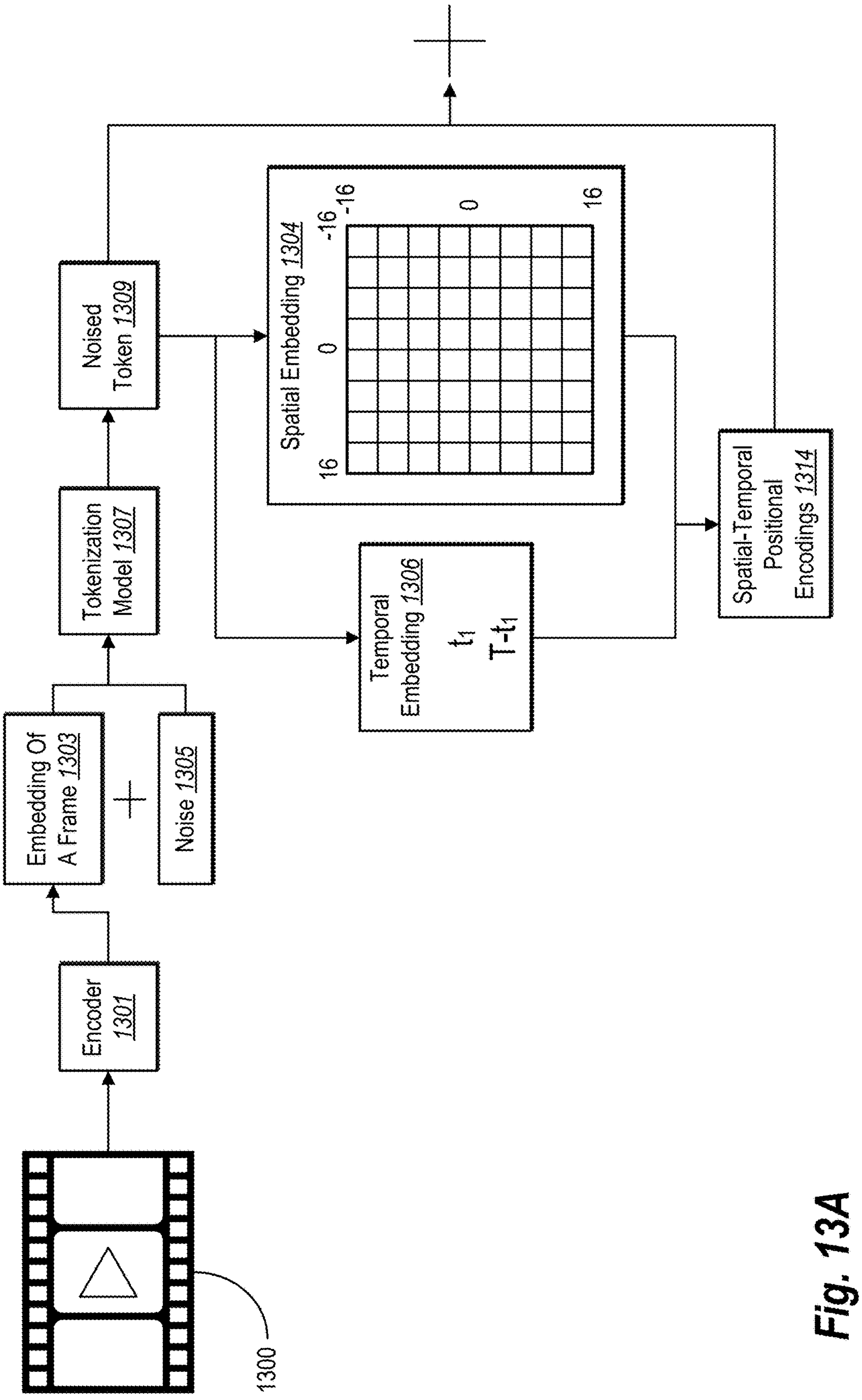
FIGS. 13A-13B illustrates diagrams of the generative AI digital visual system generating noised tokens and spatial-temporal positional encodings and further modifying parameters of the diffusion transformer model in accordance with one or more implementations.

FIG. 13A illustrates an example diagram of the generative AI digital visual system 102 generating noised tokens and spatial-temporal positional encodings. As shown, the generative AI digital visual system 102 utilizes an encoder 1301 to process the video 1300 and generate an embedding 1303 of a frame. Similar to the discussion above in FIG. 7, in one or more embodiments, the generative AI digital visual system 102 adds noise 1305 to the embedding 1303 of a frame and further utilizes a tokenization model 1307 to generate a noised token 1309.

In one or more embodiments, the generative AI digital visual system 102 generates a sequence of noised tokens from the video 1300. Specifically, the generative AI digital visual system 102 generates a series of noised tokens representing various elements of the video 1300. For instance, the series of noised tokens represents image frames, keyframes, motion frames and additional features within each frame. To illustrate, the generative AI digital visual system 102 utilizes the dual-variational autoencoder model to generate embeddings of the video 1300 (e.g., generates image embeddings and keyframe embeddings utilizing the 2DVAE and generates motion embeddings utilizing the 3DVAE).

Moreover, the generative AI digital visual system 102 utilizes a tokenization model (patchification) to generate the noised token 1309 of the embedding 1303 of a frame. To illustrate, the generative AI digital visual system 102 utilizes the tokenization model to transform each frame's feature vector into multiple noised tokens (e.g., corresponding to image patches of a frame), and further generates noised tokens (that indicate the motion frames) that are based on temporal features of the sequence of frames.

FIG. 13A shows the generative AI digital visual system 102 utilizing a centered two-dimensional coordinate map to generate a spatial embedding 1304 for the noised token 1309. In one or more embodiments, the spatial embedding 1304 refers to a representation of spatial relationships and positions of visual elements within a frame (e.g., an image) of a sequence of frames. Specifically, the spatial embedding 1304 includes an indication of where objects/elements in a frame are located, the orientation of objects/elements, the size of objects/elements, and their spatial relationship with different regions of the frame that they are located within. For instance, the generative AI digital visual system 102 utilizes coordinate information (e.g., x-dimension and y-dimension, and in some embodiments a z-dimension) for objects/elements within a frame. In some embodiments, the spatial embedding 1304 indicates absolute position within a frame and in some embodiments, the spatial embedding 1304 indicates relative position (e.g., relative to other objects/elements within a frame).

In one or more embodiments, the generative AI digital visual system 102 utilizes a centered two-dimensional coordinate map to generate the spatial embedding 1304 of the noised token 1309 (e.g., of a sequence of noised tokens). For example, the noised token 1309 represents a single image patch in a frame of a sequence of frames, a subset of noised tokens represents an entire frame within a sequence of frames, and the sequence of noised tokens represents the entire sequence of frames.

For instance, the generative AI digital visual system 102 utilizes a first positional encoding function (e.g., a sine or cosine function) for a first frame of the video to capture a first dimension (x position) of the image patch corresponding to the noised token 1309 within a frame. Further, the generative AI digital visual system 102 utilizes a second positional encoding function to capture a second dimension (y position) of the image patch corresponding to the noised token 1309 within the frame. Moreover, the generative AI digital visual system 102 labels the noised token 1309 (e.g., assigns the image patch corresponding to the token) to a space on the centered two-dimensional coordinate map based on the first dimension (x-dimension) and the second dimension (e.g., the y-dimension) of the token to generate the spatial embedding 1304 for the token. As mentioned above, due to the centered nature of the coordinate map, the generative AI digital visual system 102 preserves/incorporates video attributes such as the aspect ratio of the video.

In other words, the generative AI digital visual system 102 generates the spatial embeddings 1304 to index the locations of image patches within a frame. Further, the generative AI digital visual system 102 generates additional spatial embeddings for additional noised tokens within additional frames. Accordingly, the generative AI digital visual system 102 generates a plurality of spatial embeddings to index image patches relative to other image patches within the same frame and further indexes additional image patches relative to other additional image patches within additional frames.

As further shown, the generative AI digital visual system 102 generates a temporal embedding 1306. In one or more embodiments, the temporal embedding 1306 refers to a representation of a frame within a sequence of visual frames. Specifically, the generative AI digital visual system 102 utilizes the temporal embedding 1306 to capture motion information, action sequences, and transitions between frames within a sequence of frames. In other words, the generative AI digital visual system 102 generates the temporal embedding 1306 to create a representation of sequential dependencies between frames of a sequence of frames.

In one or more embodiments, the generative AI digital visual system 102 generates the temporal embedding 1306 based on a timestamp and an inverse timestamp. For example, the generative AI digital visual system 102 determines a timestamp for the noised token 1309 (e.g., for a first frame of a sequence of frames of the video). Specifically, a timestamp of a first frame refers to a specific point in time at which a frame of the noised token 1309 appears within the overall video or the sequence of frames, relative to the start of the video. Furthermore, the generative AI digital visual system 102 determines an inverse timestamp, which refers to a difference in a total length of the video and the temporal position (e.g., current position) of the frame of the noised token 1309 relative to the sequence of frames. Moreover, the generative AI digital visual system 102 combines the timestamp and the inverse timestamp of the noised token 1309 to generate the temporal embedding 1306.

As further shown in FIG. 13A, the generative AI digital visual system 102 combines the spatial embedding 1304 and the temporal embedding 1306 to generate spatial-temporal positional encodings 1314. In one or more embodiments, the spatial-temporal positional encodings 1314 refer to a data representation of information relating to both spatial relationships and positions of visual elements within a frame and motion information, action sequences, and transitions between frames within a sequence of frames (e.g., sequential dependencies between frames). Specifically, the spatial-temporal positional encodings 1314 includes a combined data representation that captures information from the visual dimension and the temporal dimension. Accordingly, the generative AI digital visual system 102 utilizes the spatial-temporal positional encodings 1314 to remove noise from noised tokens in a high-quality and accurate manner (e.g., to incorporate the context indicated by the data in the spatial-temporal positional encodings 1314).

Further, as shown in FIG. 13A, the generative AI digital visual system 102 combines/adds the noised token 1309 with the spatial-temporal positional encodings 1314 (e.g., to generate a combined noised token with spatial temporal positional encodings). Thus, the generative AI digital visual system 102 processes the noised token 1309 and the spatial-temporal positional encodings 1314 using a diffusion transformer model to remove noise from the noised token 1309 according to the spatial-temporal positional encodings 1314.

FIG. 13A illustrates generating the spatial-temporal positional encodings 1314 for the video 1300 at training time. In other words, at training time, the generative AI digital visual system 102 has access to training data that includes videos with a variety of frames and the generative AI digital visual system 102 leverages that data to generate the spatial-temporal positional encodings 1314 (e.g., from the noised token 1309) to improve the model in learning diversity (e.g., varying media attributes such as frame rates per second and different aspect ratios). Although FIG. 13A shows a single noised token, in one or more embodiments, the generative AI digital visual system 102 generates a plurality of noised tokens and generates spatial-temporal positional encodings 1314 for each of the plurality of noised tokens.

In one or more embodiments, the principles discussed in FIG. 13A also relate to the generative AI digital visual system 102 generating the spatial-temporal positional encodings 1314 at run-time (e.g., inference time). Specifically, the generative AI digital visual system 102 generates the spatial-temporal positional encodings 1314 based on user-provided input or default media/video attributes (e.g., the media attributes discussed above in FIG. 6 such as an indicated aspect ratio, frame rate per second, camera motion, camera view, etc.). For instance, at run-time, the generative AI digital visual system 102 receives noised VAE tokens (e.g., embeddings generated by the dual-VAE model discussed above and noise is added to those embeddings and then tokenized) along with the spatial-temporal positional encodings 1314. Moreover, the generative AI digital visual system 102 processes the spatial-temporal positional encodings 1314 along with the noised VAE tokens and text tokens/visual tokens via a diffusion transformer model (e.g., to generate denoised VAE tokens).

The following description describes technical details of generating the positional encodings for the sequence of frames. In one or more embodiments, the generative AI digital visual system 102 utilizes a positional index (pos) and a target embedding dimension d, to map pos to a d-dimension embedding vector via a sinusoidal positional encoding.

$$F_d(pos) = f_{sincos}(pos, 0), f_{sincos}(pos, 1), \ldots, f_{sincos}(pos, d-1)], \quad (1)$$

where $$f_{sincos}(pos, 2i) = \sin\left(pos/K^{2i/d}\right)$$

$$f_{sincos}(pos, 2i+1) = \cos\left(pos/K^{2i/d}\right).$$

For instance, the first equation shows that the positional index is mapped to a certain dimension based applying a sinusoidal positional function at each position of a frame of a sequence of frames. Specifically, the second equation shows that for a first dimension (2i) of a position, the generative AI digital visual system 102 applies a sine positional encoding function. Moreover, for a second dimension (2i+1) of a position, the generative AI digital visual system 102 applies a cosine positional encoding function.

In one or more embodiments, the generative AI digital visual system 102 for each frame in a video applies a spatial indexing strategy that labels each token using a centered and normalized xy-coordinate system (see FIG. 11). Moreover, in one or more embodiments, for the temporal positional encoding (PE), each frame is labeled according to its wall-time timestamp t in the original video (e.g., the sequence of frames). To further enhance the temporal awareness of the diffusion transformer model, the generative AI digital visual system 102 also incorporates the inverse timestamp T−t, where T represents the total length of the video. As mentioned above, the generative AI digital visual system 102 utilizes the timestamp and the inverse timestamp because it is frame-rate agnostic, ensuring consistent representation across different frame rates. Therefore, for each video token, its spatial-temporal positional index is [x,y,t,T−t]. In one or more embodiments, the generative AI digital visual system 102 maps the positional index to a d-dimension embedding vector by:

$$PE([x, y, t, T-t]) = F_{d/4}(x) \oplus F_{d/4}(y) \oplus F_{d/4}(t) \oplus F_{d/4}(T-t) \quad (3)$$

where $\oplus$ is the vector concatenation operator.

In one or more embodiments, a video may be encoded in a chunk-wise fashion, where each chunk consists of a key-frame block and several motion blocks. Specifically, all blocks within a chunk share the same spatial-temporal encoding. To differentiate between the blocks within each chunk, the generative AI digital visual system 102 further introduces a learnable d-dimensional embedding that uniquely identifies each block. For instance, the generative AI digital visual system 102 adds the block specific embedding to the chunk-wise spatial-temporal encoding. In doing so, the generative AI digital visual system 102 stabilizes the multi-stage training process, where the diffusion transformer model is initially trained on images and then fine-tuned on both image and video data.

In one or more embodiments, the improved positional encoding scheme utilized by the generative AI digital visual system 102 indexes an image token as [x,y,0,0], while the first frame of a video is indexed as [x,y,0,T]. In doing so, the bidirectional time embedding scheme allows the generative AI digital visual system 102 to distinguish between a static image and a frame within a video.

In one or more embodiments, the generative AI digital visual system 102 generates positional encodings utilizing a chunk-wise fashion, where each chunk includes a keyframe block and several motion blocks. Specifically, the generative AI digital visual system 102 utilizes the chunk-wise fashion to generate multiple subsets of frames of the sequence of frames of a video. For instance, each subset of frames (of the multiple subsets of frames) includes a key-frame block and a set of motion blocks.

In one or more embodiments, the generative AI digital visual system 102 generates noised tokens with spatial-temporal positional encodings and a block-specific token. For example, because each frame within a subset of frames (e.g., a chunk) contains the same spatial-temporal positional encodings, the generative AI digital visual system 102 further distinguishes each frame with a block-specific token. Thus, a keyframe block and a motion block within a first subset of frames (e.g., a first chunk) share the same spatial-temporal positional encodings but are distinguished from one another with a block-specific token.

To illustrate, the generative AI digital visual system 102 leverages the chunk-wise fashion for generating positional encodings to efficiently and effectively feed/train a diffusion transformer model in a multi-stage manner. For instance, the generative AI digital visual system 102 utilizes a relatively lower number of videos (e.g., relative to conventional systems) to train a model to generate high-quality video results by using the improved positional encoding strategy to generate positional encodings and learn a latent space for reconstructing videos.

Figure 13B:
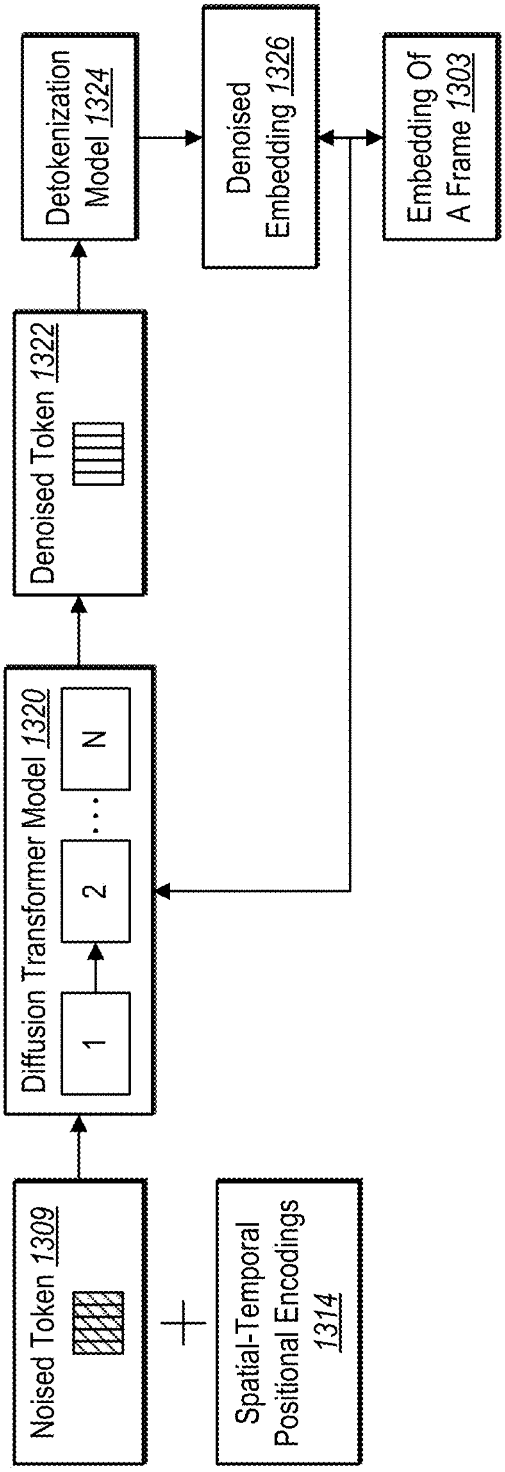

FIG. 13B illustrates the generative AI digital visual system 102 processing noised tokens and spatial-temporal positional encodings to modify parameters of a diffusion transformer model. Specifically, FIG. 13B shows the generative AI digital visual system 102 processing the noised token 1309 and the spatial-temporal positional encodings 1314 (e.g., the generative AI digital visual system 102 combines the noised token 1309 with the spatial-temporal positional encodings 1314 to create a combined token) and uses the diffusion transformer model 1320 to remove noise from the noised token 1309 to generate denoised token 1322.

As shown, the generative AI digital visual system 102 utilizes a detokenization model 1324 to process the denoised token 1322 and generate denoised embedding 1326. For instance, FIG. 13B shows the generative AI digital visual system 102 comparing the denoised embedding 1326 with the embedding 1303 of a frame to generate a measure of accuracy of the denoised embedding 1326. Moreover, FIG. 13B shows the generative AI digital visual system 102 modifying parameters of the diffusion transformer model 1320 based on the measure of accuracy.

Figure 14:
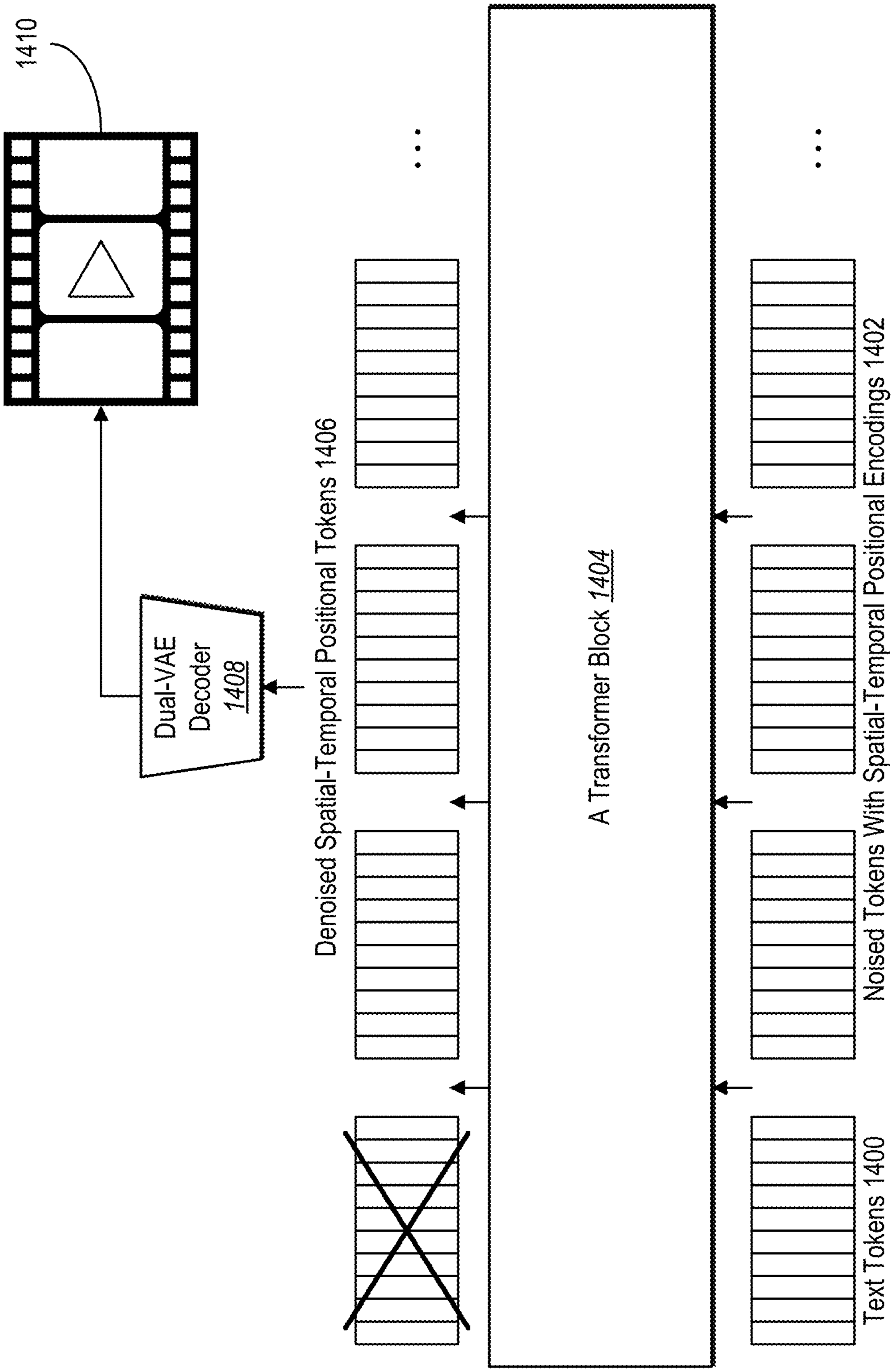
FIG. 14 illustrates a diagram of the generative AI digital visual system processing, using a transformer block, noised tokens with spatial-temporal positional encodings in accordance with one or more implementations.

FIG. 14 illustrates the generative AI digital visual system 102 at inference time processing the noised tokens and the spatial-temporal positional encodings with a transformer block (e.g., in response to a video generation request to generate a video from a text prompt). For example, FIG. 14 shows text tokens 1400 and noised tokens with spatial-temporal positional tokens 1402. Specifically, as further shown, the generative AI digital visual system 102 utilizes a transformer block 1404 to remove noise from the noised tokens according to the spatial-temporal positional tokens and the text tokens 1400. Furthermore, FIG. 14 shows the generative AI digital visual system 102 utilizing the transformer block 1404 to generate denoised spatial-temporal positional tokens while also discarding the text tokens 1400.

In one or more embodiments, the generative AI digital visual system 102 discards the text tokens 1400 because the text tokens 1400 are useful for denoising the noised tokens but are not necessary for generating the media (e.g., the image or the video). As shown in FIG. 14, the generative AI digital visual system 102 utilizes a dual-VAE decoder 1408 to process the denoised spatial-temporal positional tokens 1406 to generate media 1410. To illustrate, the generative AI digital visual system 102 generates media that includes a video in accordance with video attributes indicated by the spatial-temporal positional encodings, a text prompt, and/or a visual prompt.

Figure 15A:
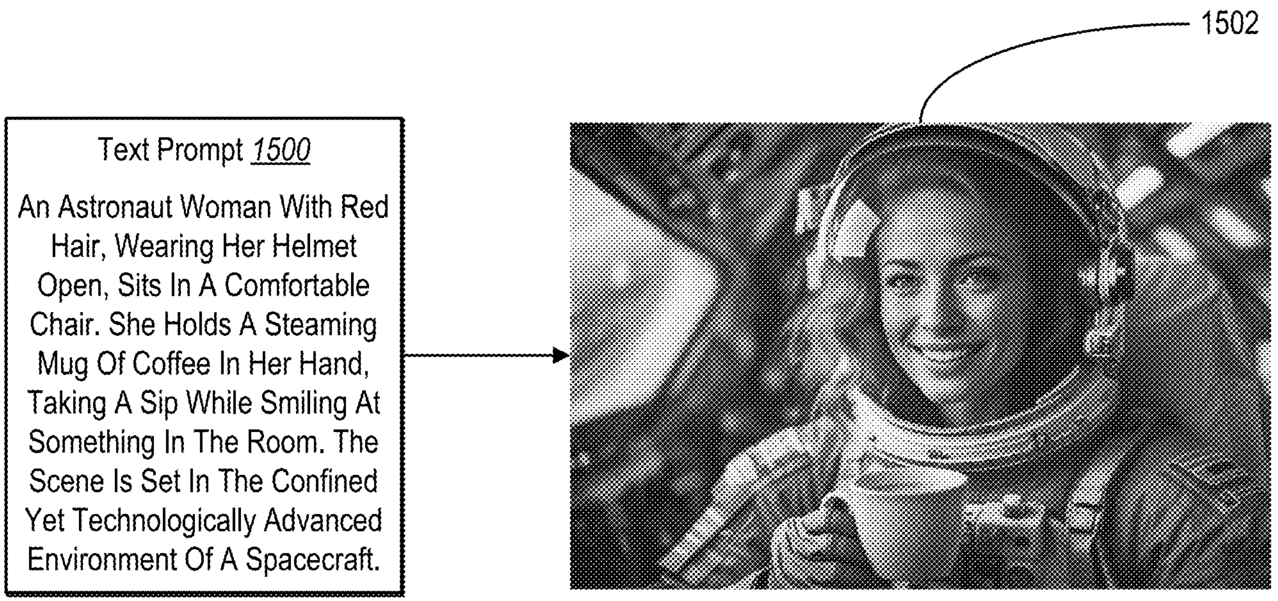
FIGS. 15A-15B illustrates diagrams of the generative AI digital visual system generating images from text prompts in accordance with one or more implementations.
Figure 15B:
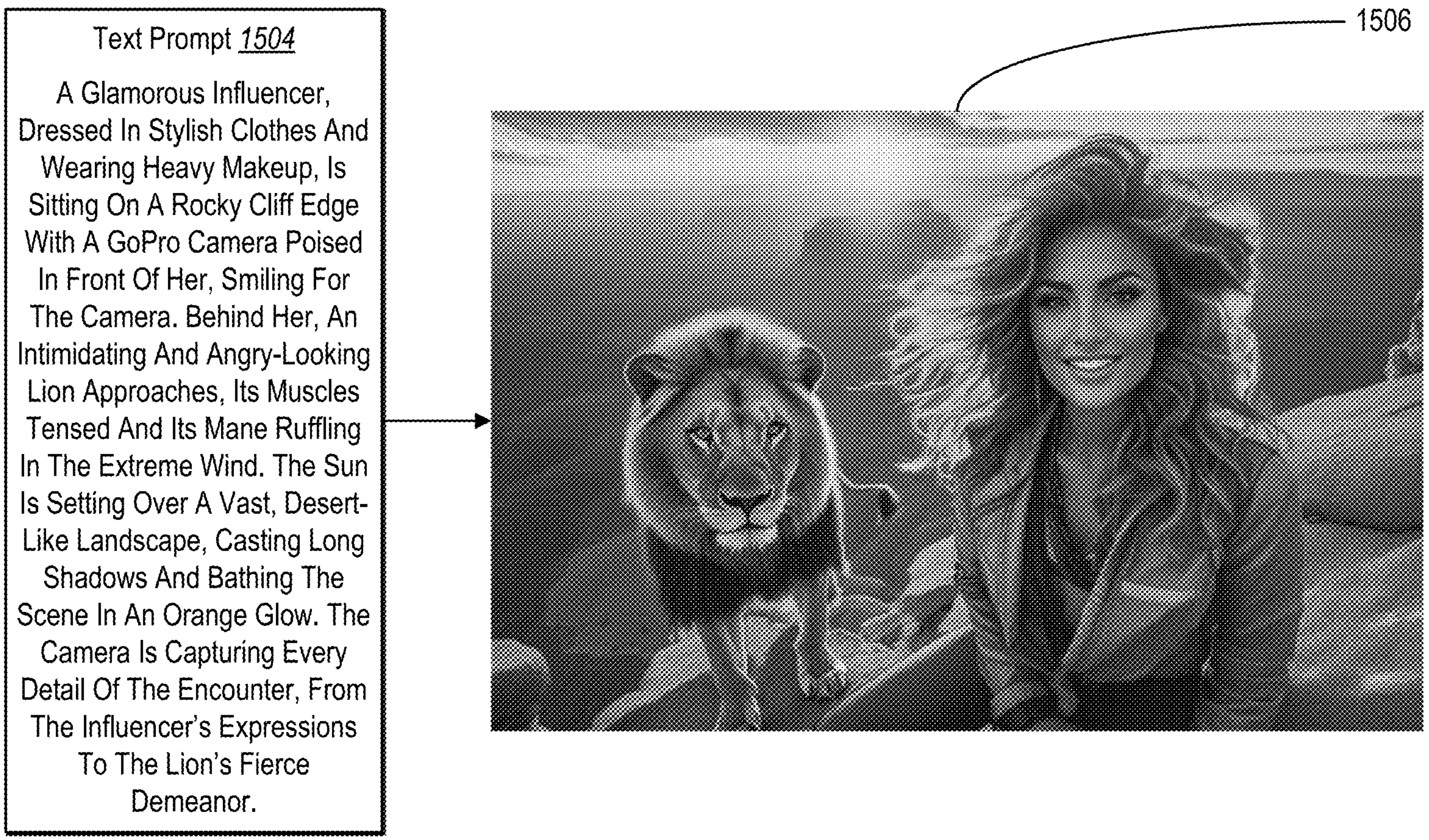

FIGS. 15A-15B illustrates example results of the generative AI digital visual system 102 generating digital images from text prompts. For example, FIG. 15A shows a text prompt 1500 that reads "an astronaut woman with red hair, wearing her helmet open, sits in a comfortable chair. She holds a steaming mug of coffee in her hand, taking a sip while smiling at something in the room. The scene is set in the confined yet technologically advanced environment of a spacecraft." Thus, FIG. 15A demonstrates that the generative AI digital visual system 102 is able to fulfill the requirements of a long descriptive text prompt and generate a digital image 1502.

FIG. 15B shows a text prompt 1504 that reads "a glamorous influencer, dressed in stylish clothes and wearing heavy makeup, is sitting on a rocky cliff edge with a GoPro camera poised in front of her, smiling for the camera. Behind her, an intimidating and angry-looking lion approaches, its muscles tensed and its mane ruffling in the extreme wind. The sun is setting over a vast desert-like landscape, casting long shadows and bathing the scene in an orange glow. The camera is capturing every detail of the encounter, from the influencer's expression to the lion's fierce demeanor. FIG. 15B also demonstrates that the generative AI digital visual system 102 is able to fulfill the requirements of a long descriptive text prompt and generate a digital image 1506. In one or more embodiments, due to the generative AI digital visual system 102 leveraging a single stream diffusion transformer, the generative AI digital visual system 102 generates digital images with a higher level of semantic understanding (e.g., relative to conventional systems).

Figure 16A:
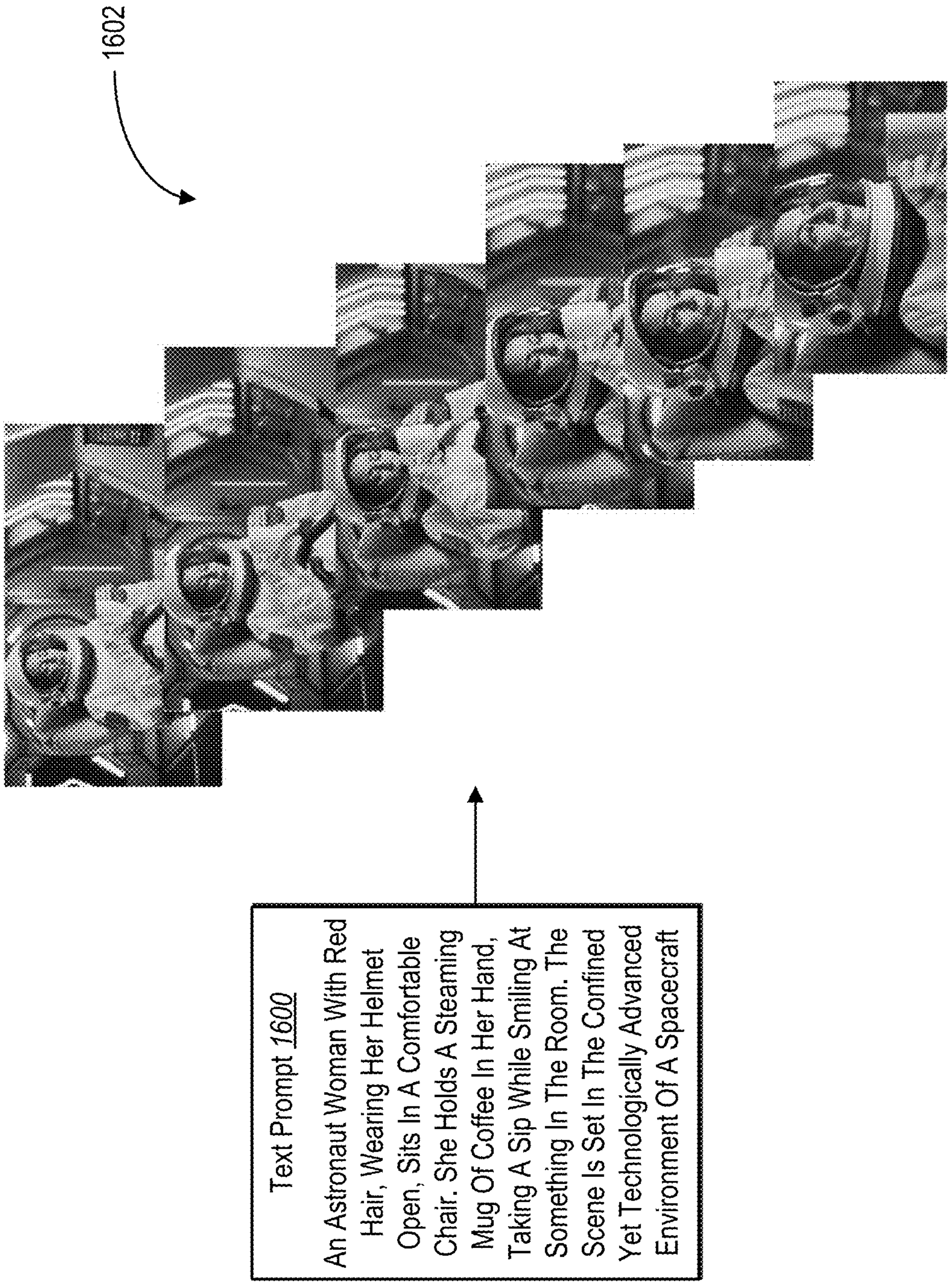
FIGS. 16A-16C illustrates diagrams of the generative AI digital visual system generating videos from text prompts in accordance with one or more implementations.
Figure 16B:
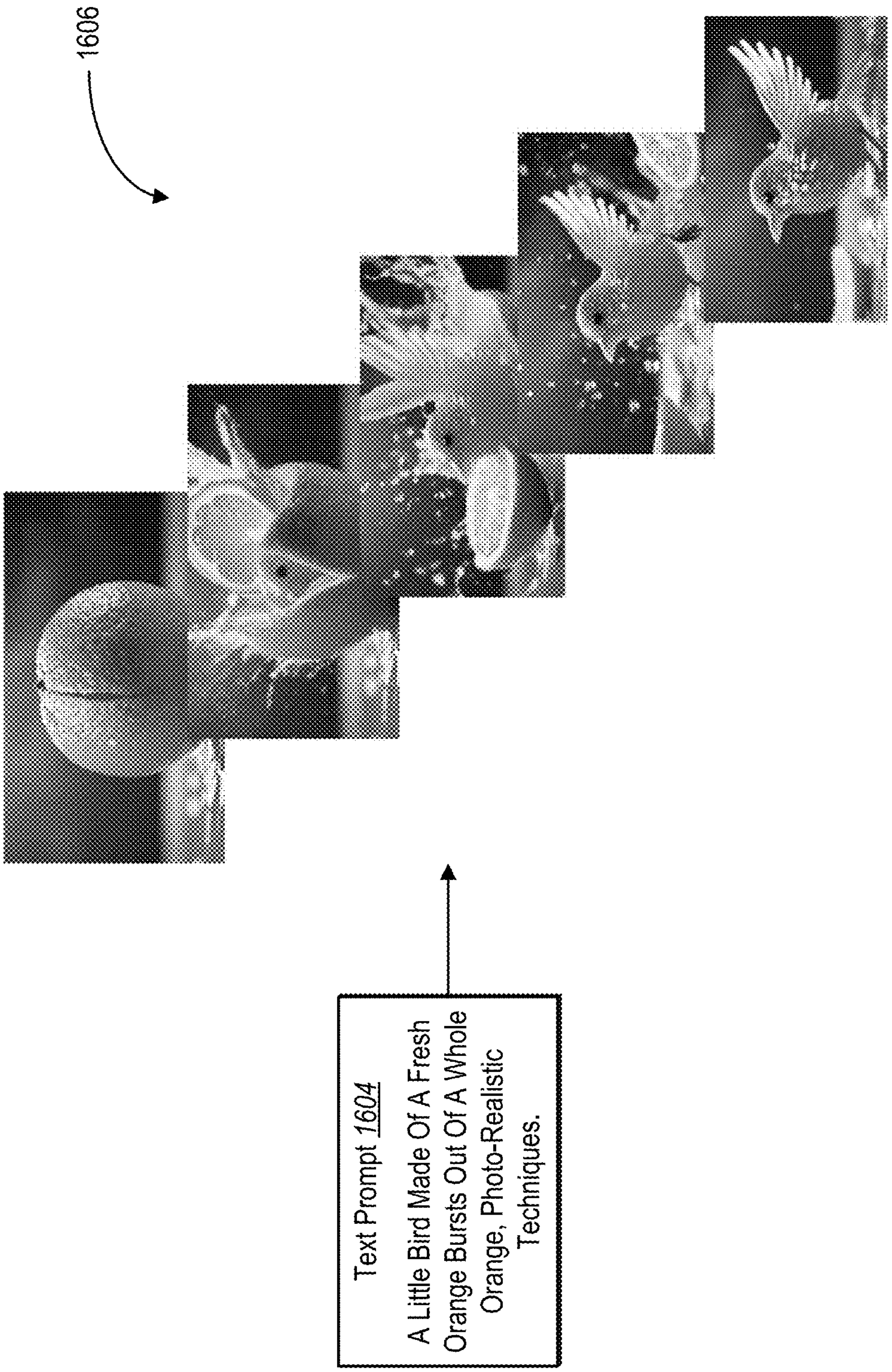
Figure 16C:
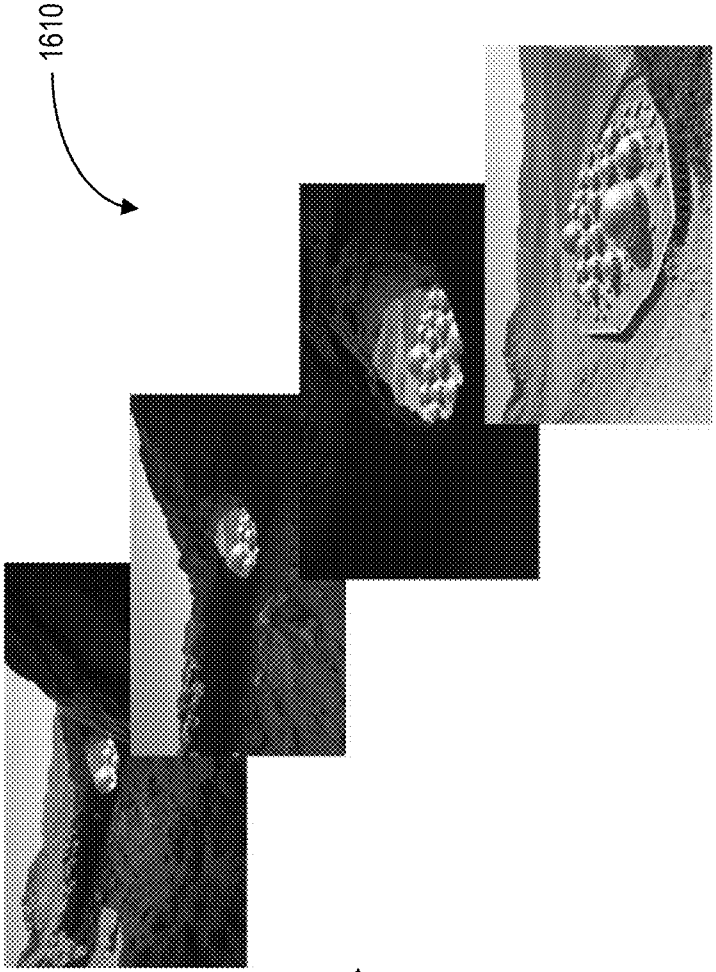

FIGS. 16A-16C shows the generative AI digital visual system 102 generating videos from text prompts. For example, FIG. 16A has a text prompt 1600 that reads the same as the text prompt 1500 in FIG. 15A. In contrast to FIG. 15A, FIG. 16A shows the generative AI digital visual system 102 generating a video 1602 of the text prompt 1600. Specifically, the video depicts a sequence of frames where the astronaut slowly sips from her mug of coffee.

FIG. 16B has a text prompt 1604 that reads "a little bird made of a fresh orange bursts out of a whole orange, photo-realistic techniques." Further, FIG. 16B shows the generative AI digital visual system 102 generating a video 1606 that depicts a sequence of frames of a bird bursting out of an orange in a photo-realistic manner. FIG. 16C shows a text prompt 1608 that reads "entering a Martian cave to reveal an alien colony hidden within, cinematic FPV." Moreover, FIG. 16C shows the generative AI digital visual system 102 generating a video 1610 with a first person view of slowly getting closer to a cave and revealing a hidden alien colony. Thus, FIGS. 16A-16C show the generative AI digital visual system 102 generating high-quality and accurate videos according to a user-provided text prompt.

In one or more embodiments, the generative AI digital visual system 102 further prepares the diffusion transformer model with fine video camera control. For example, the generative AI digital visual system 102 achieves precise three-dimensional camera manipulations by using Plucker ray conditioning during training time. For instance, the generative AI digital visual system 102 integrates camera embeddings into the text-to-video generation process, where per-frame Plucker coordinates, derived from camera pose parameters, are processed as positional embeddings through a learnable multi-layer perceptron.

To illustrate, the generative AI digital visual system 102 prepares Plucker ray data by annotating training videos with camera poses. For a video with/frames, the generative AI digital visual system 102 utilizes a structure from motion model to extract intrinsic and extrinsic camera parameters. Intrinsics are captured by $K_i$, which encodes focal length and principal point, while extrinsics include a rotation of matrix $R_i$ and translation vector $t_i$, forming the transformation matrix $[R_i|t_i]$. This yields a sequence $$(K_i\ [R_i|t_i]_{i=1}^{F}.$$

To address scale ambiguity, the generative AI digital visual system 102 normalizes all poses to the first frame's coordinate system by setting $R_1=I$ and $t_1=0$. We also scale camera positions to a fixed range to improve consistency across datasets.

The pixel rays are parameterized using Plucker coordinates as $r=(o\times d, d)$, where o is the origin, d is the direction of the ray, and $\times$ denotes the cross product. These Plucker coordinates are then passed through a learnable tokenizer, yielding tokenized positional embeddings. The overall transformation from camera pose to token embeddings is expressed as:

$$PE_{i,h,w} = FF_\theta\ (\text{Plucker}\ (K_i, [R_i \mid t_i], h, w)), \tag{4}$$

where $FF_\theta$ is a learnable feed-forward network, and $PE_{i,h,w}$ represents the positional embedding for the pixel at (h,w) in frame i. This provides fine-grained spatiotemporal tokens for precise camera motion control.

Unlike conventional systems (e.g., which use classifier-free guidance and sacrifice pixel quality and lead to over-contrast and over-saturation), in one or more embodiments, the generative AI digital visual system 102 utilizes energy-preserving classifier-free guidance to produce semantically plausible visuals that adhere to user-provided text prompts. Specifically, energy of a latent (e.g., embedding) produced by classifier free guidance is re-scaled b the generative AI digital visual system 102 to match that of a conditional latent to reduce pixel quality issues while maintaining strong text alignment with a user-provided text prompt.

```
# Input list:
# unconditional prediction, conditional prediction, CFG strength
# Step 1: compute CFG prediction
x_cfg = x_c + (λ − 1) · (x_c − x_u)
# Step 2: rescale the energy of CFG prediction to match that of
conditional prediction

x'_cfg = x_cfg/||x_cfg|| · ||x_c||
```

In one or more embodiments, the generative AI digital visual system 102 employs a variety of techniques for training the diffusion transformer model. Specifically, the generative AI digital visual system 102 filters out samples for text captions that do not satisfy a threshold length or if the text captions do not match a target language. Moreover, the generative AI digital visual system 102 establishes various aesthetic requirements, removes duplicate images, adds computer-generated captions of images and leverages synthetic data. Further, the generative AI digital visual system 102 utilizes aspect ratio bucketing to improve the training process of the diffusion transformer model.

In one or more embodiments, the generative AI digital visual system 102 performs random cropping on image data but avoids cropping off the tops of salient objects (e.g., cropping the heads of objects). Further, in one or more embodiments, the generative AI digital visual system 102 further adds tagging to a text prompt. To illustrate, for a text caption "friends talking at a café table during coffee break," it is unclear whether the target image is a photo or a drawing. As such, the generative AI digital visual system 102 tags the caption with concepts such as style, aesthetics, and composition during model training.

In one or more embodiments, for a video data training pipeline, the generative AI digital visual system 102 samples a fixed number of frames evenly spaced throughout a video to cover as much of an entire temporal span as possible. Specifically, the generative AI digital visual system 102 spatially down-samples a video to various resolutions using bilinear interpolation with antialiasing. For example, the generative AI digital visual system 102 utilizes a diverse set of video data to allow the diffusion transformer model to learn diverse concepts and correctly learns motion. As mentioned above, the generative AI digital visual system 102 utilizes the embeddings generated from the dual-variational autoencoder model to help a diffusion transformer model learn the motion latent space.

Figure 17:
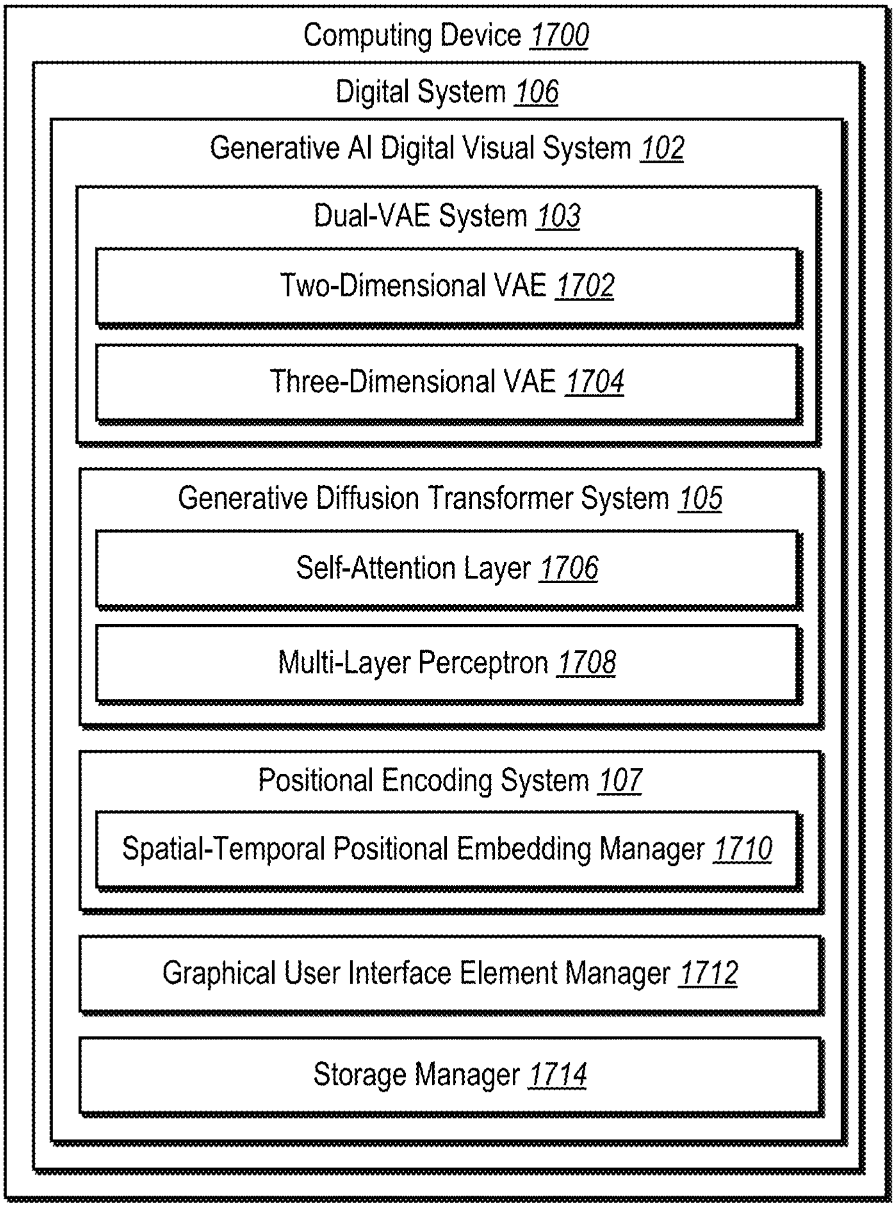
FIG. 17 illustrates a schematic diagram of the generative AI digital visual system in accordance with one or more implementations.

Turning to FIG. 17, additional detail will now be provided regarding various components and capabilities of the generative AI digital visual system 102. In particular, FIG. 17 illustrates an example schematic diagram of a computing device 1700 (e.g., the server(s) 104 and/or the client device 110) implementing the generative AI digital visual system 102 in accordance with one or more embodiments of the present disclosure for components 1700-1720. As illustrated in FIG. 17, the generative AI digital visual system 102 includes a two-dimensional VAE 1702, a three-dimensional VAE 1704, a self-attention layer 1706, a multi-layer perceptron 1708, a spatial-temporal positional embedding manager 1710, a graphical user interface element manager 1712, and a storage manager 1714.

The two-dimensional VAE 1702 works with the dual-VAE system 103 to generate embeddings. Specifically, the two-dimensional VAE 1702 generates image embeddings from image frames of a sequence of frames of a video. Further, the two-dimensional VAE 1702 generates keyframe embeddings from a subset of frames (e.g., keyframes) of a sequence of frames of a video. For instance, the two-dimensional VAE 1702 generates embeddings and further utilizes a decoder of the two-dimensional VAE 1702 to reconstruct a frame (e.g., an image frame or a keyframe).

The three-dimensional VAE 1704 works with the dual-VAE system 103 to generate embeddings. Specifically, the three-dimensional VAE 1704 generates motion embeddings from a sequence of frames. For instance, the three-dimensional VAE 1704 processes image frames, keyframes and motion frames to generate motion embeddings. Further, in one or more embodiments, the three-dimensional VAE 1704 utilizes a decoder to generate a reconstructed video from the motion embeddings, the image embeddings, and the keyframe embeddings.

The self-attention layer 1706 generates a self-attention output. For example, the self-attention layer 1706 works with the generative diffusion transformer system 105 to generate a self-attention output from noised tokens and positional encodings. For instance, the self-attention layer 1706 operates to indicate how much attention a token (in a sequence of tokens) should pay attention to other tokens in the sequence of tokens. By doing so, the self-attention layer 1706 generates an intermediate output and further combines the output with the initial input to a transformer block. Thus, the self-attention layer 1706 manages outputs for a specific part of a transformer block.

The multi-layer perceptron 1708 generates a multi-layer perceptron output. For example, the multi-layer perceptron 1708 processes a self-attention layer output and outputs the multi-layer perceptron output that is further combined with an initial input into the multi-layer perceptron. For instance, the multi-layer perceptron generates an intermediate denoised token or a denoised token by combining the multi-layer perceptron output with an initial input into the multi-layer perceptron 1708. Thus, the generative diffusion transformer system 105 works with a simplified architecture of the self-attention layer 1706 and the multi-layer perceptron 1708 to remove noise from noised tokens in an efficient and effective manner.

The spatial-temporal positional embedding manager 1710 generates spatial-temporal positional encodings. For example, the spatial-temporal positional embedding manager 1710 generates a sequence of tokens (e.g., a sequence of noised tokens) from a video. Furthermore, the spatial-temporal positional embedding manager 1710 generates a spatial embedding for a noised token of the sequence of tokens by using a centered two-dimensional coordinate map. For instance, the spatial-temporal positional embedding manager 1710 uses a centered coordinate map to adapt to and capture nuanced media attributes, such as an aspect ratio. Moreover, the spatial-temporal positional embedding manager 1710 further generates a temporal embedding for the noised token of the sequence of tokens and combines the temporal embedding and the spatial embedding to generate the spatial-temporal positional encodings. Further, the spatial-temporal positional embedding manager 1710 adds the spatial-temporal positional encodings to a noised token. In other words, the spatial-temporal positional embedding manager 1710 adds spatial and temporal encoding information to noised tokens to inform a transformer block on how to remove noise from a noised token.

The graphical user interface element manager 1712 causes a graphical user interface of a client device to display one or more visual elements. For instance, the graphical user interface element manager 1712 causes a graphical user interface to display default media attributes and customizable media attributes. Further, the graphical user interface element manager 1712 further provides an input element for inputting a text prompt and/or a visual prompt. Moreover, the graphical user interface element manager 1712 provides an option to indicate to the generative AI digital visual system 102 to generate media. In response to a selection of an option to generate media, the generative AI digital visual system 102 generates media and provides for display the generated media to a client device (e.g., a client device that submitted the text prompt and/or the visual prompt).

The storage manager 1714 stores one or more items generated by the generative AI digital visual system 102. For example, the storage manager 1714 stores image embeddings, keyframe embeddings, motion embeddings, a trained two-dimensional VAE, a trained three-dimensional VAE, a trained dual-VAE, tokens, noised tokens, spatial-temporal positional encodings, transformer block architecture, denoised tokens, denoised embeddings, and measures of accuracy. For instance, the storage manager 1714 further stores modification training data (modifying based on image embeddings and further modifying based on keyframe embeddings), and fine-tuning/training data (e.g., based on motion embeddings), loss functions, training datasets (e.g., with training phrases), image datasets, video datasets, and generated digital media (e.g., videos and images generated from text and visual prompts).

Each of the components 1702-1714 of the generative AI digital visual system 102 can include software, hardware, or both. For example, the components 1702-1714 can include one or more instructions stored on a computer-readable storage medium and executable by processors of one or more computing devices, such as a client device or server device. When executed by the one or more processors, the computer-executable instructions of the generative AI digital visual system 102 can cause the computing device(s) to perform the methods described herein. Alternatively, the components 1702-1714 can include hardware, such as a special-purpose processing device to perform a certain function or group of functions. Alternatively, the components 1702-1714 of the generative AI digital visual system 102 can include a combination of computer-executable instructions and hardware.

Furthermore, the components 1702-1714 of the generative AI digital visual system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1702-1714 of the generative AI digital visual system 102 may be implemented as a stand-alone application, such as a desktop or mobile application. Furthermore, the components 1702-1714 of the generative AI digital visual system 102 may be implemented as one or more web-based applications hosted on a remote server. Alternatively, or additionally, the components 1702-1714 of the generative AI digital visual system 102 may be implemented in a suite of mobile device applications or "apps." For example, in one or more embodiments, the generative AI digital visual system 102 can comprise or operate in connection with digital software applications such as ADOBE® FIREFLY, ADOBE® CREATIVE CLOUD, ADOBE® PHOTOSHOP®, ADOBE® PREMIERE PRO, ADOBE® AFTER EFFECTS, AND ADOBE® ILLUSTRATOR.

Figure 18:
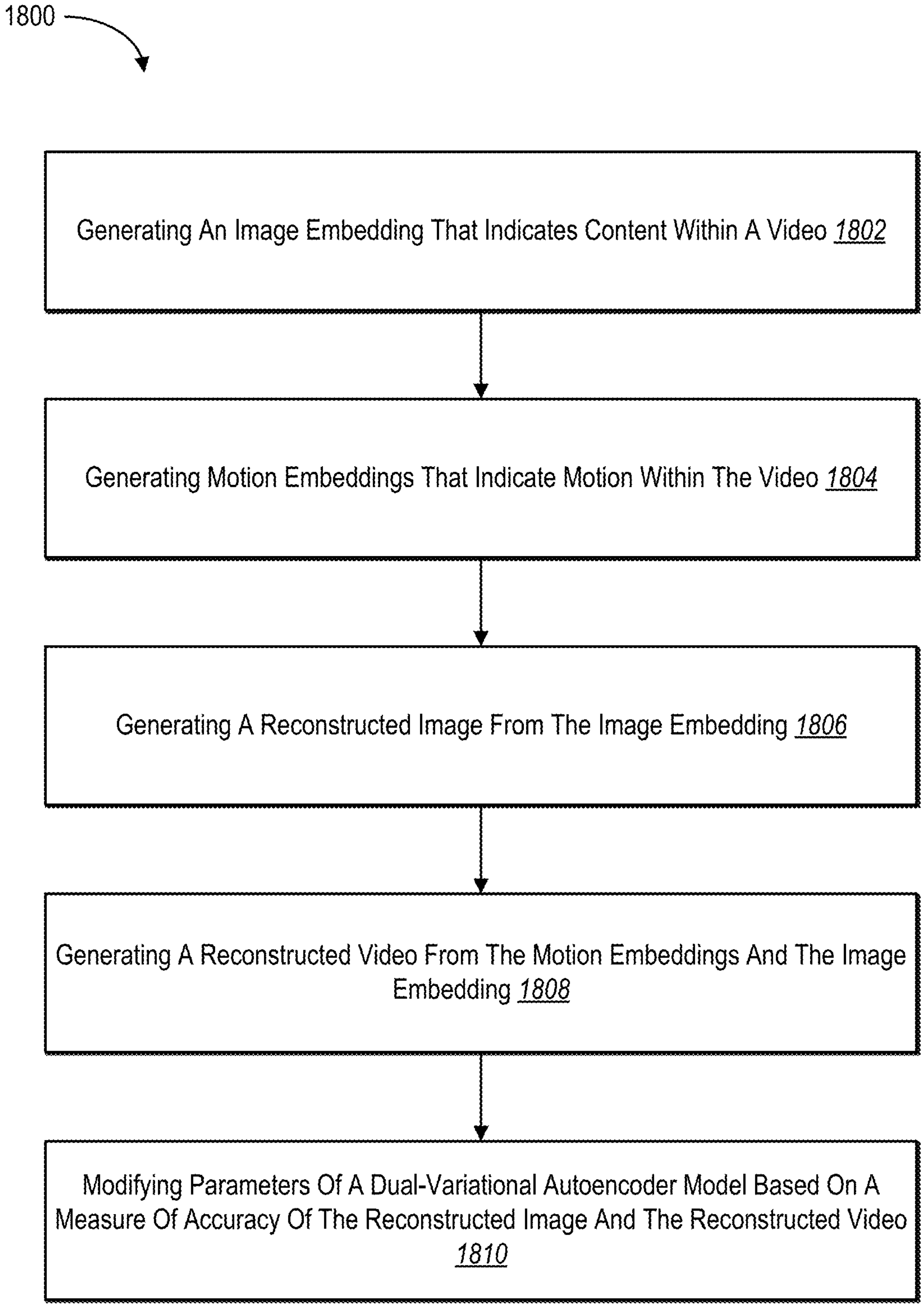
FIG. 18 illustrates a series of acts for modifying parameters of a dual-variational autoencoder model in accordance with one or more implementations.

FIGS. 1-17, the corresponding text, and the examples provide a number of different methods, systems, devices, and non-transitory computer-readable media of the components 1702-1714. In addition to the foregoing, one or more embodiments can also be described in terms of flowcharts comprising acts for accomplishing the particular result, as shown in FIG. 18. FIG. 18 may be performed with more or fewer acts. Further, the acts may be performed in different orders. Additionally, the acts described herein may be repeated or performed in parallel with one another or in parallel with different instances of the same or similar acts.

FIG. 18 illustrates a flowchart of a series of acts 1800 for modifying parameters of a dual-variational autoencoder model in accordance with one or more embodiments. FIG. 18 illustrates acts according to one embodiment, alternative embodiments may omit, add to, reorder, and/or modify any of the acts shown in FIG. 18. In some implementations, the acts of FIG. 18 are performed as part of a method. For example, in one or more embodiments, the acts of FIG. 18 are performed as part of a computer-implemented method. Alternatively, a non-transitory computer-readable medium can store instructions thereon that, when executed by at least one processor, cause a computing device to perform the acts of FIG. 18. In one or more embodiments, a system performs the acts of FIG. 18. For example, in one or more embodiments, a system includes at least one memory device. The system further includes at least one server device configured to cause the system to perform the acts of FIG. 18.

The series of acts 1800 includes an act 1802 of generating an image embedding that indicates content within a video. Further, the act 1804 includes an act of generating motion embeddings that indicate motion within the video. Moreover, the series of acts 1800 includes an act 1806 of generating a reconstructed image from the image embedding. Further, the series of acts 1800 includes an act 1808 of generating a reconstructed video from the motion embeddings and the image embedding. Moreover, the series of acts

1800 includes an act 1810 of modifying parameters of a dual-variational autoencoder model based on a measure of accuracy of the reconstructed image and the reconstructed video.

In particular, the act 1802 includes generating, utilizing a two-dimensional variational autoencoder to process a first frame of a sequence of frames, an image embedding that indicates content within a video. Moreover, the act 1804 includes generating, utilizing a three-dimensional variational autoencoder to process the sequence of frames, motion embeddings that indicate motion within the video. Further, the act 1806 includes generating, utilizing a decoder of the two-dimensional variational autoencoder, a reconstructed image from the image embedding. Moreover, the act 1808 includes generating, utilizing a decoder of the three-dimensional variational autoencoder, a reconstructed video from the motion embeddings and the image embedding. Additionally, the act 1810 includes modifying parameters of a dual-variational autoencoder model based on a measure of accuracy of the reconstructed image and the reconstructed video, wherein the dual-variational autoencoder comprises the two-dimensional variational autoencoder and the three-dimensional variational autoencoder.

For example, in one or more embodiments, the series of acts 1800 includes generating, utilizing an encoder of the two-dimensional variational autoencoder, keyframe embeddings that indicate visual anchors for physical motion in the video. In addition, in one or more embodiments, the series of acts 1800 includes generating the reconstructed video from the keyframe embeddings, the motion embeddings, and the image embedding. Further, in one or more embodiments, the series of acts 1800 includes determining an image reconstruction loss by comparing the reconstructed image with the first frame of the sequence of frames. Further, in one or more embodiments, the series of acts 1800 includes modifying the parameters of the dual-variational autoencoder model based on the image reconstruction loss.

Moreover, in one or more embodiments, the series of acts 1800 includes determining a video reconstruction loss by comparing the reconstructed video with the sequence of frames. Moreover, in one or more embodiments, the series of acts 1800 includes modifying the parameters of the dual-variational autoencoder model based on the video reconstruction loss. Further, in one or more embodiments, the series of acts 1800 includes determining a perceptual image loss of the reconstructed image and a perceptual video loss of the reconstructed video. Moreover, in one or more embodiments, the series of acts 1800 includes determining an image generative adversarial loss of the reconstructed image and a video generative adversarial loss of the reconstructed video.

Moreover, in one or more embodiments, the series of acts 1800 includes modifying parameters of the two-dimensional variational autoencoder based on the perceptual image loss and the image generative adversarial loss. Additionally, in one or more embodiments, the series of acts 1800 includes modifying parameters of the three-dimensional variational autoencoder based on the perceptual video loss and the video generative adversarial loss.

Moreover, in one or more embodiments, the series of acts 1800 includes utilizing a trained dual-variational autoencoder model to train a diffusion transformer model. Further, in one or more embodiments, the series of acts 1800 includes generating denoised image tokens by denoising, utilizing the diffusion transformer model, image tokens to which noise has been added, the image tokens being generated by a two-dimensional variational autoencoder from a frame of a sequence of frames of a video. Further, in one or more embodiments, the series of acts 1800 includes modifying parameters of the diffusion transformer model based on a comparison of the denoised image tokens and the image tokens. Moreover, in one or more embodiments, the series of acts 1800 includes generating denoised motion tokens by denoising, utilizing the diffusion transformer model, motion tokens to which noise has been added, the motion tokens being generated by a three-dimensional variational autoencoder from the sequence of frames. Further, in one or more embodiments, the series of acts 1800 includes refining the modified parameters of the diffusion transformer model based on a comparison of the denoised motion tokens and the motion tokens.

Moreover, in one or more embodiments, series of acts 1800 includes generating denoised keyframe tokens by denoising, utilizing the diffusion transformer model, keyframe tokens to which noise has been added, the keyframe tokens being generated by the two-dimensional variational autoencoder from a subset of frames of the sequence of frames. Further, in one or more embodiments, the series of acts 1800 includes further modifying the modified parameters of the diffusion transformer model based on a comparison of the denoised keyframe tokens and the keyframe tokens.

Further, in one or more embodiments, the series of acts 1800 includes refining the further modified parameters of the diffusion transformer model. Moreover, in one or more embodiments, the series of acts 1800 includes generating the image tokens comprises generating, utilizing the two-dimensional variational autoencoder, image embeddings from one or more digital images. In one or more embodiments, the series of acts 1800 includes generating, utilizing a tokenization model, image tokens from the image embeddings. In one or more embodiments, the series of acts 1800 includes generating the motion tokens comprises generating, utilizing the three-dimensional variational autoencoder, motion embeddings from one or more frames of a digital video. In one or more embodiments, the series of acts 1800 includes generating, utilizing the tokenization model, the motion tokens from the motion embeddings.

Moreover, in one or more embodiments, the series of acts 1800 includes generating the trained dual-variational autoencoder model from a dual variational autoencoder model comprising the two-dimensional variational autoencoder and the three-dimensional variational autoencoder. Further, in one or more embodiments, the series of acts 1800 includes generating parameters of the two-dimensional variational autoencoder. Further, in one or more embodiments, the series of acts 1800 includes freezing the parameters of the two-dimensional variational autoencoder. Moreover, in one or more embodiments, the series of acts 1800 includes generating parameters of the three-dimensional variational autoencoder. In one or more embodiments, the series of acts 1800 includes based on the parameters of the two-dimensional variational autoencoder and the parameters of the three-dimensional variational autoencoder, generating the trained dual-variational autoencoder model.

Moreover, in one or more embodiments, the series of acts 1800 includes receiving, from a client device, a media generation request comprising one or more of a text prompt or an image prompt. Further, in one or more embodiments, the series of acts 1800 includes generating, utilizing a diffusion transformer model, denoised tokens from noised tokens generated from the media generation request. Further, in one or more embodiments, the series of acts 1800 includes generating, utilizing a decoder of a trained dual-variational autoencoder model, media from the denoised tokens, the trained dual-variational autoencoder model comprising a two-dimensional variational autoencoder that decodes digital images and a three-dimensional variational autoencoder that decodes motion frames. Moreover, in one or more embodiments, the series of acts 1800 includes receiving for the media generation request, video parameters comprising at least one of an aspect ratio, frames per second, a shot size, a camera angle, a motion parameter, a spatial pixel location, or camera parameters. In one or more embodiments, the series of acts 1800 includes generating noised tokens that incorporate the video parameters. In one or more embodiments, the series of acts 1800 includes generating, utilizing the decoder of the trained dual-variational autoencoder model, the media from the denoised tokens, wherein the media comprises the video parameters.

Moreover, in one or more embodiments, the series of acts 1800 includes in response to the media generation request comprising the image prompt, generating, utilizing an encoder of the trained dual-variational autoencoder model, tokens from the image prompt. Further, in one or more embodiments, the series of acts 1800 includes generating, utilizing the diffusion transformer model, denoised tokens from the tokens of the image prompt and the noised tokens that incorporate video parameters. Further, in one or more embodiments, the series of acts 1800 includes in response to the media generation request comprising the text prompt, generating, utilizing a text encoder, text tokens from the text prompt. Moreover, in one or more embodiments, the series of acts 1800 includes generating, utilizing the diffusion transformer model, denoised tokens from the text tokens and the noised tokens that incorporate video parameters.

Moreover, in one or more embodiments, series of acts 1800 includes modifying parameters of a dual-variational autoencoder model to generate the trained dual-variational autoencoder model. Further, in one or more embodiments, the series of acts 1800 includes generating, utilizing a two-dimensional variational autoencoder, an image embedding from a first frame of a sequence of frames. Further, in one or more embodiments, the series of acts 1800 includes generating, utilizing a three-dimensional variational autoencoder, motion embeddings from the sequence of frames. Moreover, in one or more embodiments, the series of acts 1800 includes generating, utilizing a decoder of the two-dimensional variational autoencoder, a reconstructed image from the image embedding. In one or more embodiments, the series of acts 1800 includes generating, utilizing a decoder of the three-dimensional variational autoencoder, a reconstructed video from the image embedding and the motion embeddings.

Moreover, in one or more embodiments, series of acts 1800 includes modifying parameters of the dual-variational autoencoder model to generate the trained dual-variational autoencoder model based on determining a measure of accuracy by comparing the reconstructed image with the first frame and comparing the reconstructed video with the sequence of frames. Further, in one or more embodiments, the series of acts 1800 includes generating a sequence of frames comprising at least one of one or more digital image frames, one or more keyframes, or one or more motion frames.

Figure 19:
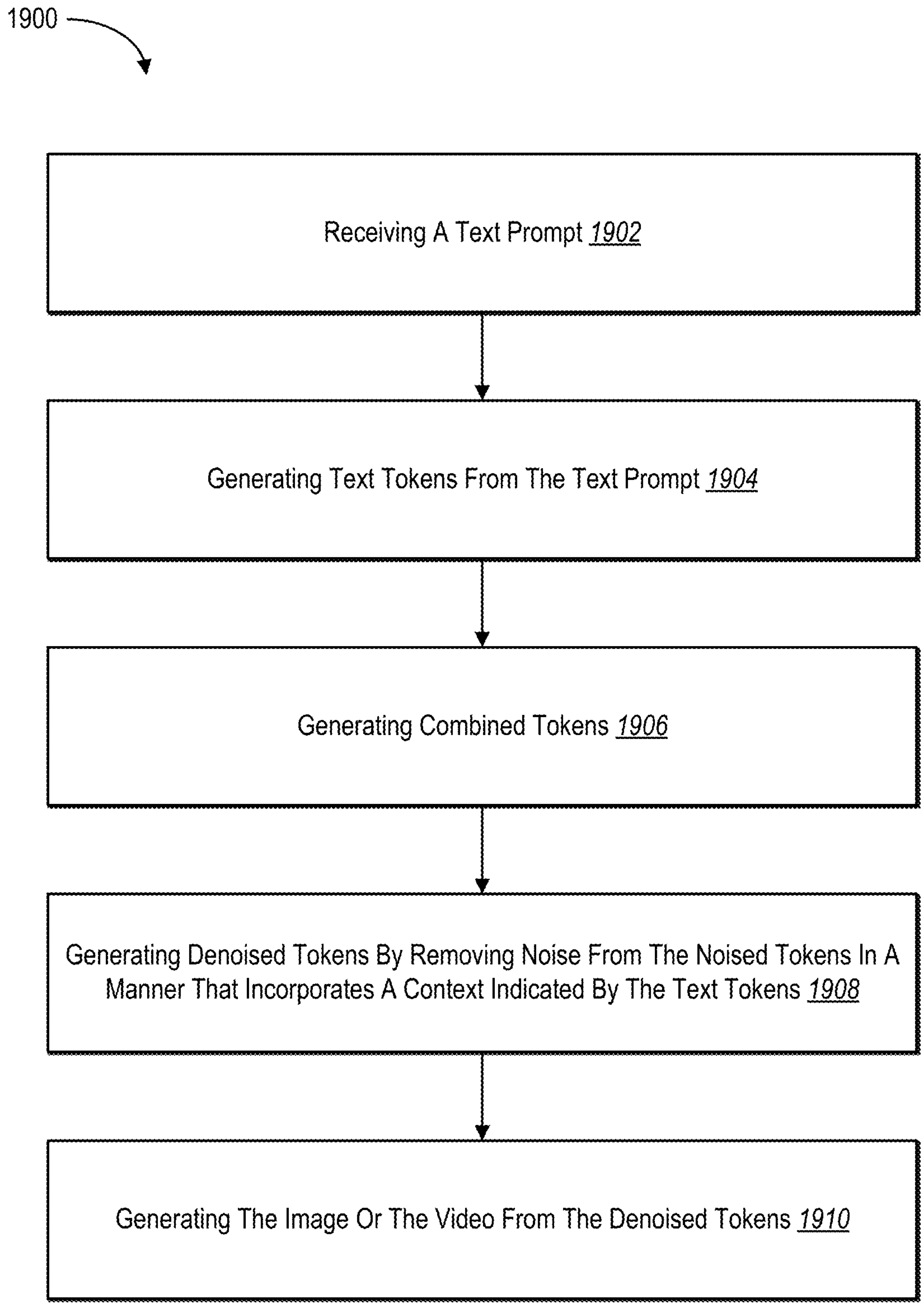
FIG. 19 illustrates a series of acts for generating an image or a video from denoised tokens in accordance with one or more implementations.

FIG. 19 illustrates a flowchart of a series of acts 1900 for generating an image or a video from denoised tokens in accordance with one or more embodiments. FIG. 19 illustrates acts according to one embodiment, alternative embodiments may omit, add to, reorder, and/or modify any of the acts shown in FIG. 19. In some implementations, the acts of FIG. 19 are performed as part of a method. For example, in one or more embodiments, the acts of FIG. 19 are performed as part of a computer-implemented method. Alternatively, a non-transitory computer-readable medium can store instructions thereon that, when executed by at least one processor, cause a computing device to perform the acts of FIG. 19. In one or more embodiments, a system performs the acts of FIG. 19. For example, in one or more embodiments, a system includes at least one memory device. The system further includes at least one server device configured to cause the system to perform the acts of FIG. 19.

The series of acts 1900 includes an act 1902 of receiving a text prompt. Further, the act 1904 includes an act of generating text tokens from the text prompt. Moreover, the series of acts 1900 includes an act 1906 of generating combined tokens. Further, the series of acts 1900 includes an act 1908 of generating denoised tokens by removing noise from the noised tokens in a manner that incorporates a context indicated by the text tokens. Moreover, the series of acts 1900 includes an act 1910 of generating the image or the video from the denoised tokens.

In particular, the act 1902 includes receiving a text prompt to generate an image or video. Moreover, the act 1904 includes generating, utilizing a text encoder, text tokens from the text prompt. Further, the act 1906 includes generating combined tokens by combining the text tokens with noised tokens. Moreover, the act 1908 includes generating, utilizing a single stream transformer comprising a self-attention layer and a multi-layer perceptron to process the combined tokens, denoised tokens by removing noise from the noised tokens in a manner that incorporates a context indicated by the text tokens. Additionally, the act 1910 includes generating, utilizing a decoder, the image or the video from the denoised tokens.

Moreover, in one or more embodiments, the series of acts 1900 includes generating a token-level diffusion timestep embedding. Further, in one or more embodiments, the series of acts 1900 includes adding the token-level diffusion timestep embedding to the noised tokens to generate the combined tokens. Further, in one or more embodiments, the series of acts 1900 includes generating position encodings for the image or the video. Moreover, in one or more embodiments, the series of acts 1900 includes adding the position encodings for the image or the video to the noised tokens to generate the combined tokens.

Moreover, in one or more embodiments, the series of acts 1900 includes generating, utilizing the single stream transformer to process the combined tokens comprising text tokens, the noised tokens, a token-level diffusion timestep embedding, and position encodings, denoised tokens by removing noise from the noised tokens according to the text tokens, the token-level diffusion timestep embedding, and the position encodings. Further, in one or more embodiments, the series of acts 1900 includes discarding the text tokens. Further, in one or more embodiments, the series of acts 1900 includes generating, utilizing the decoder to process the denoised tokens, the image or the video.

Moreover, in one or more embodiments, the series of acts 1900 includes utilizing a transformer that does not have conditioning inputs to denoise the noised tokens for the text prompt. Further, in one or more embodiments, the series of acts 1900 includes generating, utilizing the self-attention layer to process the noised tokens, a self-attention layer output. Further, in one or more embodiments, the series of acts 1900 includes combining the self-attention layer output with the noised tokens to generate a combined self-attention layer output.

Moreover, in one or more embodiments, the series of acts 1900 includes generating, utilizing the multi-layer perceptron, a multi-layer perceptron output from the combined self-attention layer output. Further, in one or more embodiments, the series of acts 1900 includes combining the multi-layer perceptron output with the combined self-attention layer output to generate the denoised tokens. Further, in one or more embodiments, the series of acts 1900 includes generating, utilizing a transformer block of the single stream transformer, intermediate denoised tokens from the noised tokens. Moreover, in one or more embodiments, the series of acts 1900 includes generating, utilizing an additional transformer block of the single stream transformer, the denoised tokens from the intermediate denoised tokens. Further, in one or more embodiments, the series of acts 1900 includes generating, utilizing the decoder, the image or the video from the denoised tokens.

Moreover, in one or more embodiments, the series of acts 1900 includes receiving, in addition to the text prompt, a visual prompt that includes a digital image. Further, in one or more embodiments, the series of acts 1900 includes generating, utilizing an encoder of a two-dimensional variational autoencoder, visual tokens from the digital image. Further, in one or more embodiments, the series of acts 1900 includes generating the combined tokens by combining the text tokens, the visual tokens, and the noised tokens. Moreover, in one or more embodiments, the series of acts 1900 includes generating, utilizing the single stream transformer to process the combined tokens, denoised tokens by removing the noise from the noised tokens in a manner that indicates the text tokens and the visual tokens. Further, in one or more embodiments, the series of acts 1900 includes generating, utilizing the decoder, the video from the denoised tokens.

Moreover, in one or more embodiments, the series of acts 1900 includes receiving, in addition to the text prompt, a visual prompt that includes a first digital image and a second digital image. Further, in one or more embodiments, the series of acts 1900 includes generating, utilizing an encoder of a two-dimensional variational autoencoder, a first set of visual tokens for the first digital image and a second set of visual tokens for the second digital image. Further, in one or more embodiments, the series of acts 1900 includes generating the combined tokens by combining the text tokens, the first set of visual tokens, the second set of visual tokens, and the noised tokens. Moreover, in one or more embodiments, the series of acts 1900 includes generating, utilizing the single stream transformer to process the combined tokens, denoised tokens by removing the noise from the noised tokens in a manner that indicates the text tokens and the first set of visual tokens and the second set of visual tokens. Further, in one or more embodiments, the series of acts 1900 includes generating, utilizing the decoder, the video from the denoised tokens.

Moreover, in one or more embodiments, the series of acts 1900 receiving a text prompt to generate an image or video. Further, in one or more embodiments, the series of acts 1900 includes generating, utilizing a text encoder, text tokens from the text prompt. Further, in one or more embodiments, the series of acts 1900 includes generating combined tokens by combining the text tokens with noised tokens. Moreover, in one or more embodiments, the series of acts 1900 includes generating, utilizing a single stream transformer comprising a self-attention layer and a multi-layer perceptron, denoised tokens by denoising the noised tokens in a manner that incorporates a context indicated by the text tokens and a token-level diffusion timestep embedding. Further, in one or more embodiments, the series of acts 1900 includes generating, utilizing a decoder, the image or the video from the denoised tokens.

Moreover, in one or more embodiments, the series of acts 1900 includes generating, utilizing a first transformer block of the single stream transformer, intermediate denoised tokens from processing the noised tokens and the token-level diffusion timestep embedding for the first transformer block. Further, in one or more embodiments, the series of acts 1900 includes generating, utilizing a second transformer block of the single stream transformer, the denoised tokens from processing the intermediate denoised tokens and an additional token-level diffusion timestep embedding for the second transformer block. Further, in one or more embodiments, the series of acts 1900 includes generating position encodings comprising at least one of a token-level diffusion timestep, a pixel location, a video frame timestamp, or a camera pose. Moreover, in one or more embodiments, the series of acts 1900 includes adding the position encodings to the noised tokens to generate the combined tokens.

Moreover, in one or more embodiments, the series of acts 1900 includes generating, utilizing the decoder, the image from the denoised tokens according to position encodings indicating a camera pose, pixel locations, and a description of the text prompt. Further, in one or more embodiments, the series of acts 1900 includes receiving, in addition to the text prompt, a visual prompt that includes a digital image. Further, in one or more embodiments, the series of acts 1900 includes generating the combined tokens by combining the text tokens, visual tokens generated from the digital image, and the noised tokens. Moreover, in one or more embodiments, the series of acts 1900 includes generating, utilizing the single stream transformer to process the combined tokens, denoised tokens by removing noise from the noised tokens in a manner that incorporates content indicated by the text tokens and the visual tokens. Further, in one or more embodiments, the series of acts 1900 includes generating, utilizing the decoder, the video from the denoised tokens according to the text prompt and position encodings indicating pixel locations, video frame timestamps, and camera poses. Moreover, in one or more embodiments, the series of acts 1900 includes the single stream transformer consists of the self-attention layer and the multi-layer perceptron Moreover, in one or more embodiments, the series of acts 1900 includes receiving a text prompt to generate an image or video. Further, in one or more embodiments, the series of acts 1900 includes generating, utilizing a text encoder, text tokens from the text prompt. Further, in one or more embodiments, the series of acts 1900 includes generating combined tokens by combining the text tokens with noised tokens. Moreover, in one or more embodiments, the series of acts 1900 includes generating, utilizing a diffusion transformer that does not include a cross-attention layer and modulation layers, denoised tokens by removing noise from the noised tokens in a manner that incorporates a context indicated by the text tokens. Further, in one or more embodiments, the series of acts 1900 includes generating, utilizing a decoder, the image or the video from the denoised tokens.

Moreover, in one or more embodiments, the series of acts 1900 includes generating a first token-level diffusion timestep embedding for a first transformer block of the diffusion transformer. Further, in one or more embodiments, the series of acts 1900 includes generating, utilizing the first transformer block of the diffusion transformer, a first intermediate denoised tokens by denoising the noised tokens in a manner indicated by the first token-level diffusion timestep embedding. Further, in one or more embodiments, the series of acts 1900 includes generating a second token-level diffusion timestep embedding for a second transformer block of the diffusion transformer. Moreover, in one or more embodiments, the series of acts 1900 includes generating, utilizing the second transformer block of the diffusion transformer, a second intermediate denoised tokens by denoising the first intermediate denoised tokens in a manner indicated by the second token-level diffusion timestep embedding. In one or more embodiments, the series of acts 1900 includes generating, utilizing a third transformer block of the diffusion transformer, the denoised tokens by denoising the second intermediate denoised tokens in a manner indicated by a third token-level diffusion timestep embedding.

Moreover, in one or more embodiments, the series of acts 1900 includes utilizing a single stream transformer that comprises a self-attention layer and a multi-layer perceptron to denoise the noised tokens. Further, in one or more embodiments, the series of acts 1900 includes generating, utilizing a first transformer block of the self-attention layer to process the noised tokens, a self-attention layer output. Further, in one or more embodiments, the series of acts 1900 includes combining the self-attention layer output with the noised tokens to generate a combined self-attention layer output. Moreover, in one or more embodiments, the series of acts 1900 includes generating, utilizing the multi-layer perceptron, a multi-layer perceptron output from the combined self-attention layer output. In one or more embodiments, the series of acts 1900 includes combining the multi-layer perceptron output with the combined self-attention layer output to generate the denoised tokens.

Figure 20:
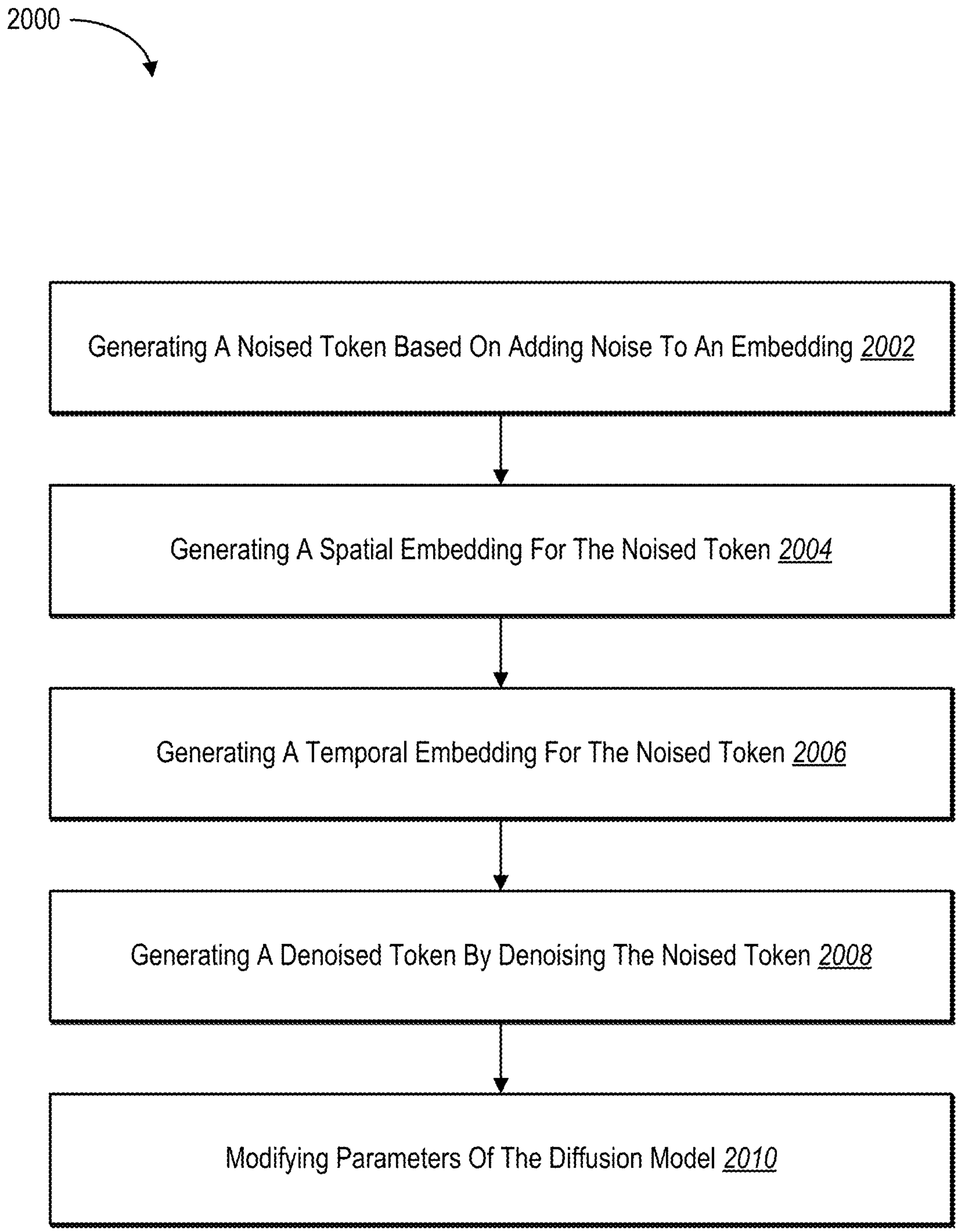
FIG. 20 illustrates a series of acts for modifying parameters of a diffusion model in accordance with one or more implementations.

FIG. 20 illustrates a flowchart of a series of acts 2000 for modifying parameters of a diffusion model in accordance with one or more embodiments. FIG. 20 illustrates acts according to one embodiment, alternative embodiments may omit, add to, reorder, and/or modify any of the acts shown in FIG. 20. In some implementations, the acts of FIG. 20 are performed as part of a method. For example, in one or more embodiments, the acts of FIG. 20 are performed as part of a computer-implemented method. Alternatively, a non-transitory computer-readable medium can store instructions thereon that, when executed by at least one processor, cause a computing device to perform the acts of FIG. 20. In one or more embodiments, a system performs the acts of FIG. 20. For example, in one or more embodiments, a system includes at least one memory device. The system further includes at least one server device configured to cause the system to perform the acts of FIG. 20.

The series of acts 2000 includes an act 2002 of generating a noised token based on adding noise to an embedding. Further, the series of acts 2000 includes an act 2004 of generating a spatial embedding for the noised token. Moreover, the series of acts 2000 includes an act 2006 of generating a temporal embedding for the noised token. Further, the series of acts 2000 includes an act 2008 of generating a denoised token by denoising the noised token. Moreover, the series of acts 2000 includes an act 2010 of modifying parameters of the diffusion model.

In particular, the act 2002 includes generating, from a video, a noised token based on adding noise to an embedding of a frame of the video. Moreover, the act 2004 includes generating, utilizing a centered two-dimensional coordinate map, a spatial embedding for the noised token of a sequence of tokens to index a location of the noised token within the frame from which the noised token was generated. Further, the act 2006 includes generating a temporal embedding for the noised token of the sequence of tokens from a timestamp. Moreover, the act 2008 includes generating, utilizing a diffusion model, a denoised token by denoising the noised token according to spatial-temporal positional encodings comprising the spatial embedding and the temporal embedding. Additionally, the act 2010 includes modifying parameters of the diffusion model based on the denoised token.

Moreover, in one or more embodiments, the series of acts 2000 includes transforming, utilizing a first positional encoding function, the noised token to a x-dimension. Further, in one or more embodiments, the series of acts 2000 includes transforming, utilizing a second positional encoding function, the noised token to a y-dimension. Further, in one or more embodiments, the series of acts 2000 includes assigning the noised token on the centered two-dimensional coordinate map based on the x-dimension and the y-dimension of the noised token to generate the spatial embedding for the noised token. Moreover, in one or more embodiments, the series of acts 2000 includes determining the timestamp for the frame of a sequence of frames of the video. In one or more embodiments, the series of acts 2000 includes determining an inverse timestamp for the frame of the sequence of frames of the video. In one or more embodiments, the series of acts 2000 includes generating the temporal embedding for the noised token based on the timestamp and the inverse timestamp.

Moreover, in one or more embodiments, the series of acts 2000 includes generating an encoding that indicates a x-dimension, a y-dimension, a timestamp and an inverse timestamp. Further, in one or more embodiments, the series of acts 2000 includes wherein the timestamp indicates a temporal position of the frame of a sequence of frames of the video. Further, in one or more embodiments, the series of acts 2000 includes wherein the inverse timestamp indicates a difference in a total length of the video and the temporal position of the frame of the sequence of frames of the video.

Moreover, in one or more embodiments, the series of acts 2000 includes generating, utilizing an encoder, the embedding of the frame of a sequence of frames. Further, in one or more embodiments, the series of acts 2000 includes adding noise to the embedding of the frame of the sequence of frames. Further, in one or more embodiments, the series of acts 2000 includes generating, utilizing a tokenization model to process the embedding with the added noise, the noised token by breaking down the frame into a series of image patches, wherein the noised token comes from an image patch of the series of image patches.

Moreover, in one or more embodiments, the series of acts 2000 includes generating, utilizing a detokenization model to process the denoised token, a denoised embedding. Further, in one or more embodiments, the series of acts 2000 includes comparing the denoised embedding with the embedding of the frame of the video to determine a measure of accuracy. Further, in one or more embodiments, the series of acts 2000 includes modifying the parameters of the diffusion model based on the measure of accuracy. Moreover, in one or more embodiments, the series of acts 2000 includes generating, from an additional video, a plurality of subsets of frames of a sequence of frames, wherein a subset of frames comprises a key-frame block and a set of motion blocks. In one or more embodiments, the series of acts 2000 includes generating, for the key-frame block, an additional noised token, additional spatial-temporal positional encodings, and a first block-specific token. In one or more embodiments, the series of acts 2000 includes generating, for a motion block of the set of motion blocks, the additional noised token, the additional spatial-temporal positional encodings, and a second block-specific token, wherein the key-frame block and the motion block share the additional noised token and the additional spatial-temporal positional encodings but are distinguished from one another with a block-specific token.

Moreover, in one or more embodiments, the series of acts 2000 includes receiving a video generation request. Further, in one or more embodiments, the series of acts 2000 includes generating noised tokens and spatial-temporal positional encodings for the video generation request. Further, in one or more embodiments, the series of acts 2000 includes generating, utilizing a diffusion model, denoised tokens by removing noise from the noised tokens according to the spatial-temporal positional encodings. Moreover, in one or more embodiments, the series of acts 2000 includes generating, utilizing a decoder, a video from the denoised tokens.

Moreover, in one or more embodiments, the series of acts 2000 includes generating, utilizing a centered two-dimensional coordinate map, a spatial embedding for a noised token to index a location of the noised token within a frame from which the noised token was generated, wherein the centered two-dimensional coordinate map incorporates video attributes, and the video attributes comprise an aspect ratio of the video. Further, in one or more embodiments, the series of acts 2000 includes generating a temporal embedding for a noised token based on a timestamp and an inverse timestamp of the noised token. Further, in one or more embodiments, the series of acts 2000 includes generating the spatial-temporal positional encodings by combining a spatial embedding and a temporal embedding. Moreover, in one or more embodiments, the series of acts 2000 includes receiving the video generation request comprises generating, utilizing an encoder, prompt tokens for the video generation request. In one or more embodiments, the series of acts 2000 includes generating the denoised tokens comprises processing, utilizing the diffusion model, the prompt tokens, the noised tokens, and the spatial-temporal positional encodings to generate the denoised tokens.

Moreover, in one or more embodiments, the series of acts 2000 includes receiving the video generation request comprising a visual prompt. Further, in one or more embodiments, the series of acts 2000 includes generating, utilizing an encoder, visual tokens for the visual prompt. Further, in one or more embodiments, the series of acts 2000 includes processing, utilizing the diffusion model, the visual tokens, the noised tokens, and the spatial-temporal positional encodings to generate the denoised tokens. Moreover, in one or more embodiments, the series of acts 2000 includes generating the video from the denoised tokens, wherein the video includes a digital image from the visual prompt. Moreover, in one or more embodiments, the series of acts 2000 includes generating the video in accordance with video attributes indicated by the spatial-temporal positional encodings, a text prompt of the video generation request, and a visual prompt of the video generation request.

Further, in one or more embodiments, the series of acts 2000 includes generating, from a video, an embedding of a frame of the video. Further, in one or more embodiments, the series of acts 2000 includes generating a noised token from the embedding by adding noise to the embedding and further tokenizing the embedding. Moreover, in one or more embodiments, the series of acts 2000 includes generating, utilizing a centered two-dimensional coordinate map, a spatial embedding for the noised token to index a location of the noised token within the frame from which the noised token was generated. In one or more embodiments, the series of acts 2000 includes generating a temporal embedding for the noised token from a timestamp of the noised token in the video. In one or more embodiments, the series of acts 2000 includes generating, utilizing a diffusion model, a denoised token by removing noise from the noised token according to a block specific embedding for the noised token and spatial-temporal positional encodings comprising the spatial embedding and the temporal embedding. In one or more embodiments, the series of acts 2000 includes modifying parameters of the diffusion model based on the denoised token.

Moreover, in one or more embodiments, the series of acts 2000 includes generating the spatial embedding for a subset of noised tokens corresponding to a subset of frames of a sequence of frames from the video, wherein each frame of the subset of frames is assigned the spatial embedding. Further, in one or more embodiments, the series of acts 2000 includes generating the block specific embedding for the noised token of the subset of noised tokens, wherein the noised token within the subset of noised tokens is distinguished from other noised tokens within the subset of noised tokens by the block specific embedding. Further, in one or more embodiments, the series of acts 2000 includes generating the temporal embedding for a subset of noised tokens corresponding to a subset of frames of a sequence of frames from the video, wherein each frame of the subset of frames is assigned the temporal embedding. Moreover, in one or more embodiments, the series of acts 2000 includes generating an additional block specific embedding for an additional noised token of a subset of noised tokens corresponding to a subset of frames from the video. In one or more embodiments, the series of acts 2000 includes generating an additional denoised token from the additional noised token, the spatial-temporal positional encodings, and the additional block specific embedding for the additional noised token. In one or more embodiments, the series of acts 2000 includes generating, utilizing a detokenization model, a denoised embedding from the denoised token. In one or more embodiments, the series of acts 2000 includes comparing the denoised embedding with the embedding to determine a measure of accuracy. In one or more embodiments, the series of acts 2000 includes modifying parameters of the diffusion model based on the measure of accuracy.

Figure 21:
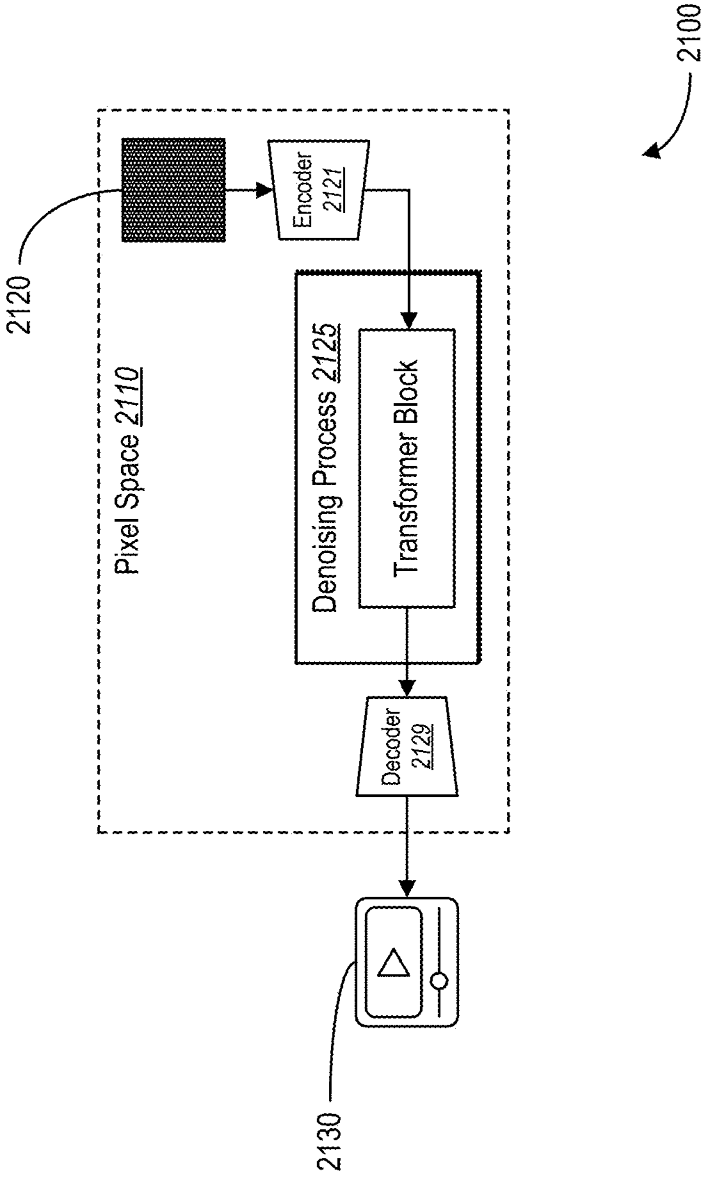
FIG. 21 shows an example of a diffusion model denoising noised data in a latent space in accordance with one or more implementations.

FIG. 21 shows an example of a diffusion model 2100 according to aspects of the present disclosure. In some examples, a diffusion model 2100 describes the operation and architecture of the diffusion transformer model (e.g., single stream diffusion transformer model described above) described with reference to FIG. 27. The latent diffusion model depicted in FIG. 21 is an example of, or includes aspects of, a media generation model as described herein.

Diffusion transformer models are a class of generative neural networks which can be trained to generate new data with features similar to features found in training data. In particular, diffusion transformer models can be used to generate novel media items such as images, audio files, videos, three-dimensional (3D) models or other digital media items. Diffusion transformer models can be used for various media processing tasks including image super-resolution, generation of media items with perceptual metrics, image inpainting, and media manipulation. In particular, the diffusion transformer models differ from existing diffusion model architecture in that it combines transformer architecture with diffusion principles of removing noise from noised tokens. Specifically, the architecture of a diffusion transformer model in the present disclosure includes a self-attention layer and a multi-layer perceptron. In one or more embodiments, the diffusion transformer model does not include conditioning inputs, rather, position encodings and other (clean) tokens are included with noised tokens as guidance for how a transformer block should remove noise form a noised token.

As discussed in detail above, the generative AI digital visual system 102 utilizes a diffusion transformer model (rather than UNet diffusion architecture) where the generative AI digital visual system 102 leverages encoders (e.g., VAE encoders) to abstract pixel details into latent representations (e.g., embeddings). For instance, the generative AI digital visual system 102 utilizes VAE encoders to abstract pixel data into semantic information which is adaptable for use in a transformer architecture (e.g., a transformer architecture captures global context through attention from the latent representations).

Moreover, in one or more embodiments, rather than injecting diffusion information through an adaLN modulation, the generative AI digital visual system 102 designs a diffusion transformer model a single stream manner. In other words, the generative AI digital visual system 102 utilizes a diffusion transformer model with inputs flowing in and inputs flowing out in a single stream. Thus, in one or more embodiments, the generative AI digital visual system 102 does not utilize adaLN modulation for conditioning inputs, and directly feeds positional encodings and other encoding information (e.g., token-level diffusion timestep embedding) into a self-attention layer along with nosed tokens.

In one or more embodiments, methods of operating diffusion models include a Denoising Diffusion Probabilistic Model (DDPM) and a Denoising Diffusion Implicit Models (DDIM). In DDPM, the generative process includes reversing a stochastic Markov diffusion process. DDIMs, on the other hand, use a deterministic process so that the same input results in the same output. In some cases, DDIM can reduce the number of timesteps during media generation. Diffusion models may also be characterized by whether the noise is added to the media item itself, or to media features generated by an encoder (i.e., latent diffusion). In a pixel diffusion model, noise is added and removed in pixel space. In a latent diffusion model, the noise is added (and removed) in a latent space 2110 of media features rather than in pixel space. Thus, a latent diffusion model generates media features using reverse diffusion, and these media features can be decoded to obtain a synthetic media item.

In one or more embodiments, the generative AI digital visual system 102 utilizes the diffusion transformer model which adds noise to data in the latent space and then uses transformer blocks to remove noise from the noised tokens to obtain a synthetic media item. For instance, FIG. 21 shows noised data 2120 being processed by an encoder 2121 and then utilizing a denoising process 2125 to remove noise from the noised data 2120. Further, FIG. 21 shows the generative AI digital visual system 102 utilizing a decoder 2129 to generate media 2130. Further, in one or more embodiments, the generative AI digital visual system 102 adds noise to data in a progressive manner (e.g., over a number of timesteps corresponding to a number of transformer blocks).

Figure 22:
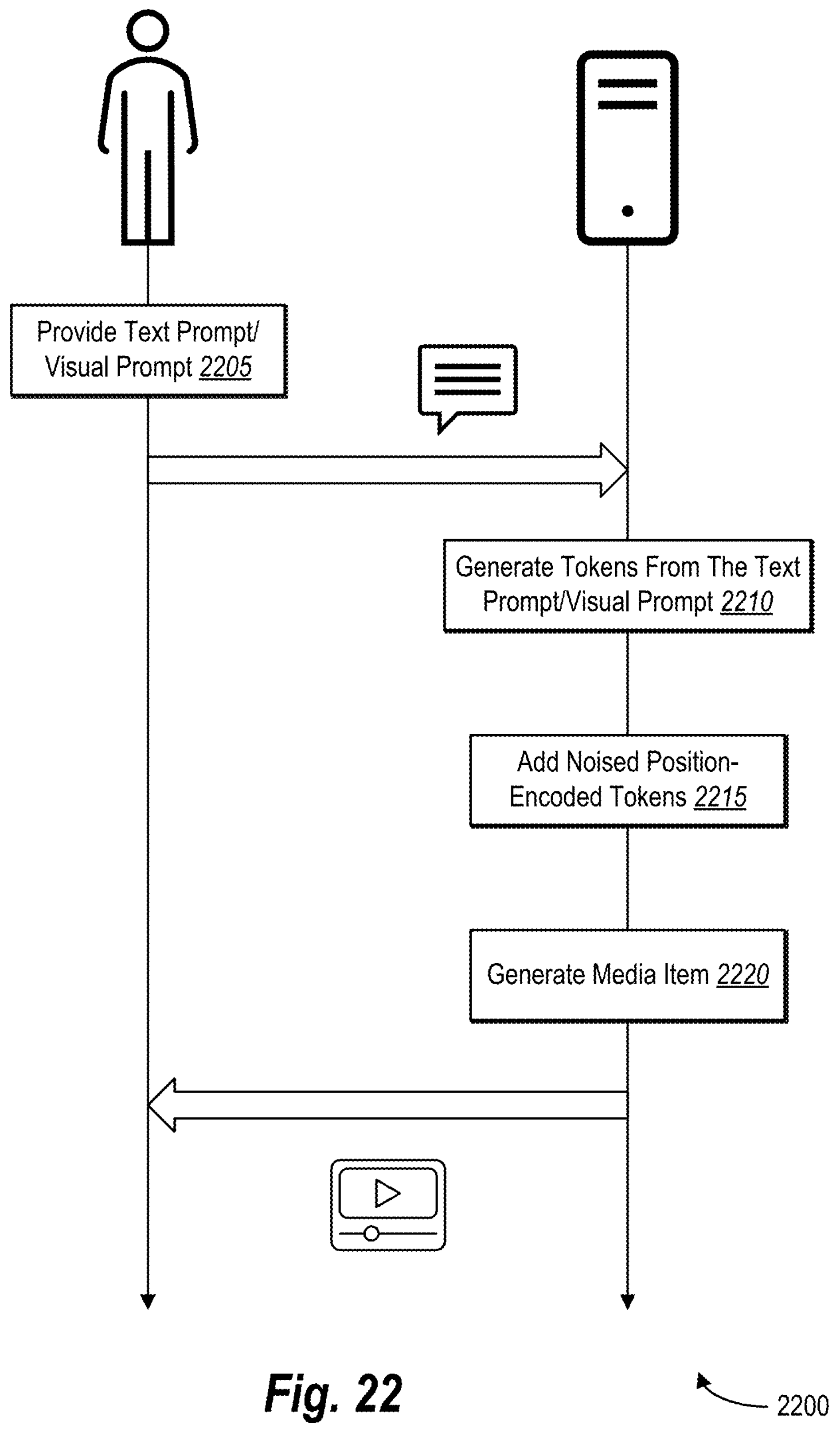
FIG. 22 shows an example of a method for media generation in accordance with one or more implementations.

FIG. 22 shows an example of a method 2200 for media generation according to aspects of the present disclosure. In some examples, method 2200 describes an operation of the diffusion transformer model 2615 described with reference to FIG. 26 such as an application of the diffusion model 2100 described with reference to FIG. 21. In some examples, these operations are performed by a system including a processor executing a set of codes to control functional elements of an apparatus such as the media generation model described in FIG. 21.

Additionally or alternatively, steps of the method 2200 may be performed using special-purpose hardware. Generally, these operations are performed according to the methods and processes described in accordance with aspects of the present disclosure. In some cases, the operations described herein are composed of various substeps, or are performed in conjunction with other operations.

At operation 2205, a user provides a text prompt describing content to be included in a generated media item. For example, a user may provide the prompt "a person playing with a cat". In some examples, guidance can be provided in a form other than text, such as via an image (e.g., a visual prompt), a sketch, an audio input, or a layout.

At operation 2210, the system converts the text prompt (or other prompt guidance) into tokens or other multi-dimensional representation compatible with a single stream diffusion transformer model. For example, text may be converted into a vector or a series of vectors using a transformer model, or a multi-modal encoder. In some cases, the encoder for the generation of tokens is trained independently of the diffusion model (e.g., via a trained dual-VAE model).

At operation 2215, a noise map is initialized that includes random noise. The noise map may be in a pixel space or a latent space. By initializing a media item with random noise, different variations of a media item including the content described by the prompt can be generated. At operation 2220, the system generates a media item based on the noise map, tokens from the prompt (e.g., text prompt and/or visual prompt), and additional spatial-temporal positional encodings.

Figure 23:
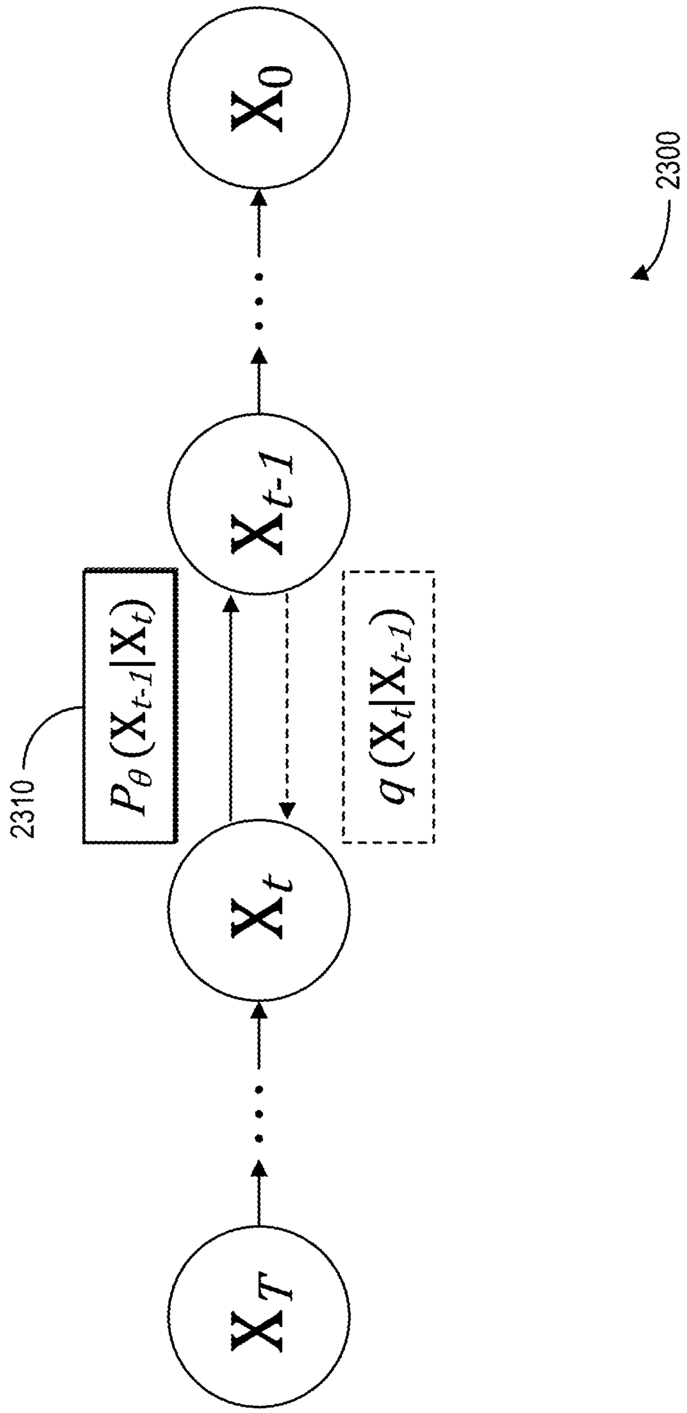
FIG. 23 shows a denoising process in accordance with one or more implementations.

FIG. 23 shows a diffusion process 2300 according to aspects of the present disclosure. In some examples, diffusion process 2300 describes an operation of the diffusion transformer model 2615 described with reference to FIG. 26, such as the denoising process of a diffusion model 2100 described with reference to FIG. 21.

As described above with reference to FIG. 21, using a diffusion transformer model can involve a process for initializing noise (e.g., generating noised tokens in a latent space) and a denoising process 2310 for denoising the noised tokens to obtain denoised tokens. The denoising process 2310 can be represented as $p(x_{t-1}|x_t)$. In some cases, a neural network is trained to perform the denoising process 2310 (i.e., to successively remove the noise).

In an example forward process for a latent diffusion model, the model maps an observed variable $x_0$ (an embedding in a latent space) intermediate variables $x_1, \ldots, x_T$ using a Markov chain. The Markov chain gradually adds Gaussian noise to the data (e.g., the embedding, such as a visual signal) to obtain the approximate posterior $q(x_{1:T}|x_0)$ as the latent variables are passed through a neural network such as a diffusion transformer model, where $x_1, \ldots, x_T$ have the same dimensionality as $x_0$.

The neural network may be trained to perform the denoising process. During the denoising process 2310, the model begins with noisy data $x_T$, such as a noisy token and denoises the data to obtain the $p(x_{t-1}|x_t)$. At each step t−1, the denoising process 2310 takes $x_t$, such as first intermediate denoised token, spatial-temporal positional encodings, and tokens (e.g., representing a prompt). Here, t represents a transformer block in a sequence of transformer blocks associated with different noise levels, The denoising process 2310 outputs $x_{t-1}$, such as second intermediate denoised token iteratively until $x_T$ reverts back to $x_0$, a completely denoised token. The denoising process can be represented as:

$$p_\theta(x_{t-1}\mid x_t):=N\left(x_{t-1};\mu_\theta(x_t,t),\sum\nolimits_\theta(x_t,t)\right). \tag{1}$$

Moreover, the process of adding noise to data to generate noised tokens is expressed as the joint probability of a sequence of samples in the Markov chain can be written as a product of conditionals and the marginal probability:

$$x_T:p_\theta(x_{0:T}):=p(x_T)\prod\nolimits_{t=1}^{T}p_\theta(x_{t-1}\mid x_t), \tag{2}$$

where $p(x_T)=N(x_T; 0, I)$ is the pure noise distribution as the reverse process takes the outcome of the forward process, a sample of pure noise, as input and $$\prod\nolimits_{t=1}^{T}p_\theta(x_{t-1}\mid x_t)$$

represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output (e.g., using a decoder of a trained dual-VAE model). In some examples, $x_0$ represents an original clean token, latent variables $x_1, \ldots, x_T$ represent noisy tokens, and $\tilde{x}$ represents the generated item with high quality.

Figure 24:
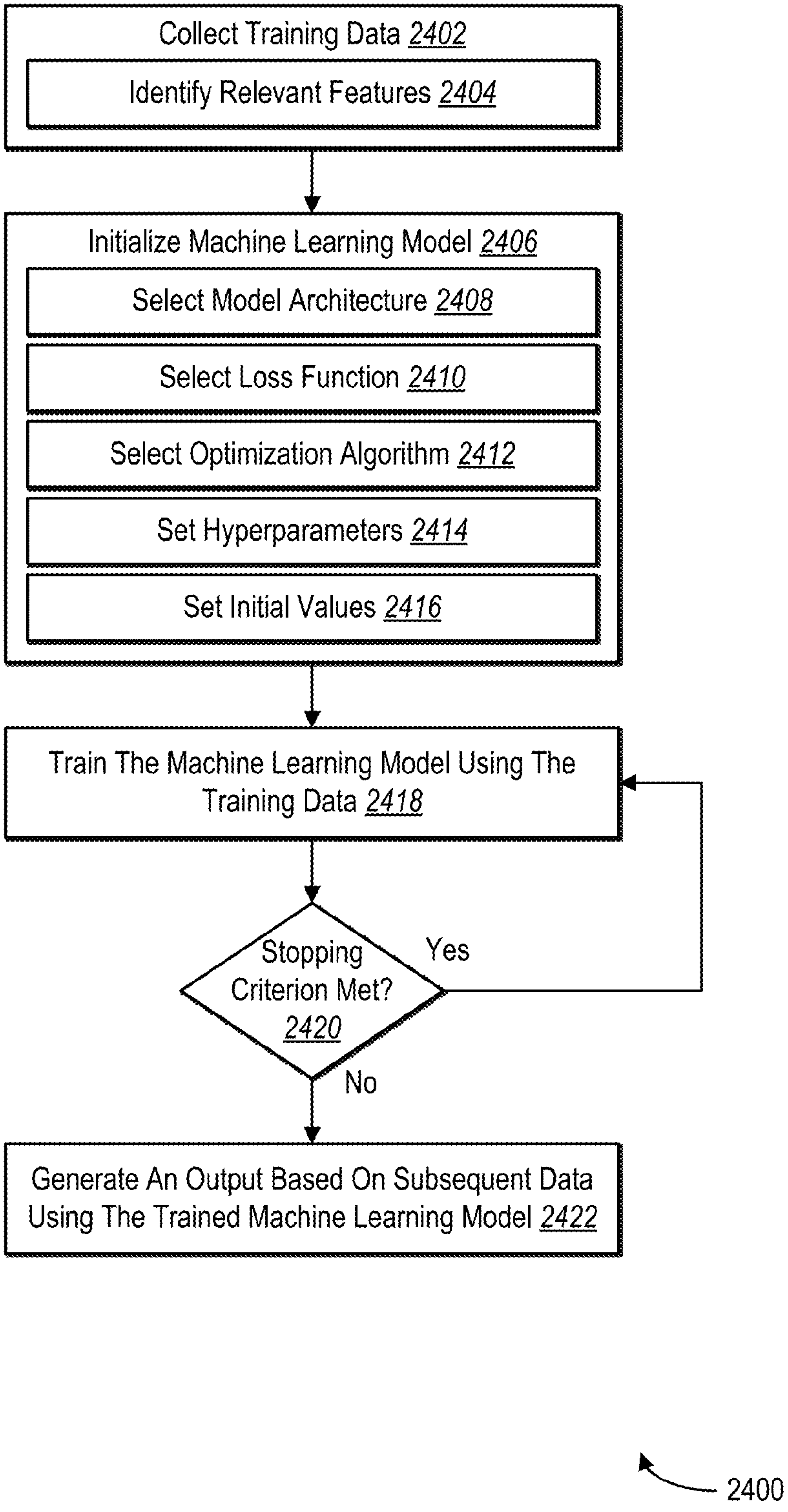
FIG. 24 shows a flow diagram depicting an algorithm as a step-by-step procedure for training a machine-learning model in accordance with one or more implementations.

FIG. 24 is a flow diagram depicting an algorithm as a step-by-step procedure 2400 in an example implementation of operations performable for training a machine-learning model. In one or more embodiments, the procedure 2400 describes an operation of the training component 2625 described for configuring the diffusion transformer model 2615 as described with reference to FIG. 24. The procedure 2400 provides one or more examples of generating training data, use of the training data to train a machine-learning model, and use of the trained machine-learning model to perform a task.

To begin in this example, a machine-learning system collects training data (block 2402) that is to be used as a basis to train a machine-learning model, i.e., which defines what is being modeled. The training data is collectable by the machine-learning system from a variety of sources. Examples of training data sources include public datasets, service provider system platforms that expose application programming interfaces (e.g., social media platforms), user data collection systems (e.g., digital surveys and online crowdsourcing systems), and so forth. Training data collection may also include data augmentation and synthetic data generation techniques to expand and diversify available training data, balancing techniques to balance a number of positive and negative examples, and so forth.

The machine-learning system is also configurable to identify features that are relevant (block 2404) to a type of task, for which the machine-learning model is to be trained. Task examples include classification, natural language processing, generative artificial intelligence, recommendation engines, reinforcement learning, clustering, and so forth. To do so, the machine-learning system collects the training data based on the identified features and/or filters the training data based on the identified features after collection. The training data is then utilized to train a machine-learning model.

In order to train the machine-learning model in the illustrated example, the machine-learning model is first initialized (block 2406). Initialization of the machine-learning model includes selecting a model architecture (block 2408) to be trained. Examples of model architectures include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

A loss function is also selected (block 2410). The loss function is utilized to measure a difference between an output of the machine-learning model (i.e., predictions) and target values (e.g., as expressed by the training data) to be used to train the machine-learning model. Additionally, an optimization algorithm is selected (2412) that is to be used in conjunction with the loss function to optimize parameters of the machine-learning model during training, examples of which include gradient descent, stochastic gradient descent (SGD), and so forth.

Initialization of the machine-learning model further includes setting initial values (block 2416) of the machine-learning model (block 2414) examples of which includes initializing weights and biases of nodes to improve efficiency in training and computational resources consumption as part of training. Hyperparameters are also set that are used to control training of the machine learning model, examples of which include regularization parameters, model parameters (e.g., a number of layers in a neural network), learning rate, batch sizes selected from the training data, and so on. The hyperparameters are set using a variety of techniques, including use of a randomization technique, through use of heuristics learned from other training scenarios, and so forth.

The machine-learning model is then trained using the training data (block 2418) by the machine-learning system. A machine-learning model refers to a computer representation that can be tuned (e.g., trained and retrained) based on inputs of the training data to approximate unknown functions. In particular, the term machine-learning model can include a model that utilizes algorithms (e.g., using the model architectures described above) to learn from, and make predictions on, known data by analyzing training data to learn and relearn to generate outputs that reflect patterns and attributes expressed by the training data.

Examples of training types include supervised learning that employs labeled data, unsupervised learning that involves finding an underlying structures or patterns within the training data, reinforcement learning based on optimization functions (e.g., rewards and/or penalties), use of nodes as part of "deep learning," and so forth. The machine-learning model, for instance, is configurable as including a plurality of nodes that collectively form a plurality of layers. The layers, for instance, are configurable to include an input layer, an output layer, and one or more hidden layers. Calculations are performed by the nodes within the layers through the hidden states through a system of weighted connections that are "learned" during training, e.g., through use of the selected loss function and backpropagation to optimize performance of the machine-learning model to perform an associated task.

As part of training the machine-learning model, a determination is made as to whether a stopping criterion is met (decision block 2420), i.e., which is used to validate the machine-learning model. The stopping criterion is usable to reduce overfitting of the machine-learning model, reduce computational resource consumption, and promote an ability of the machine-learning model to address previously unseen data, i.e., that is not included specifically as an example in the training data. Examples of a stopping criterion include but are not limited to a predefined number of epochs, validation loss stabilization, achievement of a performance improvement threshold, whether a threshold level of accuracy has been met, or based on performance metrics such as precision and recall. If the stopping criterion has not been met ("no" from decision block 2420), the procedure 2400 continues training of the machine-learning model using the training data (block 2418) in this example.

If the stopping criterion is met ("yes" from decision block 2420), the trained machine-learning model is then utilized to generate an output based on subsequent data (block 2422). The trained machine-learning model, for instance, is trained to perform a task as described above and therefore once trained is configured to perform that task based on subsequent data received as an input and processed by the machine-learning model.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 25:
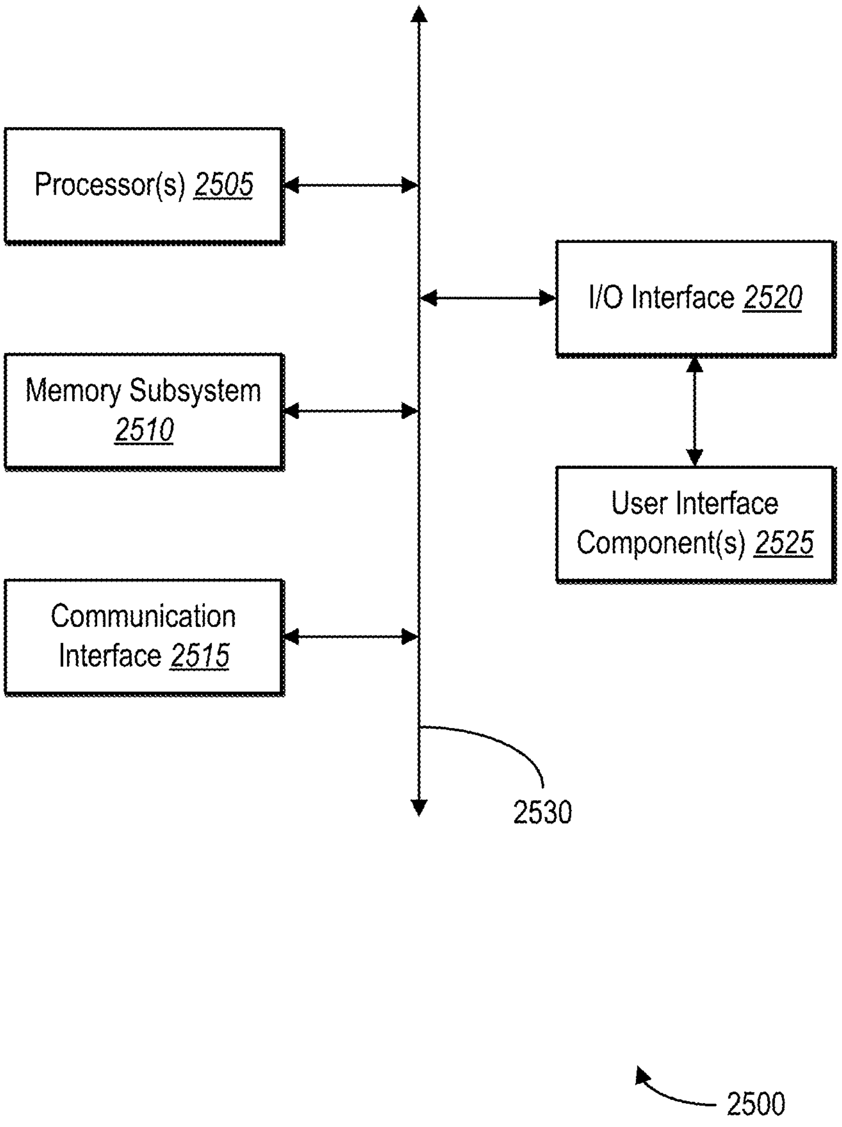
FIG. 25 shows an example of a computing device in accordance with one or more implementations.

FIG. 25 shows an example of a computing device 2500 according to aspects of the present disclosure. The computing device 2500 may be an example of the generative AI digital media system apparatus 2600 (e.g., an apparatus for interacting with the generative AI digital visual system 102, which is described above) described with reference to FIG. 27. In one aspect, computing device 2500 includes processor(s) 2505, memory subsystem 2510, communication interface 2515, I/O interface 2520, user interface component(s) 2525, and channel 2530.

In one or more embodiments, computing device 2500 is an example of, or includes aspects of, the media generation model of FIG. 21. In one or more embodiments, computing device 2500 includes one or more processors 2505 that can execute instructions stored in memory subsystem 2510 to perform media generation.

According to some aspects, computing device 2500 includes one or more processors 2505. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In one or more embodiments, a processor includes special purpose components for modem processing, baseband processing, digital signal processing, or transmission processing.

According to some aspects, memory subsystem 2510 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 2515 operates at a boundary between communicating entities (such as computing device 2500, one or more user devices, a cloud, and one or more databases) and channel 2530 and can record and process communications. In some cases, communication interface 2515 is provided to enable a processing system coupled to a transceiver (e.g., a transmitter and/or a receiver). In some examples, the transceiver is configured to transmit (or send) and receive signals for a communications device via an antenna.

According to some aspects, I/O interface 2520 is controlled by an I/O controller to manage input and output signals for computing device 2500. In some cases, I/O interface 2520 manages peripherals not integrated into computing device 2500. In some cases, I/O interface 2520 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 2520 or via hardware components controlled by the I/O controller.

According to some aspects, user interface component(s) 2525 enable a user to interact with computing device 2500. In some cases, user interface component(s) 2525 include an audio device, such as an external speaker system, an external display device such as a display screen, an input device (e.g., a remote-control device interfaced with a user interface directly or through the I/O controller), or a combination thereof. In some cases, user interface component(s) 2525 include a GUI.

Figure 26:
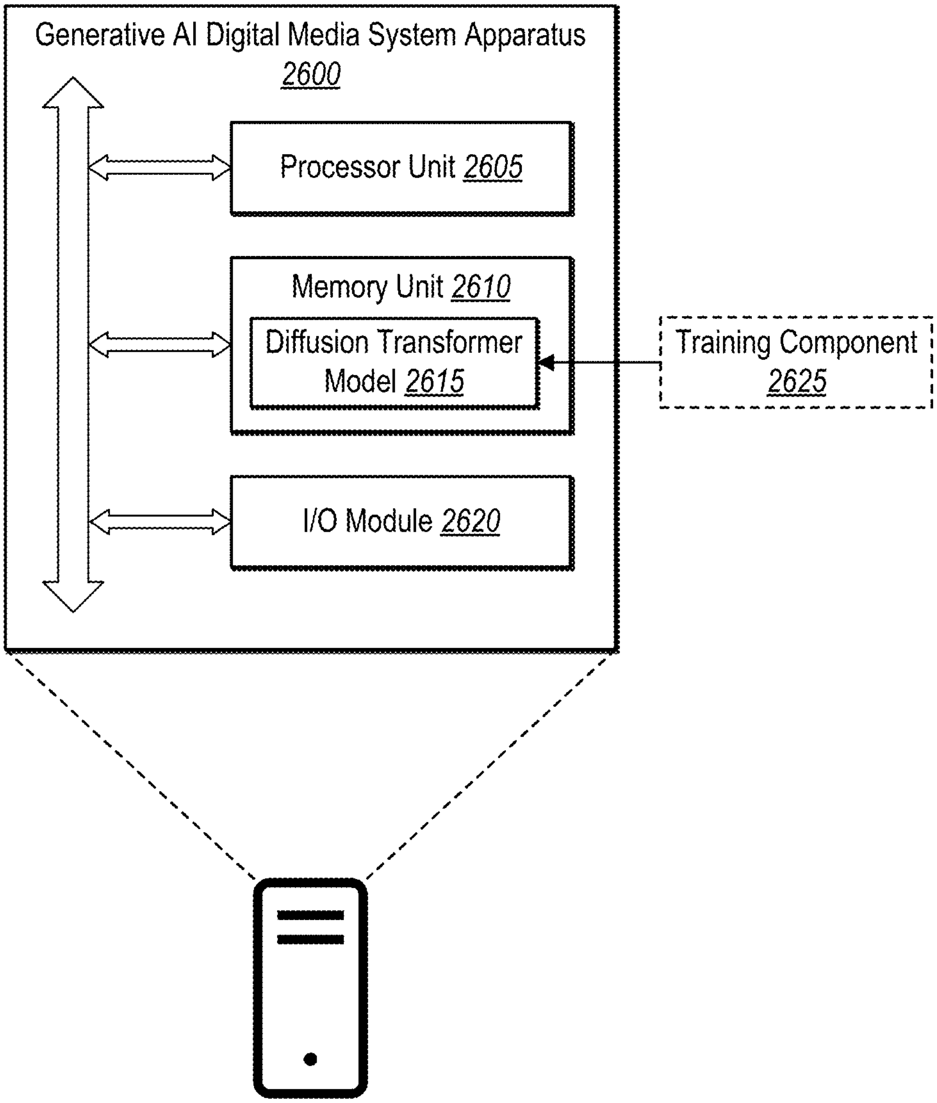
FIG. 26 shows an example of a generative AI digital visual system apparatus (e.g., for interacting with the generative AI digital visual system 102) in accordance with one or more implementations.

FIG. 26 shows an example of a generative AI digital media system apparatus 2600 according to aspects of the present disclosure. generative AI digital media system apparatus 2600 may include an example of, or aspects of, the diffusion model described with reference to FIG. 21. In one or more embodiments, generative AI digital media system apparatus 2600 includes processor unit 2605, memory unit 2610, diffusion transformer model 2615, I/O module 2620, and training component 2625. Training component 2625 updates parameters of the diffusion transformer model 2615 stored in memory unit 2610. In some examples, the training component 2625 is located outside the generative AI digital media system apparatus 2600.

Processor unit 2605 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 2605 is configured to operate a memory array using a memory controller. In other cases, a memory controller is integrated into processor unit 2605. In some cases, processor unit 2605 is configured to execute computer-readable instructions stored in memory unit 2610 to perform various functions. In some aspects, processor unit 2605 includes special purpose components for modem processing, baseband processing, digital signal processing, or transmission processing. According to some aspects, processor unit 2605 comprises one or more processors described with reference to FIG. 25.

Memory unit 2610 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 2605 to perform various functions described herein.

In some cases, memory unit 2610 includes a basic input/output system (BIOS) that controls basic hardware or software operations, such as an interaction with peripheral components or devices. In some cases, memory unit 2610 includes a memory controller that operates memory cells of memory unit 2610. For example, the memory controller may include a row decoder, column decoder, or both. In some cases, memory cells within memory unit 2610 store information in the form of a logical state. According to some aspects, memory unit 2610 is an example of the memory subsystem 2510 described with reference to FIG. 25.

According to some aspects, generative AI digital media system apparatus 2600 uses one or more processors of processor unit 2605 to execute instructions stored in memory unit 2610 to perform functions described herein. For example, the generative AI digital media system apparatus 2600 to perform the operations described in the aspects below.

The memory unit 2610 may include a diffusion transformer model 2615 trained to remove noise from noised tokens according to spatial-temporal positional encodings. For example, after training, the diffusion transformer model 2615 may perform inferencing operations as described with reference to FIGS. 22-23 to remove noise from noised tokens and generate media such as video and/or images.

In one or more embodiments, the diffusion transformer model 2615 is an Artificial neural network (ANN). An ANN can be a hardware component or a software component that includes connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

ANNs have numerous parameters, including weights and biases associated with each neuron in the network, which control the degree of connection between neurons and influence the neural network's ability to capture complex patterns in data. These parameters, also known as model parameters or model weights, are variables that determine the behavior and characteristics of a machine learning model.

In some cases, the signals between nodes comprise real numbers, and the output of each node is computed by a function of its inputs. For example, nodes may determine their output using other mathematical algorithms, such as selecting the max from the inputs as the output, or any other suitable algorithm for activating the node. Each node and edge are associated with one or more node weights that determine how the signal is processed and transmitted. In some cases, nodes have a threshold below which a signal is not transmitted at all. In some examples, the nodes are aggregated into layers.

The parameters of the diffusion transformer model 2615 can be organized into layers. Different layers perform different transformations on their inputs. The initial layer is known as the input layer and the last layer is known as the output layer. In some cases, signals traverse certain layers multiple times. A hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

Training component 2625 may train the diffusion transformer model 2615. For example, parameters of the diffusion transformer model 2615 can be learned or estimated from training data and then used to make predictions or perform tasks based on learned patterns and relationships in the data. In some examples, the parameters are adjusted during the training process to minimize a loss function or maximize a performance metric. The goal of the training process may be to find optimal values for the parameters that allow the machine learning model to make accurate predictions or perform well on the given task.

Accordingly, the node weights can be adjusted to improve the accuracy of the output (i.e., by minimizing a loss which corresponds in some way to the difference between the current result and the target result). The weight of an edge increases or decreases the strength of the signal transmitted between nodes. For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the diffusion transformer model 2615 can be used to make predictions on new, unseen data (i.e., during inference).

I/O module 2620 receives inputs from and transmits outputs of the generative AI digital media system apparatus 2600 to other devices or users. For example, I/O module 2620 receives inputs for the diffusion transformer model 2615 and transmits outputs of the diffusion transformer model 2615. According to some aspects, I/O module 2620 is an example of the I/O interface 2520 described with reference to FIG. 25.

What is claimed is:

1. A computer-implemented method comprising:

receiving, from a client device, a media generation request comprising one or more of a text prompt or an image prompt;

generating, utilizing a diffusion transformer model, denoised tokens from noised tokens generated from the media generation request; and generating, utilizing a decoder of a trained dual-variational autoencoder model, media from the denoised tokens, the trained dual-variational autoencoder model comprising a two-dimensional variational autoencoder that decodes digital images and a three-dimensional variational autoencoder that decodes motion frames.

2. The computer-implemented method of claim 1, wherein receiving the media generation request comprises:

receiving for the media generation request, video parameters comprising at least one of an aspect ratio, frames per second, a shot size, a camera angle, a motion parameter, a spatial pixel location, or camera parameters;

generating noised tokens that incorporate the video parameters; and generating, utilizing the decoder of the trained dual-variational autoencoder model, the media from the denoised tokens, wherein the media comprises the video parameters.

3. The computer-implemented method of claim 1, further comprising:

in response to the media generation request comprising the image prompt, generating, utilizing an encoder of the trained dual-variational autoencoder model, tokens from the image prompt; and generating, utilizing the diffusion transformer model, denoised tokens from the tokens of the image prompt and the noised tokens that incorporate video parameters.

4. The computer-implemented method of claim 1, further comprising:

in response to the media generation request comprising the text prompt, generating, utilizing a text encoder, text tokens from the text prompt; and generating, utilizing the diffusion transformer model, denoised tokens from the text tokens and the noised tokens that incorporate video parameters.

5. The computer-implemented method of claim 1, further comprising:

modifying parameters of a dual-variational autoencoder model to generate the trained dual-variational autoencoder model by:

generating, utilizing a two-dimensional variational autoencoder, an image embedding from a first frame of a sequence of frames; and generating, utilizing a three-dimensional variational autoencoder, motion embeddings from the sequence of frames.

6. The computer-implemented method of claim 5, further comprising:

generating, utilizing a decoder of the two-dimensional variational autoencoder, a reconstructed image from the image embedding; and generating, utilizing a decoder of the three-dimensional variational autoencoder, a reconstructed video from the image embedding and the motion embeddings.

7. The computer-implemented method of claim 6, further comprising modifying parameters of the dual-variational autoencoder model to generate the trained dual-variational autoencoder model based on determining a measure of accuracy by comparing the reconstructed image with the first frame and comparing the reconstructed video with the sequence of frames.

8. The computer-implemented method of claim 1, wherein generating the media comprises generating a sequence of frames comprising at least one of one or more digital image frames, one or more keyframes, or one or more motion frames.

9. A non-transitory computer-readable medium comprising instructions that, when executed by at least one processor, cause the at least one processor to perform operations comprising:

receiving, from a client device, a media generation request comprising one or more of a text prompt or an image prompt;

generating, utilizing a diffusion transformer model, denoised tokens from noised tokens generated from the media generation request; and generating, utilizing a decoder of a trained dual-variational autoencoder model, media from the denoised tokens, the trained dual-variational autoencoder model comprising a two-dimensional variational autoencoder that decodes digital images and a three-dimensional variational autoencoder that decodes motion frames.

10. The non-transitory computer-readable medium of claim 9, wherein receiving the media generation request comprises:

receiving for the media generation request, video parameters comprising at least one of an aspect ratio, frames per second, a shot size, a camera angle, a motion parameter, a spatial pixel location, or camera parameters;

generating noised tokens that incorporate the video parameters; and generating, utilizing the decoder of the trained dual-variational autoencoder model, the media from the denoised tokens, wherein the media comprises the video parameters.

11. The non-transitory computer-readable medium of claim 9, wherein the operations further comprise:

in response to the media generation request comprising the image prompt, generating, utilizing an encoder of the trained dual-variational autoencoder model, tokens from the image prompt; and generating, utilizing the diffusion transformer model, denoised tokens from the tokens of the image prompt and the noised tokens that incorporate video parameters.

12. The non-transitory computer-readable medium of claim 9, wherein the operations further comprise:

in response to the media generation request comprising the text prompt, generating, utilizing a text encoder, text tokens from the text prompt; and generating, utilizing the diffusion transformer model, denoised tokens from the text tokens and the noised tokens that incorporate video parameters.

13. The non-transitory computer-readable medium of claim 9, wherein the operations further comprise:

modifying parameters of a dual-variational autoencoder model to generate the trained dual-variational autoencoder model by:

generating, utilizing a two-dimensional variational autoencoder, an image embedding from a first frame of a sequence of frames; and generating, utilizing a three-dimensional variational autoencoder, motion embeddings from the sequence of frames.

14. The non-transitory computer-readable medium of claim 13, wherein the operations further comprise:

generating, utilizing a decoder of the two-dimensional variational autoencoder, a reconstructed image from the image embedding; and generating, utilizing a decoder of the three-dimensional variational autoencoder, a reconstructed video from the image embedding and the motion embeddings.

15. The non-transitory computer-readable medium of claim 14, wherein the operations further comprise modifying parameters of the dual-variational autoencoder model to generate the trained dual-variational autoencoder model based on determining a measure of accuracy by comparing the reconstructed image with the first frame and comparing the reconstructed video with the sequence of frames.

16. The non-transitory computer-readable medium of claim 9, wherein generating the media comprises generating a sequence of frames comprising at least one of one or more digital image frames, one or more keyframes, or one or more motion frames.

17. A system comprising:

one or more memory devices; and one or more processors coupled to the one or more memory devices that cause the system to perform operations comprising:

receiving, from a client device, a media generation request comprising one or more of a text prompt or an image prompt;

generating, utilizing a diffusion transformer model, denoised tokens from noised tokens generated from the media generation request; and generating, utilizing a decoder of a trained dual-variational autoencoder model, media from the denoised tokens, the trained dual-variational autoencoder model comprising a two-dimensional variational autoencoder that decodes digital images and a three-dimensional variational autoencoder that decodes motion frames.

18. The system of claim 17, wherein receiving the media generation request comprises:

receiving for the media generation request, video parameters comprising at least one of an aspect ratio, frames per second, a shot size, a camera angle, a motion parameter, a spatial pixel location, or camera parameters;

generating noised tokens that incorporate the video parameters; and generating, utilizing the decoder of the trained dual-variational autoencoder model, the media from the denoised tokens, wherein the media comprises the video parameters.

19. The system of claim 17, wherein the operations further comprise:

in response to the media generation request comprising the text prompt, generating, utilizing a text encoder, text tokens from the text prompt; and generating, utilizing the diffusion transformer model, denoised tokens from the text tokens and the noised tokens that incorporate video parameters.

20. The system of claim 17, wherein the operations further comprise:

modifying parameters of a dual-variational autoencoder model to generate the trained dual-variational autoencoder model by:

generating, utilizing a two-dimensional variational autoencoder, an image embedding from a first frame of a sequence of frames; and generating, utilizing a three-dimensional variational autoencoder, motion embeddings from the sequence of frames.

* * * * *